United States Patent
Toyama et al.

(10) Patent No.: US 7,508,407 B2
(45) Date of Patent: Mar. 24, 2009

(54) LIGHT SCANNING APPARATUS, IMAGE FORMING APPARATUS EQUIPPED WITH SUCH LIGHT SCANNING APPARATUS, AND CONTROL METHOD OR IMAGE FORMING METHOD FOR SUCH IMAGE FORMING APPARATUS

(75) Inventors: Hiroshi Toyama, Nagano-ken (JP); Yujiro Nomura, Nagano-ken (JP); Ken Ikuma, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 211 days.

(21) Appl. No.: 11/442,736

(22) Filed: May 26, 2006

(65) Prior Publication Data

US 2006/0268023 A1    Nov. 30, 2006

(30) Foreign Application Priority Data

| May 31, 2005 | (JP) | ............................. 2005-158465 |
| Jun. 1, 2005 | (JP) | ............................. 2005-161342 |
| Jun. 15, 2005 | (JP) | ............................. 2005-175110 |
| Jun. 15, 2005 | (JP) | ............................. 2005-175111 |

(51) Int. Cl.
*B41J 2/435* (2006.01)
*B41J 15/14* (2006.01)
*B41J 27/00* (2006.01)

(52) U.S. Cl. .................. 347/231; 347/243; 347/260
(58) Field of Classification Search ............ 347/26, 347/238, 240, 251–254, 231, 243, 259, 260; 359/223, 196–200

See application file for complete search history.

(56) References Cited

U.S. PATENT DOCUMENTS

| 6,995,885 | B2 * | 2/2006 | Nakajima | .................... 359/223 |
| 7,035,299 | B2 * | 4/2006 | Hori et al. | ..................... 372/26 |
| 2002/0164157 | A1 | 11/2002 | Hori et al. | |
| 2004/0032483 | A1 * | 2/2004 | Itabashi | ..................... 347/238 |

FOREIGN PATENT DOCUMENTS

| JP | 2001174738 A | 6/2001 |
| JP | 2002-182147 | 6/2002 |
| JP | 2002296534 A | 10/2002 |

* cited by examiner

*Primary Examiner*—Hai C Pham
(74) *Attorney, Agent, or Firm*—Hogan & Hartson LLP

(57) ABSTRACT

An image forming apparatus, includes: a latent image carrier whose surface includes an effective image region spanning across a predetermined width in a main scanning direction and is driven in a sub scanning direction approximately orthogonal to the main scanning direction; a latent image former which has a light source and a deflection mirror oscillating, and deflects a light beam from the light source using the deflection mirror so as to scan the effective image region with the deflected light beam; and a scanning mode controller which switches selectively between a single-side scanning mode and a double-side scanning mode, the single-side scanning mode being a mode in which the light beam is scanned only in a first direction included in the main scanning direction, the double-side scanning mode being a mode in which the light beam is scanned in both the first direction and a second direction opposite to the first direction, wherein a condition to form latent images on the latent image carrier in the single-side scanning mode is different from a condition to form latent images on the latent image carrier in the double-side scanning mode.

6 Claims, 45 Drawing Sheets

FIG. 6A: FORMING OF LINE LATENT IMAGE WITH LIGHT BEAM IN FIRST DIRECTION
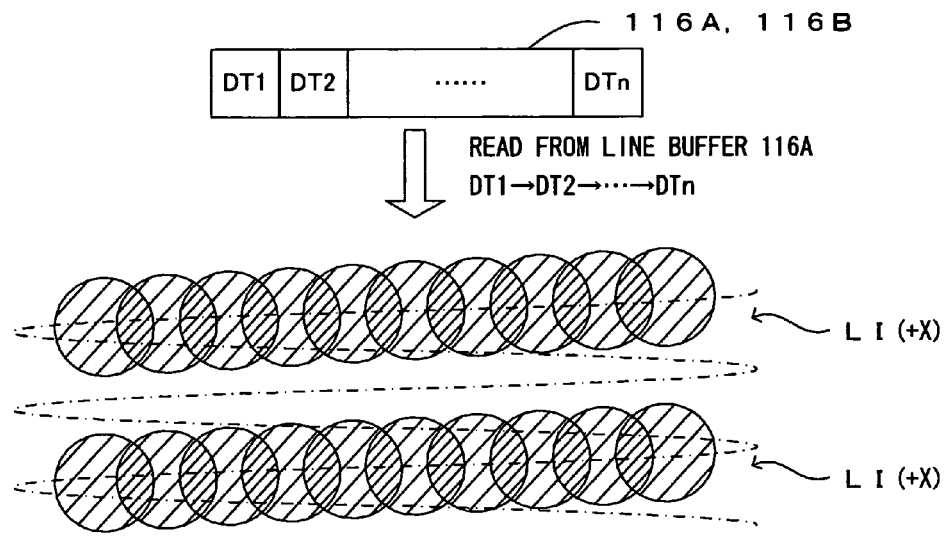
FIG. 6B: FORMING OF LINE LATENT IMAGE WITH LIGHT BEAM IN SECOND DIRECTION
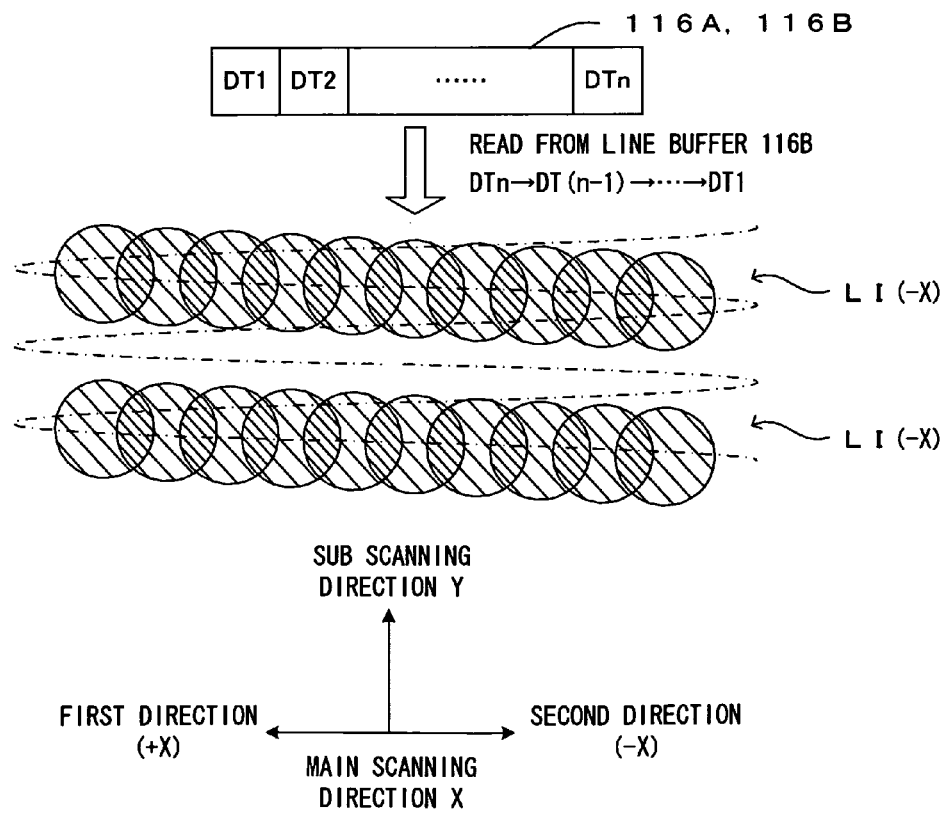

FIG. 7A: Wb<PT
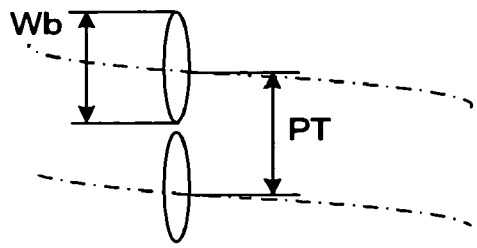
FIG. 7B: Wb=PT
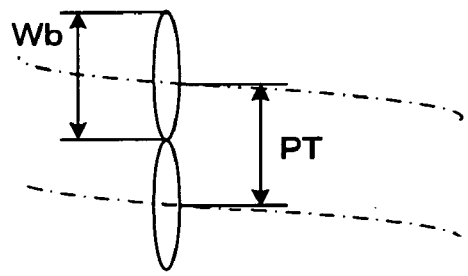
FIG. 7C: Wb>PT
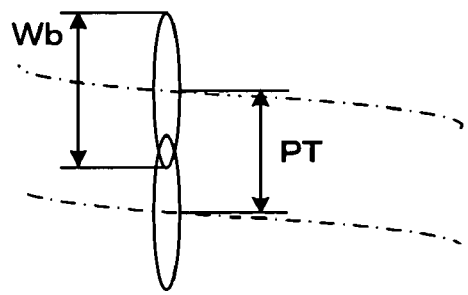
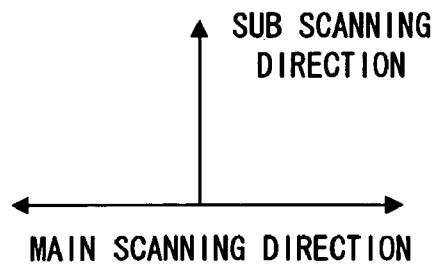
SUB SCANNING DIRECTION
MAIN SCANNING DIRECTION FIG. 10
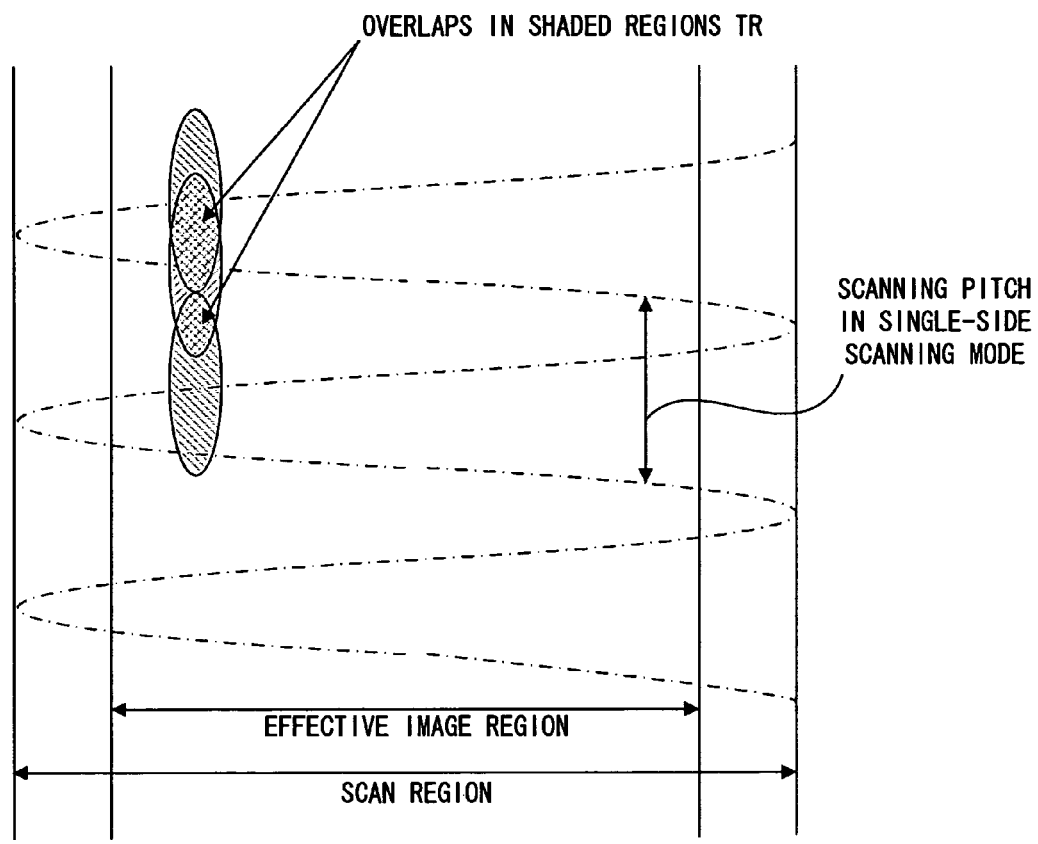
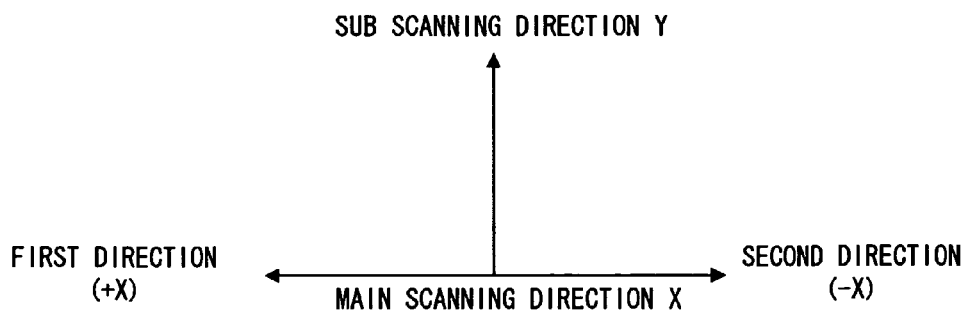

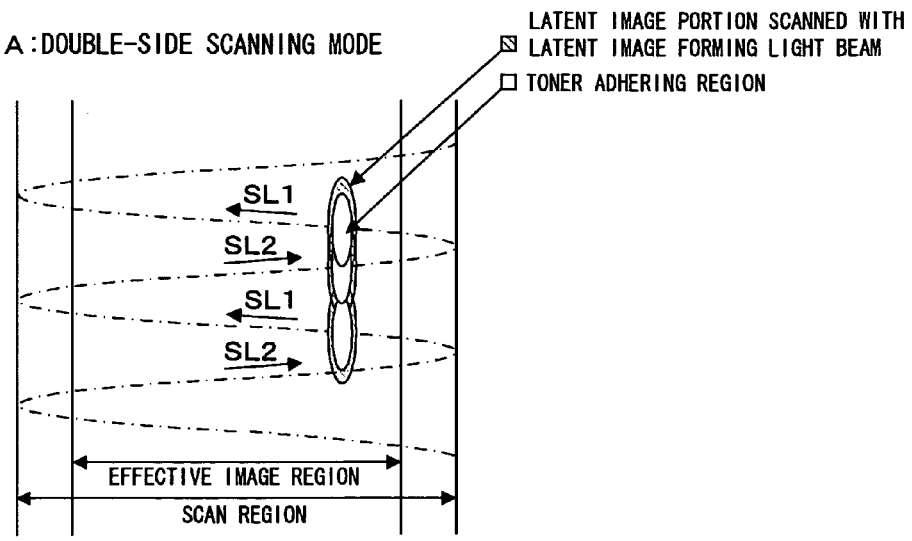
FIG. 11A: DOUBLE-SIDE SCANNING MODE
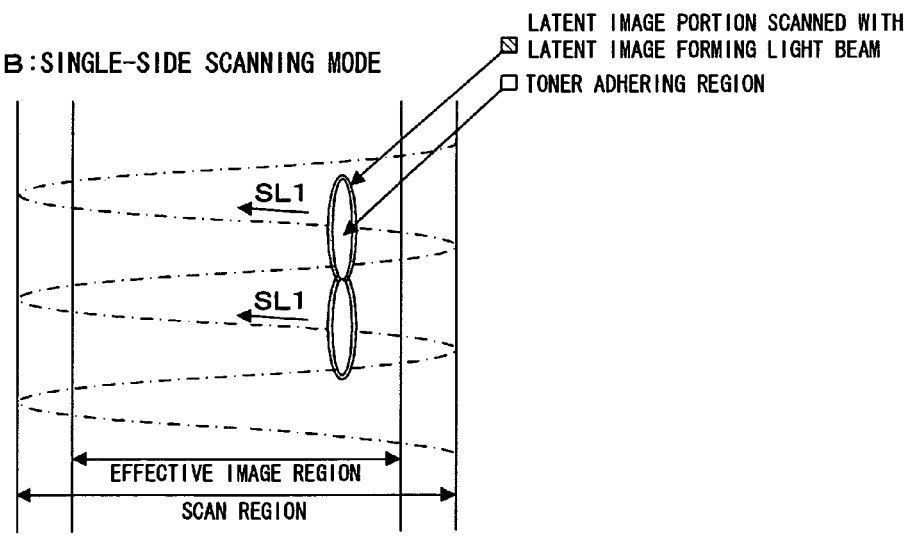
FIG. 11B: SINGLE-SIDE SCANNING MODE
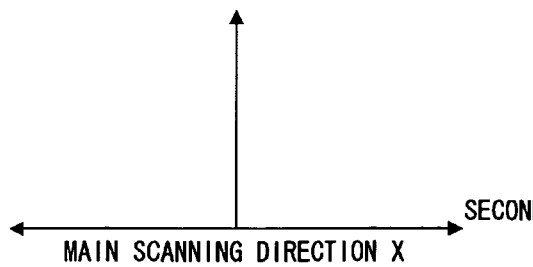

☐ ONE PIXEL  ■ EXPOSED PART

☐ ONE PIXEL  ■ EXPOSED PART

SINGLE-SIDE
SCANNING

DOUBLE-SIDE
SCANNING

☐ ONE PIXEL  ■ EXPOSED PART

F I G. 1 5
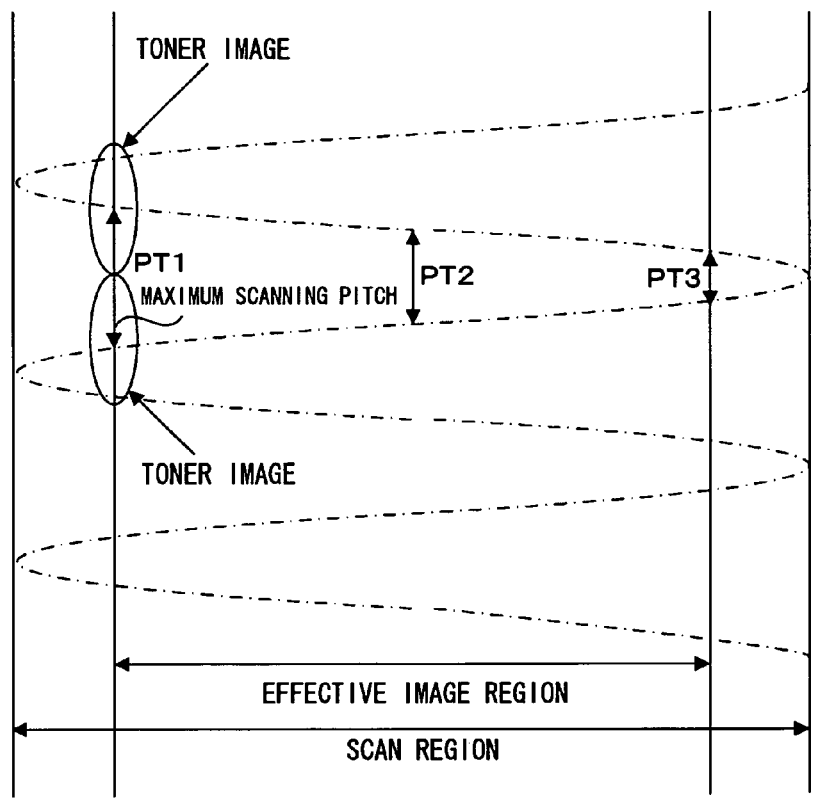
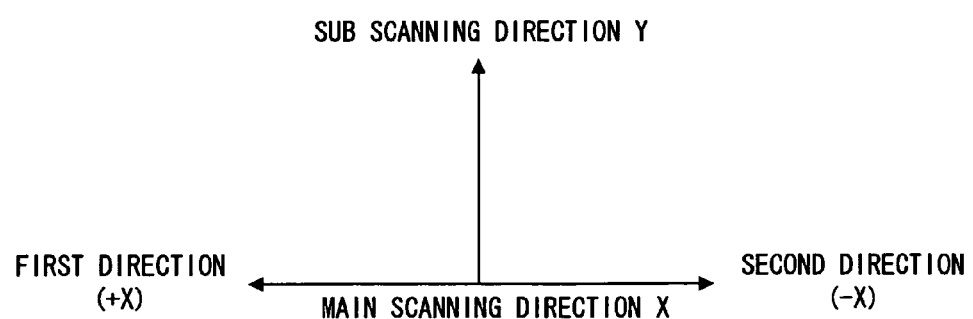

FIG. 16
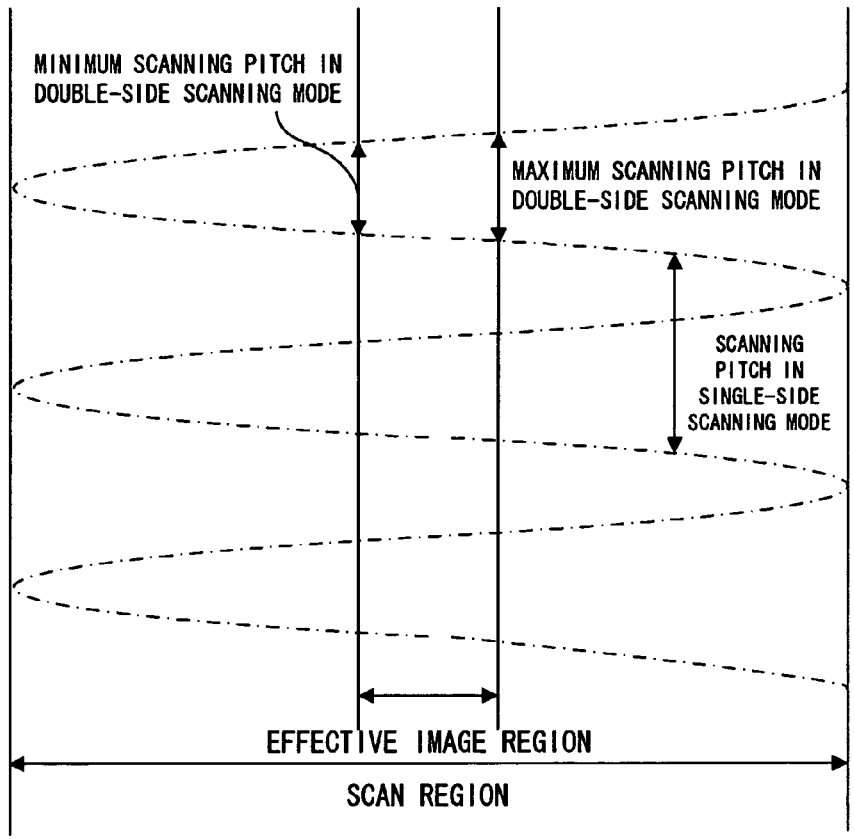
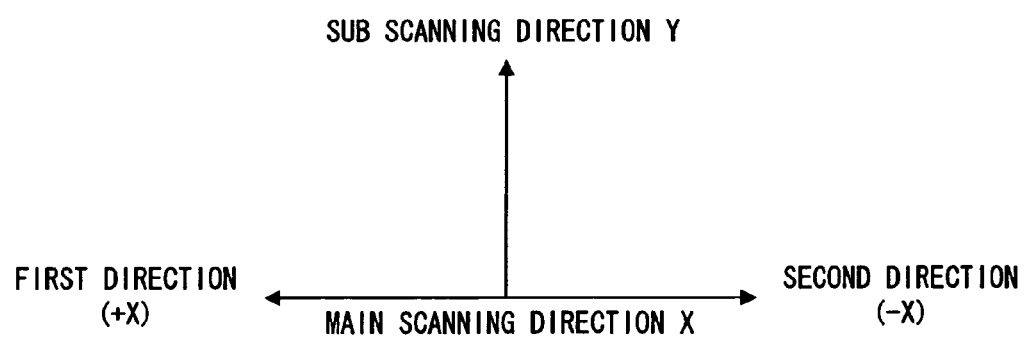

FIG. 19A: SINGLE-SIDE SCANNING MODE     FIG. 19B: DOUBLE-SIDE SCANNING MODE
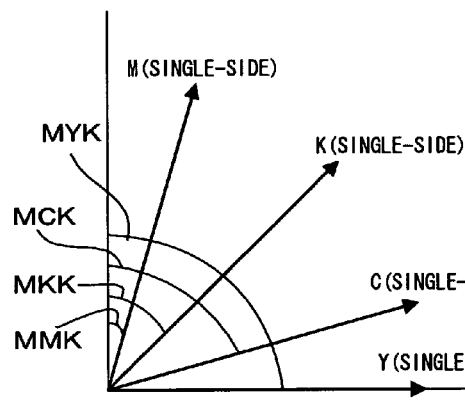
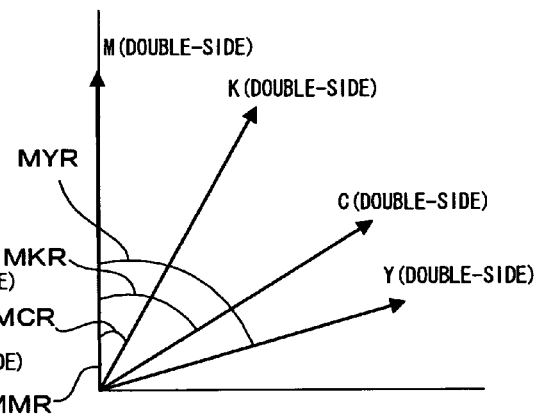
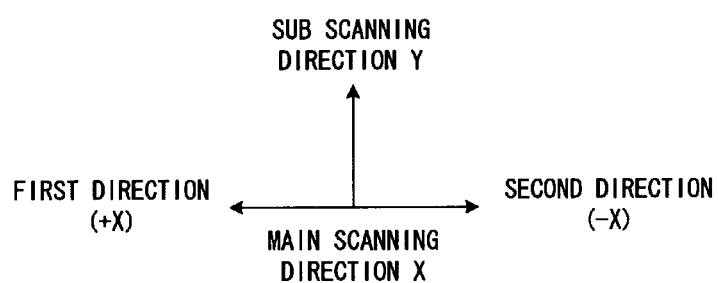

FIG. 21
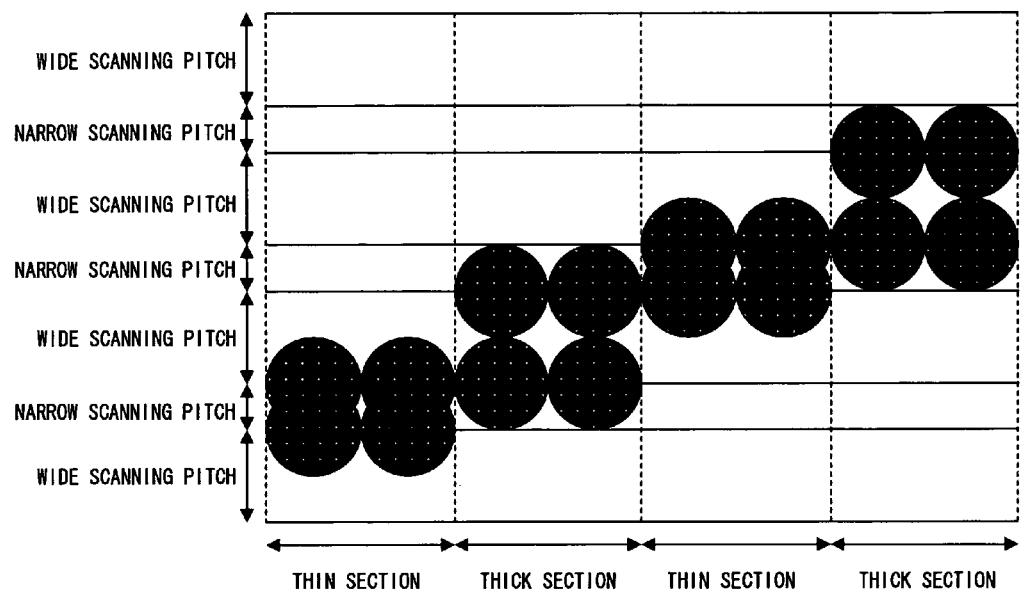
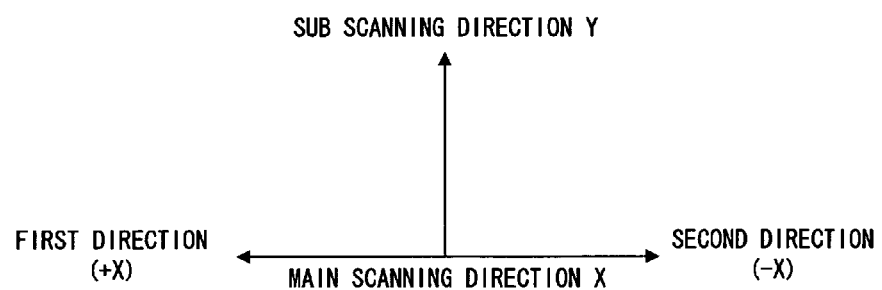

SUB SCANNING DIRECTION Y

FIRST DIRECTION (+X) ← MAIN SCANNING DIRECTION X → SECOND DIRECTION (-X)

FIG. 25A: SINGLE-SIDE SCANNING MODE
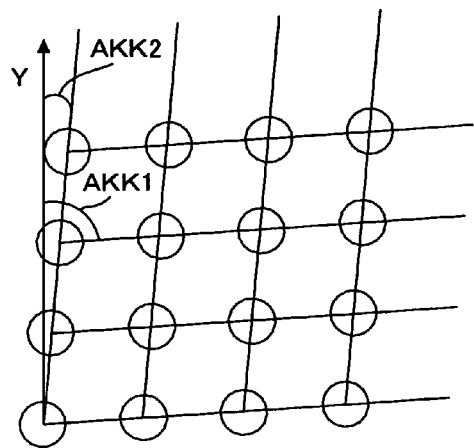
FIG. 25B: DOUBLE-SIDE SCANNING MODE
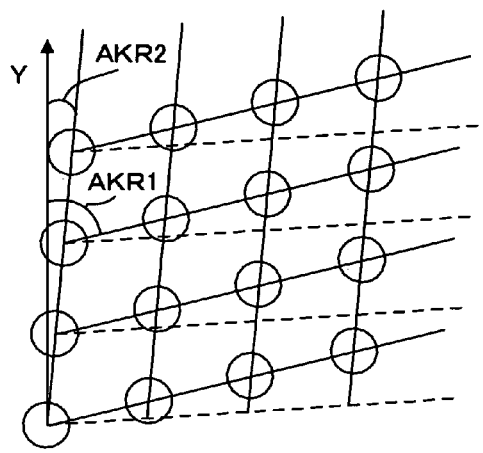
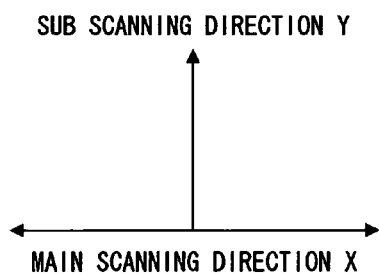

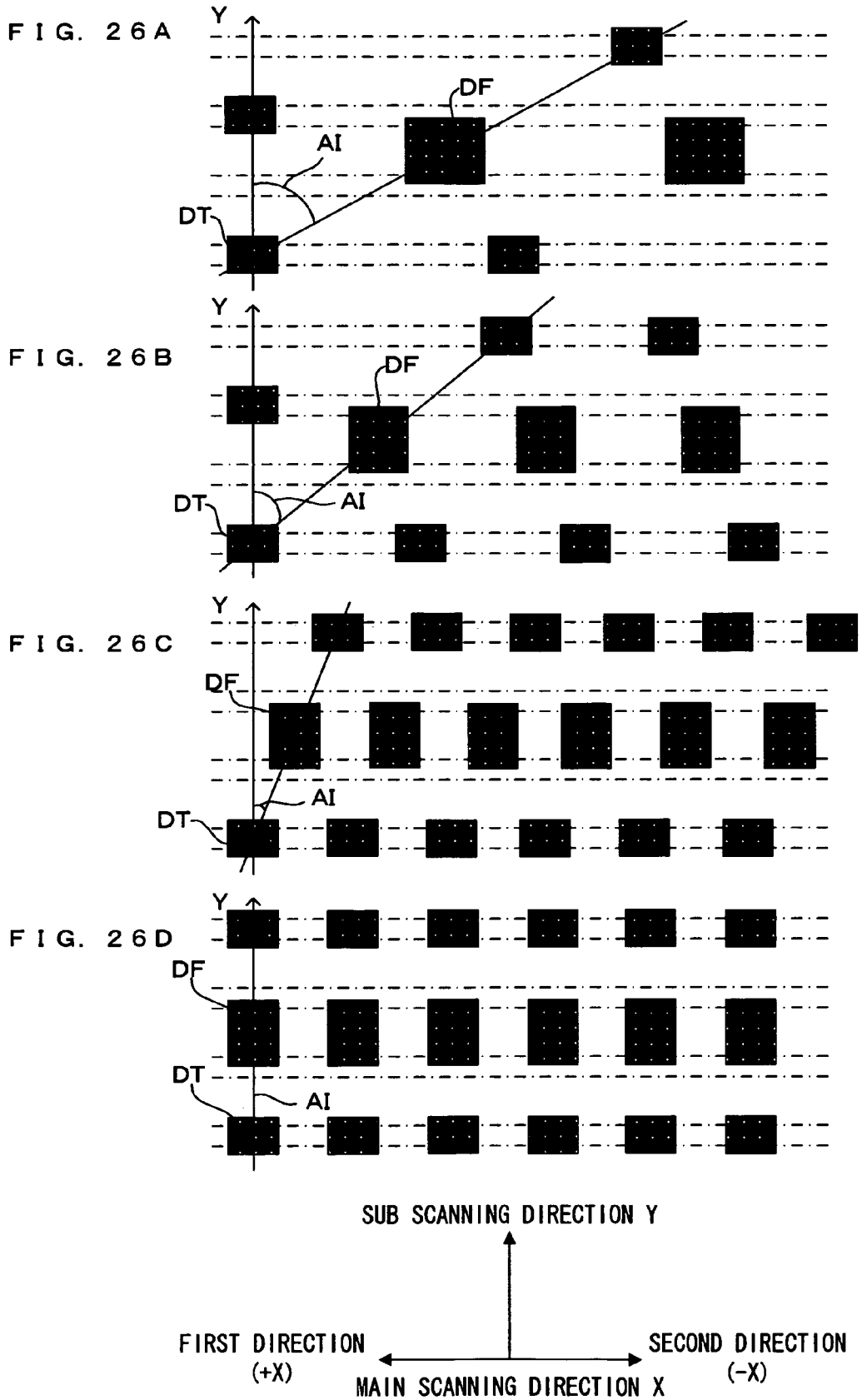

F I G. 2 8
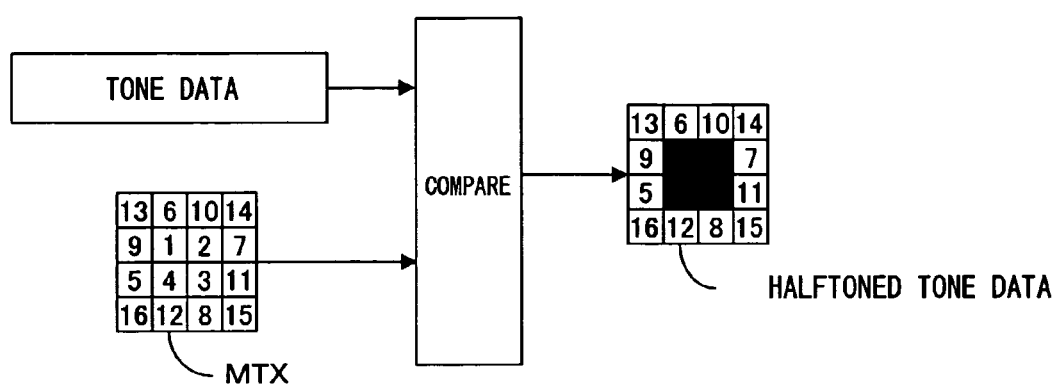

SUB SCANNING
DIRECTION Y

MAIN SCANNING DIRECTION X

SUB SCANNING
DIRECTION Y

MAIN SCANNING DIRECTION X

FIG. 34
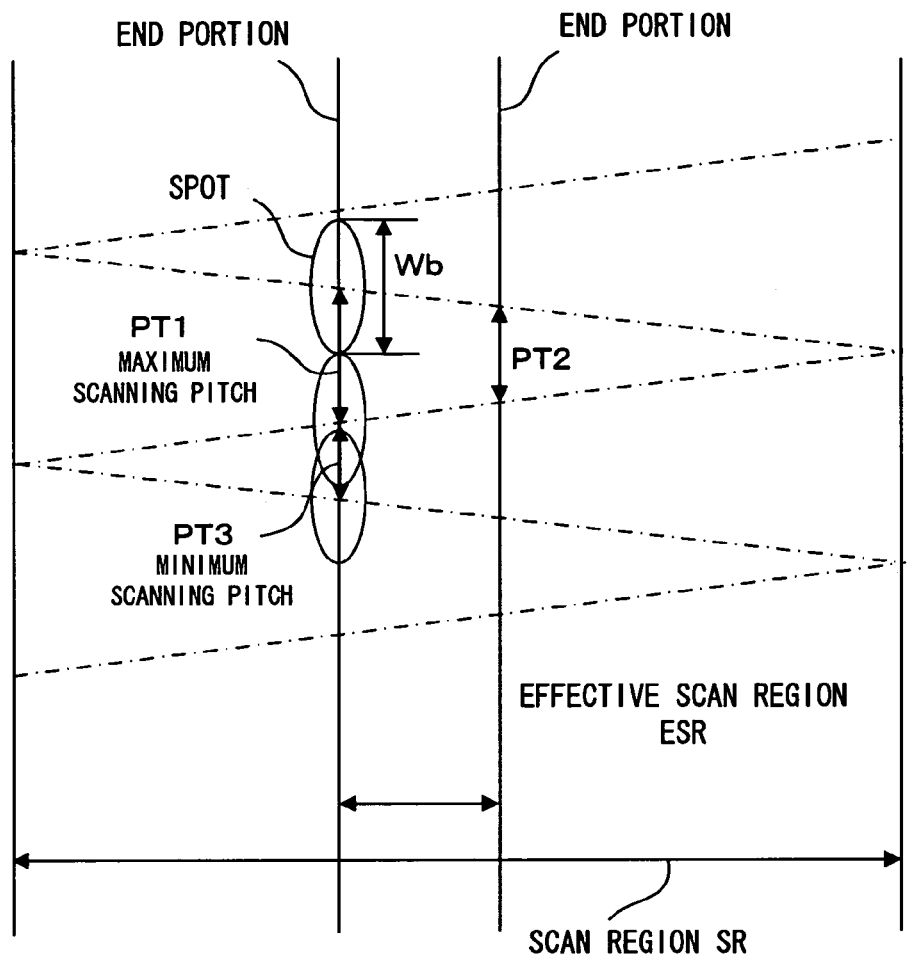
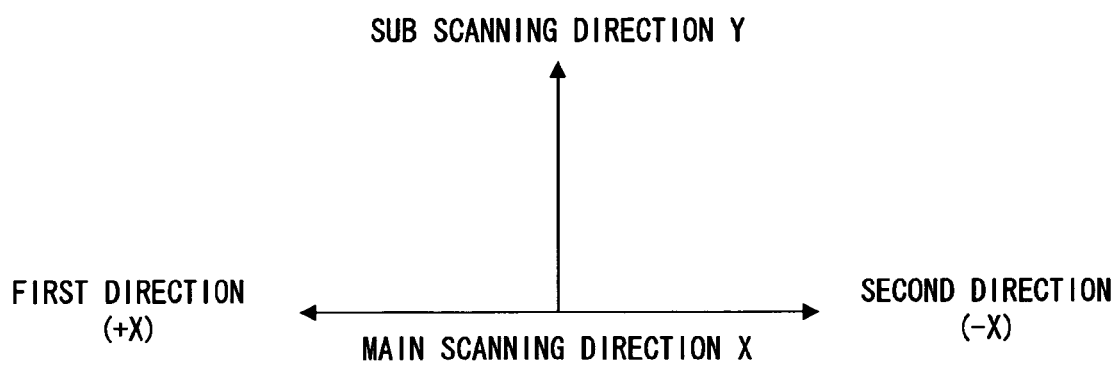

FIG. 37C
FIG. 37A
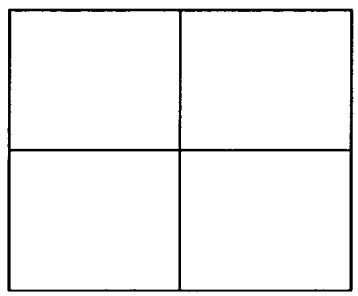
FIG. 37B
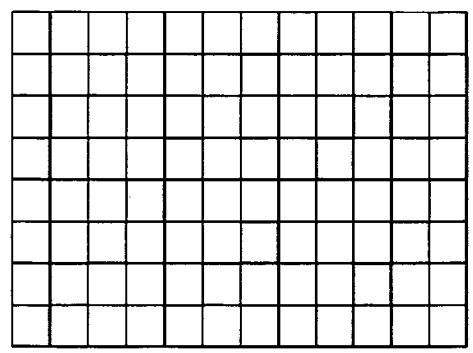
DENSITY VALUE 4
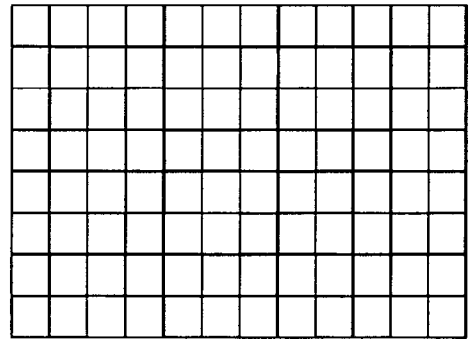
DENSITY VALUE 8
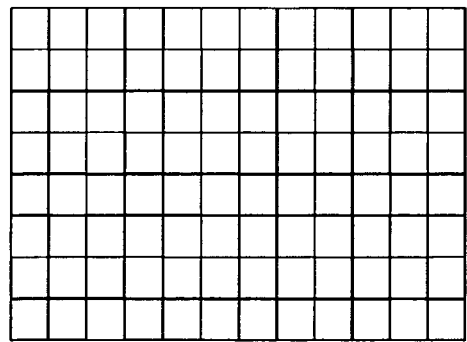
DENSITY VALUE 12
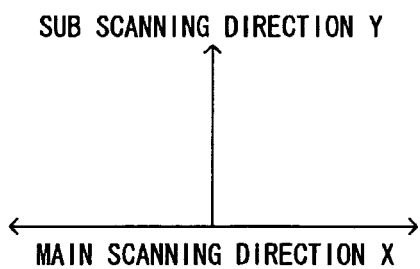
SUB SCANNING DIRECTION Y
MAIN SCANNING DIRECTION X FIG. 38A
| 9 | 5 | 1 | 13 |
|---|---|---|---|
| 9 | 5 | 1 | 13 |
| 10 | 6 | 2 | 14 |
| 10 | 6 | 2 | 14 |
| 7 | 3 | 15 | 11 |
| 7 | 3 | 15 | 11 |
| 8 | 4 | 16 | 12 |
| 8 | 4 | 16 | 12 |
FIG. 38C
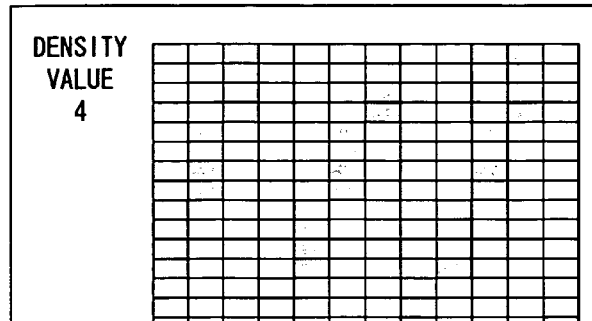
DENSITY VALUE 4
FIG. 38B
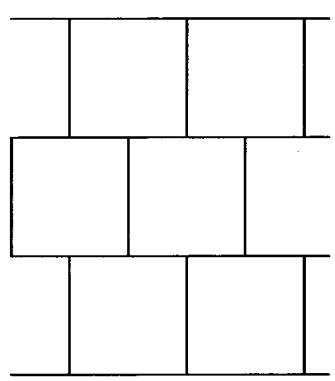
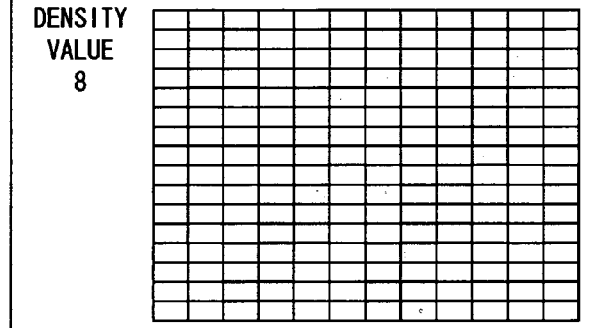
DENSITY VALUE 8
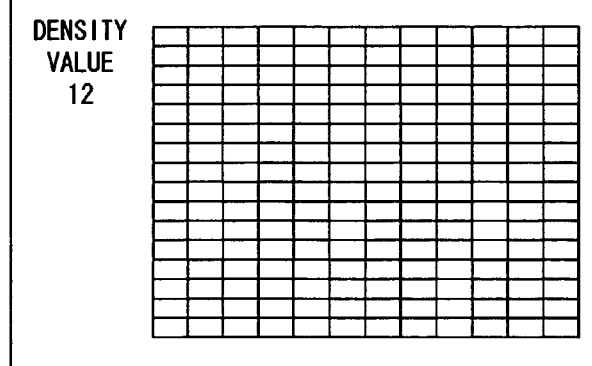
DENSITY VALUE 12
SUB SCANNING DIRECTION Y
MAIN SCANNING DIRECTION X FIG. 39A
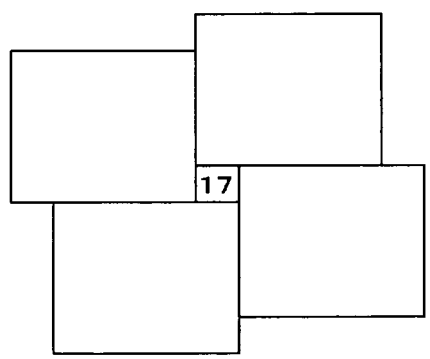
FIG. 39B
FIG. 39C
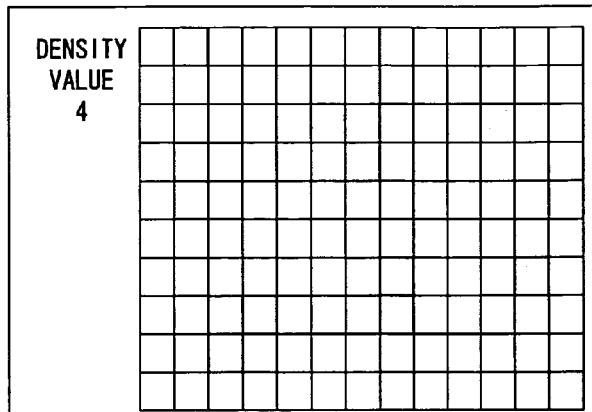
DENSITY VALUE 4
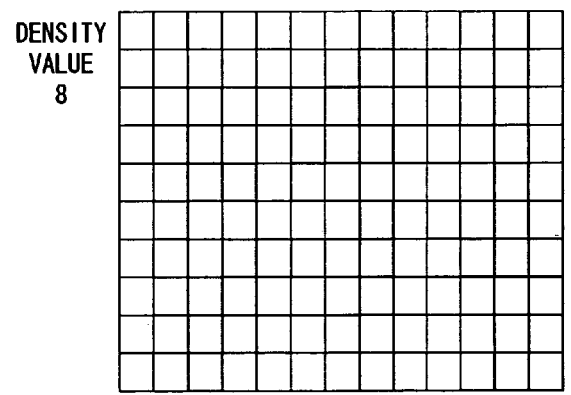
DENSITY VALUE 8
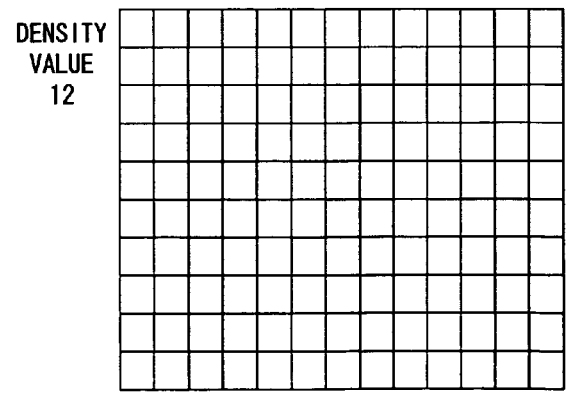
DENSITY VALUE 12
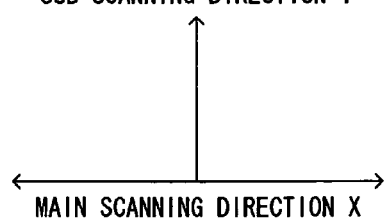

FIG. 40A
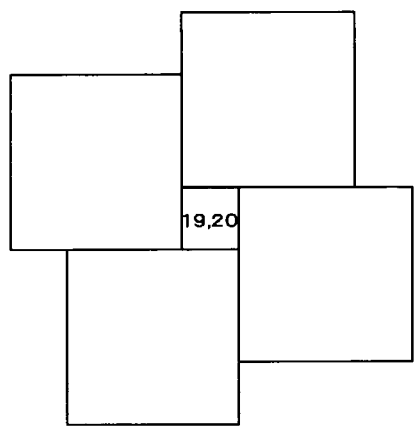
FIG. 40B
FIG. 40C
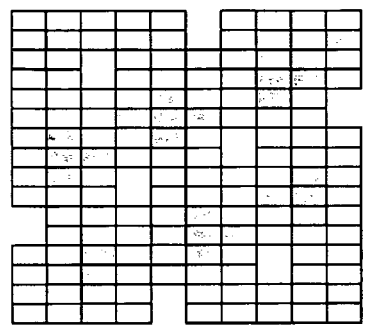
DENSITY VALUE 5
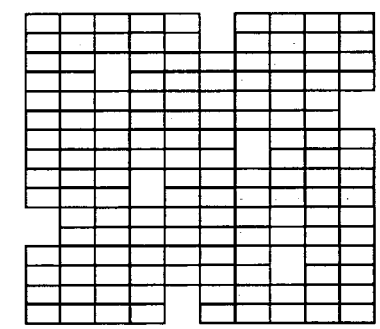
DENSITY VALUE 10
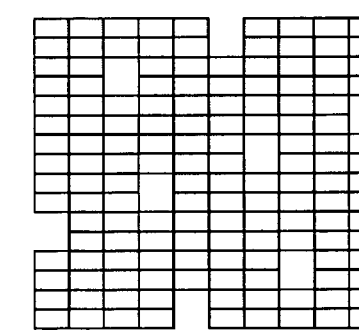
DENSITY VALUE 15
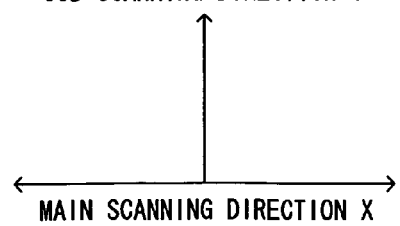

| 14 | 10 | 6 | 15 |
|----|----|---|----|
| 5 | 1 | 2 | 11 |
| 9 | 4 | 3 | 7 |
| 13 | 8 | 12 | 16 |

| 14 | 10 | 6 | 15 |
|----|----|---|----|
| 14 | 10 | 6 | 15 |
| 5 | 1 | 2 | 11 |
| 5 | 1 | 2 | 11 |
| 9 | 4 | 3 | 7 |
| 9 | 4 | 3 | 7 |
| 13 | 8 | 12 | 16 |
| 13 | 8 | 12 | 16 |

FIG. 42A

| 15.3 | 12  | 5.7 | 15.7 |
|------|-----|-----|------|
| 4.5  | 0.9 | 1.7 | 13   |
| 10.3 | 3.3 | 2.5 | 7.3  |
| 14.7 | 8.7 | 14  | 16   |

FIG. 42B

| 15.3 | 12.3 | 8.3 | 15.7 |
|------|------|-----|------|
| 15.3 | 12.3 | 8.3 | 15.7 |
| 7.1  | 1.7  | 3.3 | 13.1 |
| 7.1  | 1.7  | 3.3 | 13.1 |
| 11.3 | 6    | 4.7 | 9.7  |
| 11.3 | 6    | 4.7 | 9.7  |
| 14.7 | 10.3 | 14  | 16   |
| 14.7 | 10.3 | 14  | 16   |

FIG. 43
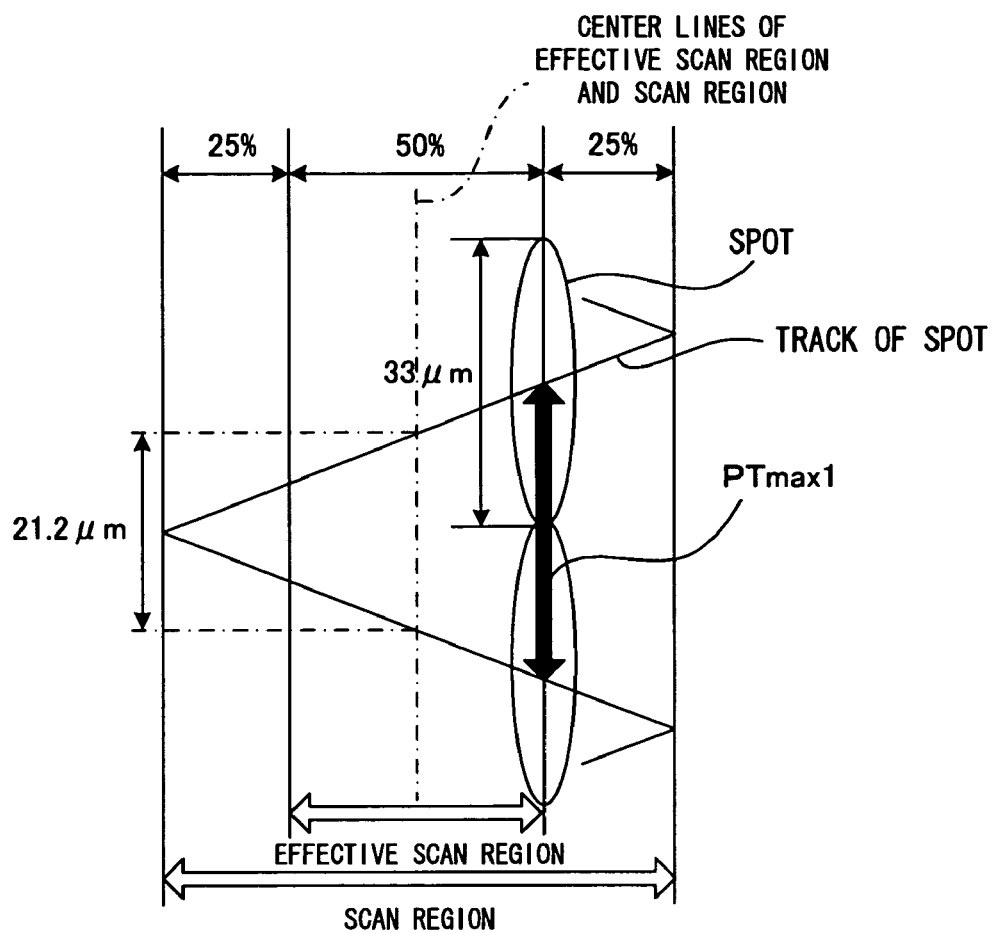
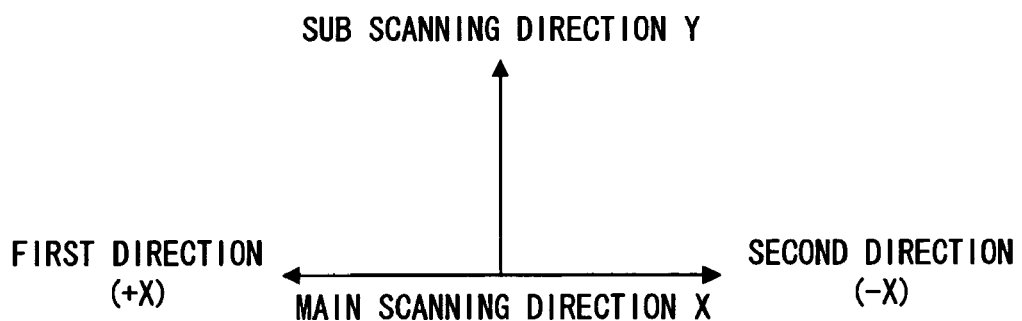

F I G. 4 5
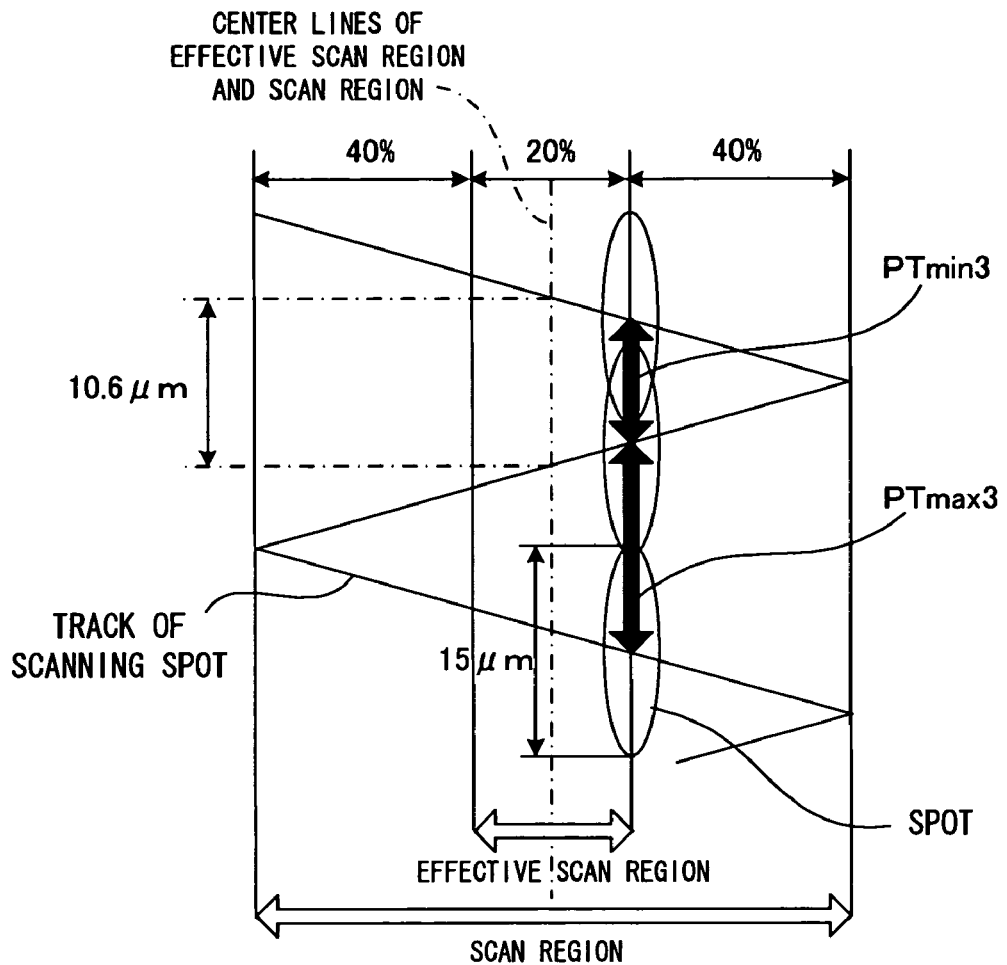
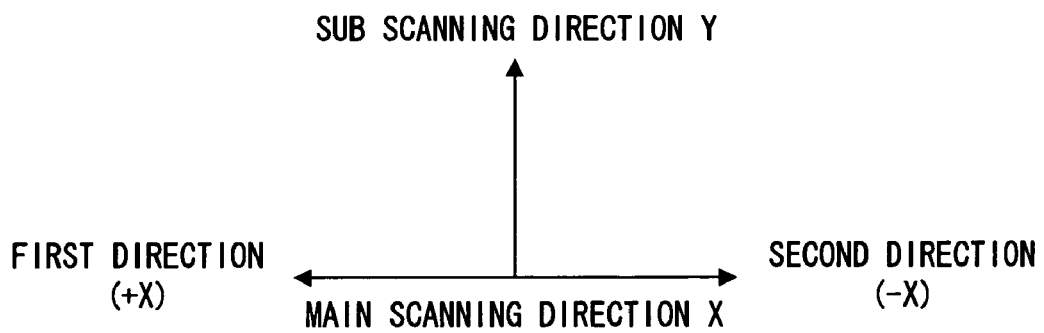

LIGHT SCANNING APPARATUS, IMAGE FORMING APPARATUS EQUIPPED WITH SUCH LIGHT SCANNING APPARATUS, AND CONTROL METHOD OR IMAGE FORMING METHOD FOR SUCH IMAGE FORMING APPARATUS

CROSS REFERENCE TO RELATED APPLICATION

The disclosure of Japanese Patent Applications enumerated below including specification, drawings and claims is incorporated herein by reference in its entirety:
No. 2005-158465 filed May 31, 2005;
No. 2005-161342 filed Jun. 1, 2005;
No. 2005-175111 filed Jun. 15, 2005; and
No. 2005-175110 filed Jun. 15, 2005.

BACKGROUND

1. Technical Field

The present invention relates to an image forming apparatus and an image forming method according to which a light beam is irradiated upon a latent image carrier, which is driven in a sub scanning direction, in a main scanning direction which is approximately orthogonal to the sub scanning direction to thereby form a latent image.

2. Related Art

An image forming apparatus of this type comprises a photosensitive member, an exposure unit and a developer unit, and forms a latent image on the photosensitive member in the following manner. In short, a light source of the exposure unit is controlled based on image data which represents a toner image, and a deflector of the exposure unit makes a light beam from the light source scan in the main scanning direction, thereby forming a latent image corresponding to the image data on the photosensitive member. This latent image is then developed with toner and a toner image is formed.

In a light scanning apparatus of this type, a deflector makes a light beam from a light source scan on a surface to be scanned in the main scanning direction. Further, an image forming apparatus using a light scanning apparatus of this type comprises a photosensitive member and a developer unit, and the light scanning apparatus forms a toner image on the photosensitive member. That is, a light source of the light scanning apparatus is controlled based on image data which represents a toner image, thereby modulating the light beam, and as the deflector deflects the modulated light beam, a beam spot scans over the surface of the photosensitive member and a latent image corresponding to the image data is formed. This latent image is then developed with toner and a toner image is formed.

A solution proposed so far for size reduction and speed improvement of a deflector is use of a deflection mirror surface which oscillates and accordingly serves as the deflector. In other words, in this apparatus, a deflection mirror supported at a torsion bar oscillates, the light source irradiates the light beam upon the deflection mirror, and the light beam scans on the surface of the photosensitive member back and forth. JPA-2002-182147 is an example of related art.

SUMMARY

The image forming apparatus like this selectively switches between a double-side scanning mode in which the light beam from the light source scans over the photosensitive member in both forward and backward scan direction and a single-side scanning mode in which the light beam scans either forward or backward, thus making it possible to form an image in a printing mode. When a high resolution is not necessary for example, a beam spot may scan the photosensitive member in either forward or backward, thereby forming an image at a low resolution, whereas when a high resolution is required, a beam spot may scan on the surface of the photosensitive member in both forward and backward, thereby enhancing the resolution. In addition, this image forming apparatus, reproducing tone, prints not only a line image consisting a text or the like but a gradation image such as a photograph.

However, in the case of such a structure as that described above capable of switching between the double-side scanning mode and the single-side scanning mode, development of a latent image formed in the double-side scanning mode on a photosensitive member accompanies a problem that more than necessary toner adheres to the surface of the photosensitive member and an image is impaired. The reason will now be described in details. For forming a continuous line in the sub scanning direction without a break in the single-side scanning mode, it is necessary that the beam width in the sub scanning direction on the surface of the photosensitive member is equal to or wider than at least the scanning pitch in the sub scanning direction in the single-side scanning mode. This is because when the beam width in the sub scanning direction on the surface of the photosensitive member is narrower than the scanning pitch in the sub scanning direction, latent images formed by means of light beam irradiation do not become continuous with each other between adjacent scanning lines and a continuous line is not therefore formed. The width of the light beam in the sub scanning direction on the surface of the photosensitive member thus must be equal to or wider than at least the scanning pitch in the sub scanning direction in the single-side scanning mode. Meanwhile, when the double-side scanning mode takes over, the scanning pitch becomes narrower than what it was before in the single-side scanning mode. Due to this, during scanning on the surface of the photosensitive member in the double-side scanning mode, areas scanned with the light beam on the surface of the photosensitive member excessively overlap each other between adjacent scanning lines. Since latent images formed on the adjacent scanning lines excessively overlap with each other, more than necessary toner adheres, which in turn causes a problem of an impaired image whose line is too thick or which is colored in excessively dark shades.

Means which attains tone reproduction described above may be a line screen which changes the line width of a line extending in a predetermined direction in accordance with a tone level for tone reproduction, a halftone screen which grows the sizes of halftone dots which are spaced apart in a predetermined direction in accordance with a tone level for tone reproduction, etc.

However, in the event that the structure above capable of switching between the double-side scanning mode and the single-side scanning mode needs to form a latent image on the photosensitive member in the double-side scanning mode, image impairment could occur due to the phenomenon that the scanning pitch in the sub scanning direction does not remain constant. The reason will now be described in details. While a beam spot scans over the surface of a photosensitive member and a latent image is formed in an image forming apparatus as that described above, the scanning pitch in the sub scanning direction is not constant in the double-side scanning direction, and overlapping of beam spots in the sub scanning direction varies. In short, large beam spot overlaps are created in the sub scanning direction in areas where the scanning pitch in the sub scanning direction is narrow, whereas small beam spot overlaps are created in the sub scanning direction in areas where the scanning pitch in the sub scanning direction is wide. Hence, when one tries forming a line which extends in a predetermined direction for tone reproduction using a line screen, the line will become thin within areas with large beam spot overlaps created in the sub scanning direction but thick within areas with small beam spot overlaps created in the sub scanning direction. This will result in an unwanted pattern of the line becoming sometimes thin and sometimes thick due to the uneven scanning pitch in the sub scanning direction, and hence, image impairment of failing to attain favorable tone reproduction could occur. Similar image impairment could occur during tone reproduction using a halftone screen in which halftone dots are spaced apart in a predetermined direction.

Further, a tone reproduction characteristic significantly changes between when the image forming apparatus described above forms a latent image on the photosensitive member in the double-side scanning mode and when it forms a latent image on the photosensitive member in the single-side scanning mode. The reasons will now be described in details. The first reason is as follows. The scanning pitch in the sub scanning direction is narrower in the double-side scanning mode than in the single-side scanning mode. Hence, in the double-side scanning mode, beam spots scanning over the surface of a photosensitive member overlap each other more significantly between adjacent scanning lines than in the single-side scanning mode. Toner could therefore adhere in greater amounts to these beam spot overlaps in the double-side scanning mode than in the single-side scanning mode, and shades of a color could become darker. The following is the second reason. In the image forming apparatus described above, while the scanning pitch in the sub scanning direction is constant in the single-side scanning mode, the scanning pitch in the sub scanning direction does not stay constant in the double-side scanning mode. In the event that a beam spot is to scan on the surface of the photosensitive member to form a latent image in the double-side scanning mode therefore, overlapping of beam spots in the sub scanning direction varies due to the fluctuating scanning pitch in the sub scanning direction. In other words, while the beam spot overlaps in the sub scanning direction are large in areas where the scanning pitch in the sub scanning direction is narrow, the beam spot overlaps in the sub scanning direction are small in areas where the scanning pitch in the sub scanning direction is wide. Due to this, in the double-side scanning mode, the fluctuating scanning pitch in the sub scanning direction could result in a color which spans multiple shades. The tone reproduction characteristic is thus remarkably different between when a latent image is formed on the photosensitive member in the double-side scanning mode and when a latent image is formed on the photosensitive member in the single-side scanning mode. Such a tone reproduction characteristic difference could serve as a major obstacle against such an apparatus above which performs image formation while switching between the double-side scanning mode and the single-side scanning mode as required when the apparatus tries to realize excellent tone reproduction in any scanning mode. That is, for instance, even though excellent tone reproduction is attained in the single-side scanning mode, after switching to the double-side scanning mode, for the reasons above, dark shades could be dominant or an unwanted pattern could be created. On the contrary, even when excellent tone reproduction is attained in the double-side scanning mode, after switching to the single-side scanning mode, light shades could be dominant.

Further, in an image forming apparatus which uses such a light scanning apparatus, at the stage that a deflection mirror oscillates in sine motions and makes a light beam scan on the surface of a photosensitive member which is a surface to be scanned, if the scanning is realized via an imaging optical system exhibiting an arc sign lens characteristic, the light beam reciprocally scans over the surface of the photosensitive member at an equal speed in the main scanning direction. While the light beam reciprocally scans over the surface of the photosensitive member as described above, the surface of the photosensitive member is driven in the sub scanning direction which is approximately orthogonal to the main scanning direction. In such an image forming apparatus therefore, the scanning pitch in the sub scanning direction is not constant, which will be described in details later. Hence, when one wishes to form a line image extending in the sub scanning direction for instance, in areas where the scanning pitch in the sub scanning direction is wide beam spots which are created as the light beam is imaged on the surface of the photosensitive member fail to overlap with each other in the sub scanning direction. Then image impairment that the line image becomes discontinuous could occur.

An advantage of some aspects of the invention is to make such an image forming apparatus and such an image forming method, in which an oscillating deflection mirror makes a latent image forming light irradiated in the main scanning direction upon a latent image carrier which is driven in the sub scanning direction and a latent image is consequently formed, capable of switching between the single-side scanning mode and the double-side scanning mode, and to provide a technique for forming an excellent image while preventing adhesion of more than necessary toner during development of a latent image formed on a photosensitive member in the double-side scanning mode.

An advantage of some aspects of the invention is to make such an image forming apparatus, in which an oscillating deflection mirror makes a beam spot scan in the main scanning direction on a latent image carrier which is driven in the sub scanning direction and a latent image is consequently formed, capable of switching between the single-side scanning mode and the double-side scanning mode, and to provide a technique for realizing excellent tone reproduction while preventing impairment of this image even in the double-side scanning mode.

An advantage of some aspects of the invention is to make such an image forming apparatus, in which an oscillating deflection mirror makes a beam spot scan in the main scanning direction over a latent image carrier which is driven in the sub scanning direction and a latent image is consequently formed, capable of switching between the single-side scanning mode and the double-side scanning mode, and to provide a technique for realizing excellent tone reproduction in any one of the single-side scanning mode and the double-side scanning mode.

An advantage of some aspects of the invention is to ensure, in a light scanning apparatus in which a deflection mirror makes a light beam scan on a surface to be scanned which is driven in the sub scanning direction, that excellent two-dimensional scanning is attained with beam spots connected to each other without any break even in an area where the scanning pitch is wide.

An advantage of some aspects of the invention is to provide an image forming apparatus which is capable of forming a favorable image using such a light scanning apparatus as that described above.

According to a first aspect of the invention, there is provided an image forming apparatus, comprising: a latent image carrier whose surface includes an effective image region spanning across a predetermined width in a main scanning direction and is driven in a sub scanning direction approximately orthogonal to the main scanning direction; a latent image former which has a light source and a deflection mirror oscillating, and deflects a light beam from the light source using the deflection mirror so as to scan the effective image region with the deflected light beam; and a scanning mode controller which switches selectively between a single-side scanning mode and a double-side scanning mode, the single-side scanning mode being a mode in which the light beam is scanned only in a first direction included in the main scanning direction, the double-side scanning mode being a mode in which the light beam is scanned in both the first direction and a second direction opposite to the first direction, wherein a condition to form latent images on the latent image carrier in the single-side scanning mode is different from a condition to form latent images on the latent image carrier in the double-side scanning mode.

According to a second aspect of the invention, there is provided a control method for an image forming apparatus comprising: a latent image carrier whose surface includes an effective image region spanning across a predetermined width in a main scanning direction and is driven in a sub scanning direction approximately orthogonal to the main scanning direction; and a latent image former which has a light source and a deflection mirror oscillating, and deflects a light beam from the light source using the deflection mirror so as to scan the effective image region with the deflected light beam, the method comprising of: executing a single-side scanning mode in which the light beam is scanned only in a first direction included in the main scanning direction; executing a double-side scanning mode in which the light beam is scanned in both the first direction and a second direction opposite to the first direction; and switching selectively between the single-side scanning mode and the double-side scanning mode, wherein a condition to form latent images on the latent image carrier in the single-side scanning mode is different from a condition to form latent images on the latent image carrier in the double-side scanning mode.

According to a third aspect of the invention, there is provided a light scanning apparatus comprising: a light source which emits a light beam; a deflector which has a deflection mirror oscillating in sine motions about a drive axis approximately orthogonal to a main scanning direction, the deflection mirror reflecting the light beam emitted from the light source so as to scan the light beam reciprocally in a main scanning direction; and an imaging optical system which exhibits an arc-sign theta lens characteristic, and focuses the light beam deflected by the deflector on a surface to be scanned so as to form a beam spot on the surface, the surface being driven in a sub scanning direction approximately orthogonal to the main scanning direction and including an effective scan region spanning across a predetermined width in the main scanning direction, wherein a diameter of the beam spot in the sub scanning direction is equal to or larger than the maximum scanning pitch in the sub scanning direction within the effective scan region.

According to a forth aspect of the invention, there is provided an image forming apparatus, comprising: a latent image carrier whose surface includes an effective scan region spanning across a predetermined width in a main scanning direction and is driven in a sub scanning direction approximately orthogonal to the main scanning direction; a light source which emits a light beam; a deflector which has a deflection mirror oscillating in sine motions about a drive axis approximately orthogonal to a main scanning direction, the deflection mirror reflecting the light beam emitted from the light source so as to scan the light beam reciprocally in a main scanning direction; and an imaging optical system which exhibits an arc-sign theta lens characteristic, and focuses the light beam deflected by the deflector on the surface of the latent image carrier so as to form a beam spot on the surface, wherein a diameter of the beam spot in the sub scanning direction is equal to or larger than the maximum scanning pitch in the sub scanning direction within the effective scan region.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIG. 6A is a diagram showing line latent image formed with light beam in first direction.

FIG. 6B is a diagram showing line latent image formed with light beam in second direction FIGS. 7A, 7B and 7C are diagrams showing the relation between beam width and scanning pitch.

FIG. 10 is a drawing showing overlapping of the light beam in the double-side scanning mode.

FIG. 11A is a drawing showing resultant toner images in double-side scanning mode.

FIG. 11B is a drawing showing resultant toner images in single-side scanning mode.

FIG. 15 is an explanatory diagram on the scanning pitch in the double-side scanning mode.

FIG. 16 is a diagram showing scanning line in a double-side scanning mode.

FIG. 19A is a diagram showing single-side sub-scanning line screen angles.

FIG. 19B is a diagram showing double-side sub-scanning line screen angles.

FIG. 21 is an explanatory diagram regarding a pattern attributable to the unevenness of the scanning pitch.

FIG. 25A is a drawing of the sub-scanning halftone screen angles in a single-side scanning mode in the seventh embodiment.

FIG. 25B is a drawing of the sub-scanning halftone screen angles in a double side scanning mode in the seventh embodiment.

FIGS. 26A, 26B, 26C and 26D are drawings which show a relationship between the widths of the halftone dots and the angle of the arrangement directions of the halftone dots with respect to the sub scanning direction.

FIG. 28 is an explanatory diagram of a dither method.

FIG. 34 is a drawing which shows a relationship between the spot diameter and the scanning pitch.

FIGS. 37A, 37B and 37C are explanatory diagrams regarding means which realizes the sub-scanning line screen angles for the single-side scanning mode according to the first example.

FIGS. 38A, 38B and 38C are explanatory diagrams regarding means which realizes the sub-scanning line screen angle for the double-side scanning mode according to the first example.

FIG. 39A, 39B and 39C are explanatory diagrams regarding means which realizes the sub-scanning halftone screen angles for the single-side scanning mode according to the second example.

FIG. 40A, 40B and 40C are explanatory diagrams regarding means which realizes the sub-scanning halftone screen angles for the double-side scanning mode according to the second example.

FIG. 42A shows halftoning using the single-side threshold matrix in third example FIG. 42B shows halftoning using the double-side threshold matrix in third example FIG. 43 is an explanatory diagram of the fourth example.

FIG. 45 is an explanatory diagram of the sixth example.

DESCRIPTION OF EXEMPLARY EMBODIMENTS

First Embodiment

Figure 1:
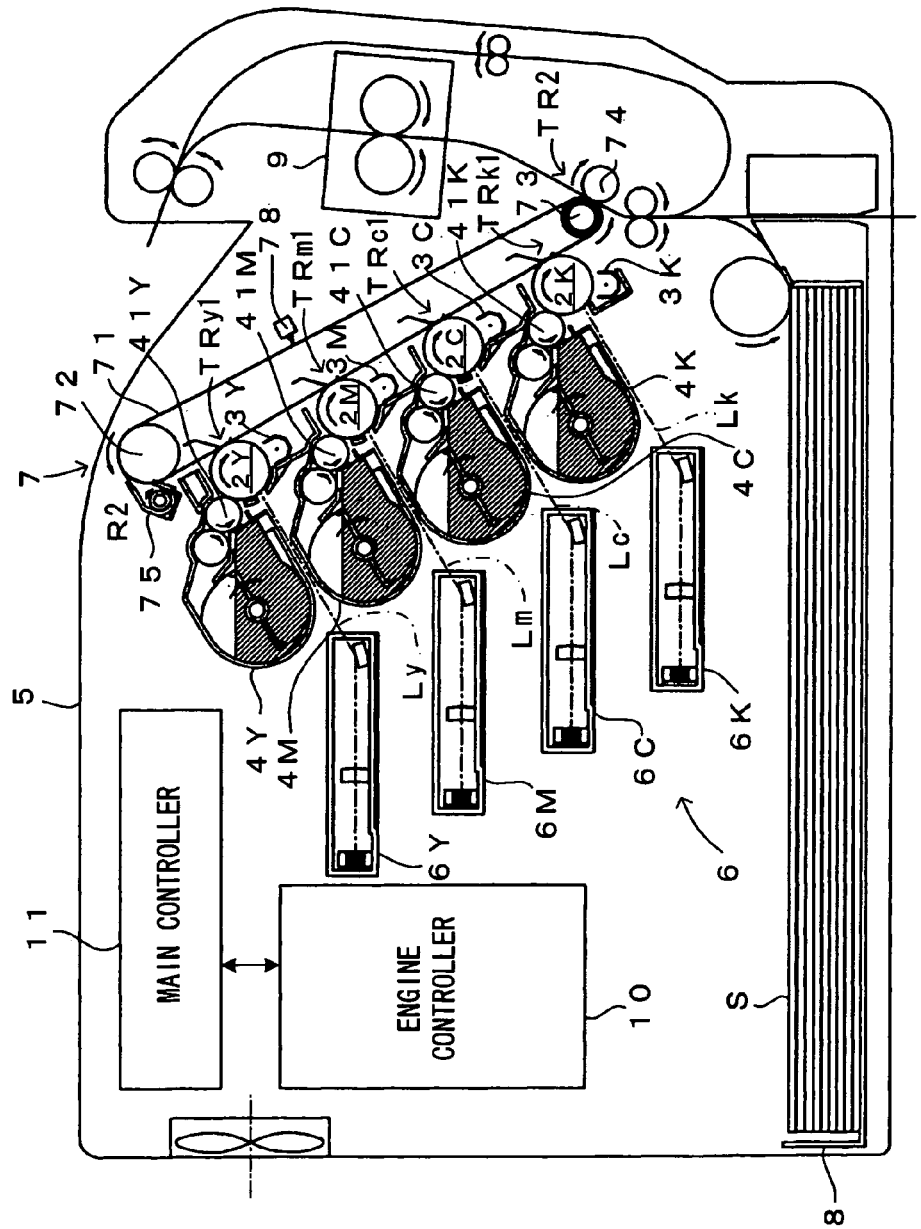
FIG. 1 is a diagram showing an image forming apparatus according to a first embodiment of the invention.
Figure 2:
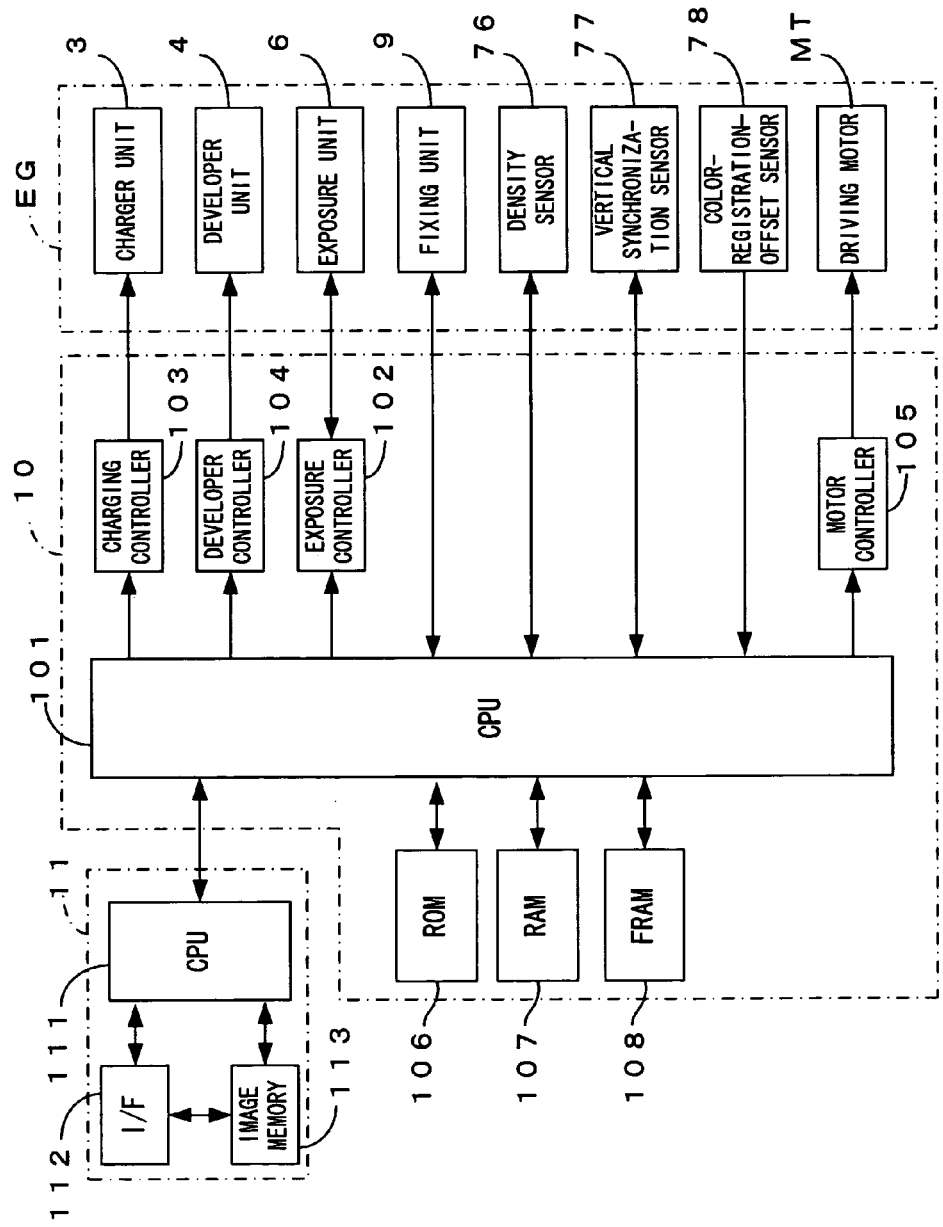
FIG. 2 is a block diagram showing an electrical arrangement of the image forming apparatus of FIG. 1.

FIG. 1 is a diagram showing an image forming apparatus according to a first embodiment. FIG. 2 is a block diagram showing an electrical arrangement of the image forming apparatus of FIG. 1. This image forming apparatus is a so-called tandem color printer, wherein photosensitive members 2Y, 2M, 2C, 2K for four colors of yellow(Y), magenta(M), cyan(C) and black (K), as latent image carriers, are juxtaposed in an apparatus body 5. The apparatus serves to form a full color image by superimposing toner images on the individual photosensitive members 2Y, 2M, 2C, 2K, or to form a monochromatic image using only the toner image of black (K). The image forming apparatus operates as follows. When an external apparatus such as a host computer applies a print command to a main controller 11 in response to a request from a user wanting to form an image, a CPU 111 of the main controller 11 sends a print command, based on which an engine controller 10 controls individual parts of an engine EG so as to form an image corresponding to the print command on a sheet S such as copy sheet, transfer sheet, paper and transparent sheet for OHP.

In the engine EG, charger units, developing units, exposure units (light scanning apparatus) and cleaners are provided in correspondence to the four photosensitive members 2Y, 2M, 2C, 2K, respectively. Thus, image forming units, each of which includes the photosensitive member, the charger unit, the developing unit, the exposure unit and the cleaner, are provided in association with the respective toner colors. The image forming unit forms the toner image of each associated toner color. It is noted that these image forming units (the charger units, developing units, exposure units and cleaners) for the respective color components are arranged the same way. Therefore, the arrangement for the yellow color is described here while individual parts of the arrangements for the other color components are represented by equivalent reference characters, respectively, and the description thereof is dispensed with.

The photosensitive member 2Y is rotatable in a direction of an arrow in FIG. 1 (sub-scan direction). More specifically, a drive motor MT is mechanically connected to one end of the photosensitive member 2Y. The motor controller 105 connected with the drive motor MT electrically, controls the drive motor MT. Thus, the photosensitive member 2Y is rotatably moved. According to this embodiment, the photosensitive member 2Y is driven by transmitting a drive force from the drive motor MT only to the one end of the photosensitive member 2Y Furthermore, this embodiment is designed such that a location of the drive motor MT, a location of a horizontal synchronous sensor 60 to be described hereinlater and a scan direction of a light beam satisfy a predetermined relation.

Figure 4:
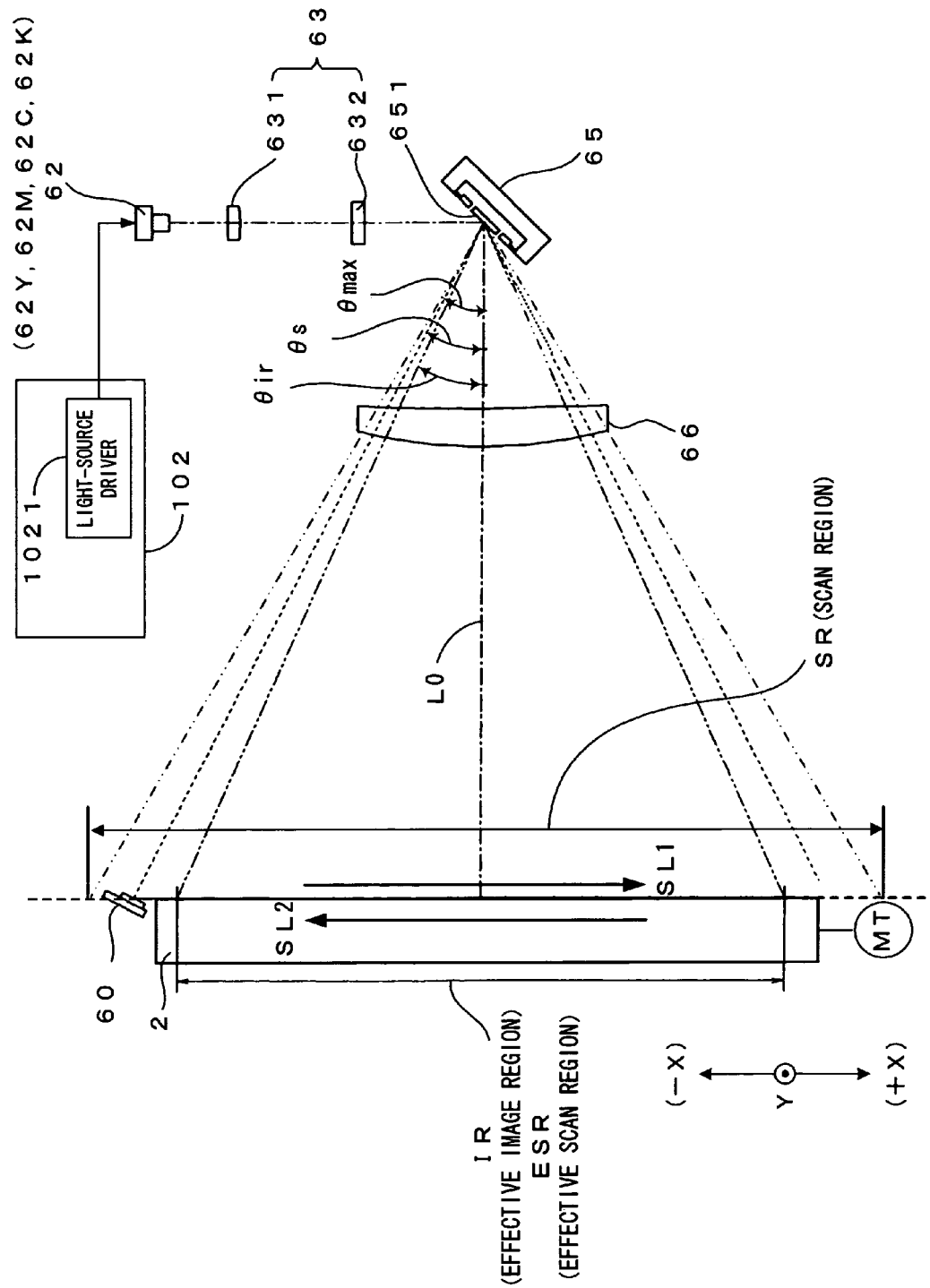
FIG. 4 is a diagram showing a scan region of the light beam in the exposure unit of FIG. 3.

Around the photosensitive member 2Y driven in this manner, a charger unit 3Y, a developing unit 4Y and a cleaner (not shown) are arranged in a rotational direction thereof. The charger unit 3Y comprises a scorotron charger, for example, which is applied with a charging bias from a charge controller 103 thereby uniformly charging an outside surface of the photosensitive member 2Y to a predetermined surface potential. An exposure unit 6Y emits a scan light beam Ly toward the outside surface of the photosensitive member 2Y so charged by the charger unit 3Y Thus, an electrostatic latent image corresponding to yellow-image data included in the print command is formed on the photosensitive member 2Y The exposure unit 6Y is equivalent to a "latent image former" of the invention and operates according to a control command from an exposure controller 102Y (FIG. 4). Arrangements and operations of the exposure unit 6 (6Y, 6M, 6C, 6K) and the exposure controller 102 (102Y, 102M, 102C, 102K) will be described in details hereinlater.

The electrostatic latent image thus formed is developed with toner by means of the developing unit 4Y (developer). The developing unit 4Y contains therein a yellow toner. When a developing unit controller 104 applies a developing bias to a developing roller 41Y, the toner carried on the developing roller 41Y is made to locally adhere to surface portions of the photosensitive member 2Y according to the surface potentials thereof. As a result, the electrostatic latent image on the photosensitive member 2Y is visualized as a yellow toner image. A DC voltage or a DC voltage superimposed with an AC voltage may be used as the developing bias to be applied to the developing roller 41Y. Particularly in an image forming apparatus of a non-contact development system wherein the photosensitive member 2Y is spaced away from the developing roller 41Y and the toner is made to jump between these members for accomplishing the development with toner, the developing bias may preferably have a waveform formed by superimposing a sinusoidal-wave, triangular-wave or rectangular-wave AC voltage on the AC voltage such as to effect efficient toner jumps.

The yellow toner image developed by the developing unit 4Y is primarily transferred onto an intermediate transfer belt 71 of a transfer unit 7 in a primary transfer region TRy1. The other members for the other color components than yellow are arranged absolutely the same way as those for the yellow. A magenta toner image, a cyan toner image and a black toner image are formed on the respective photosensitive members 2M, 2C, 2K and are primarily transferred onto the intermediate transfer belt 71 in respective primary transfer regions TRm1, TRc1, TRk1.

The transfer unit 7 includes: the intermediate transfer belt 71 entrained about two rollers 72, 73; and a belt driver (not shown) for driving the roller 72 into rotation thereby rotating the intermediate transfer belt 71 in a predetermined rotational direction R2. The transfer unit is further provided with a secondary transfer roller 74 which opposes the roller 73 with the intermediate transfer belt 71 interposed therebetween and which is adapted to be moved into contact with or away from a surface of the belt 71 by means of an unillustrated electromagnetic clutch. In a case where a color image is transferred to the sheet S, primary transfer timings are controlled to superimpose the individual toner images on each other so as to form the color image on the intermediate transfer belt 71. Then, the color image is secondarily transferred onto the sheet S taken out from a cassette 8 and delivered to a secondary transfer region TR2 between the intermediate transfer belt 71 and the secondary transfer roller 74. In a case where a monochromatic image is transferred to the sheet S, only a black toner image is formed on the photosensitive member 2K and the monochromatic image is secondarily transferred onto the sheet S delivered to the secondary transfer region TR2. The sheet S thus receiving the secondarily transferred image is transported to a discharge tray on a top surface of the apparatus body via a fixing unit 9.

After the primary transfer of the toner images to the intermediate transfer belt 71, the surface potentials of the photosensitive members 2Y, 2M, 2C, 2K are reset by unillustrated static eliminators. In addition, the photosensitive members are removed of the toners remaining on their surfaces by means of the cleaners. Then, the photosensitive members are subjected to the subsequent charging by means of the charger units 3Y, 3M, 3C, 3K.

Disposed in the vicinity of the roller 72 are a transfer belt cleaner 75, a density sensor 76 (FIG. 2) and a vertical synchronous sensor 77 (FIG. 2). Of these, the cleaner 75 is adapted to be moved into contact with or away from the roller 72 by means of an unillustrated electromagnetic clutch. As moved to the roller 72, the cleaner 75 holds its blade against the surface of the intermediate transfer belt 71 entrained about the roller 72 thereby removing the toner remaining on the outside surface of the intermediate transfer belt 71 after the secondary image transfer. The density sensor 76 confronts the surface of the intermediate transfer belt 71 for sensing optical densities of patch images formed as tonal patch images on the outside surface of the intermediate transfer belt 71. The vertical synchronous sensor 77 is a sensor for detecting a reference position on the intermediate transfer belt 71. The sensor functions as a vertical synchronous sensor for outputting a synchronous signal or a vertical synchronous signal Vsync in association with a drivable rotation of the intermediate transfer belt 71 in the sub-scan direction. In this apparatus, the operations of the individual parts of the apparatus are controlled based on the vertical synchronous signal Vsync for the purposes of synchronizing the operation timings of the individual parts and precisely superimposing the toner images of the respective colors on each other.

In FIG. 2, a reference numeral 113 represents an image memory provided in the main controller 11 for storing image data supplied from the external apparatus, such as the host computer, via an interface 112. A reference numeral 106 represents a ROM for storing operation programs executed by the CPU 101, control data used for controlling the engine EQ and the like. A reference numeral 107 represents a RAM for temporarily storing the operation results given by the CPU 101, and other data. Further, denoted at 108 is an FRAM (ferroelectric memory) which saves information related to the statuses of use of the respective portions of the engine.

Figure 3:
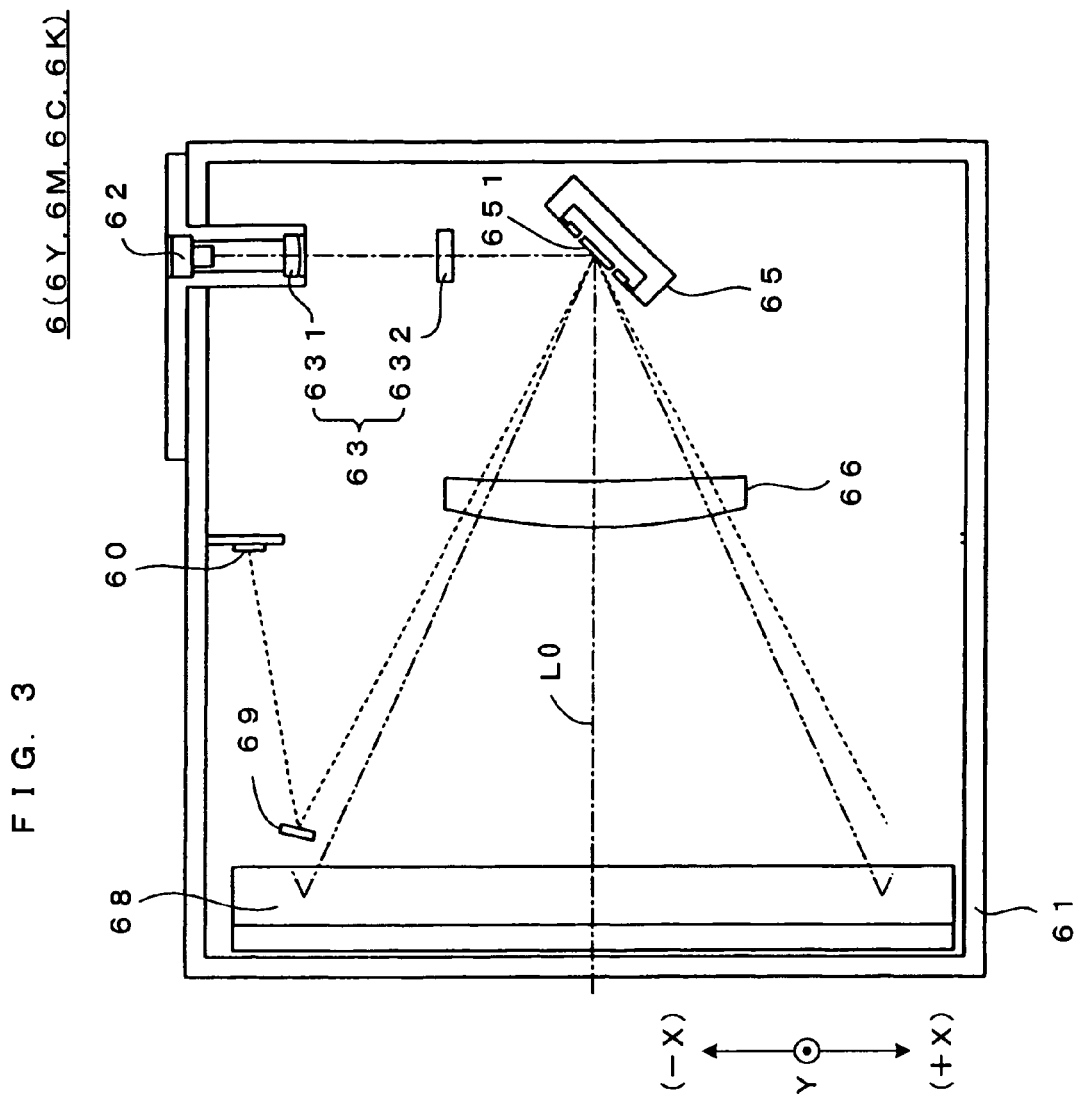
FIG. 3 is a sectional view taken on a main scan direction for showing an arrangement of the exposure unit (light scanning apparatus) provided in the image forming apparatus of FIG. 1.
Figure 5:
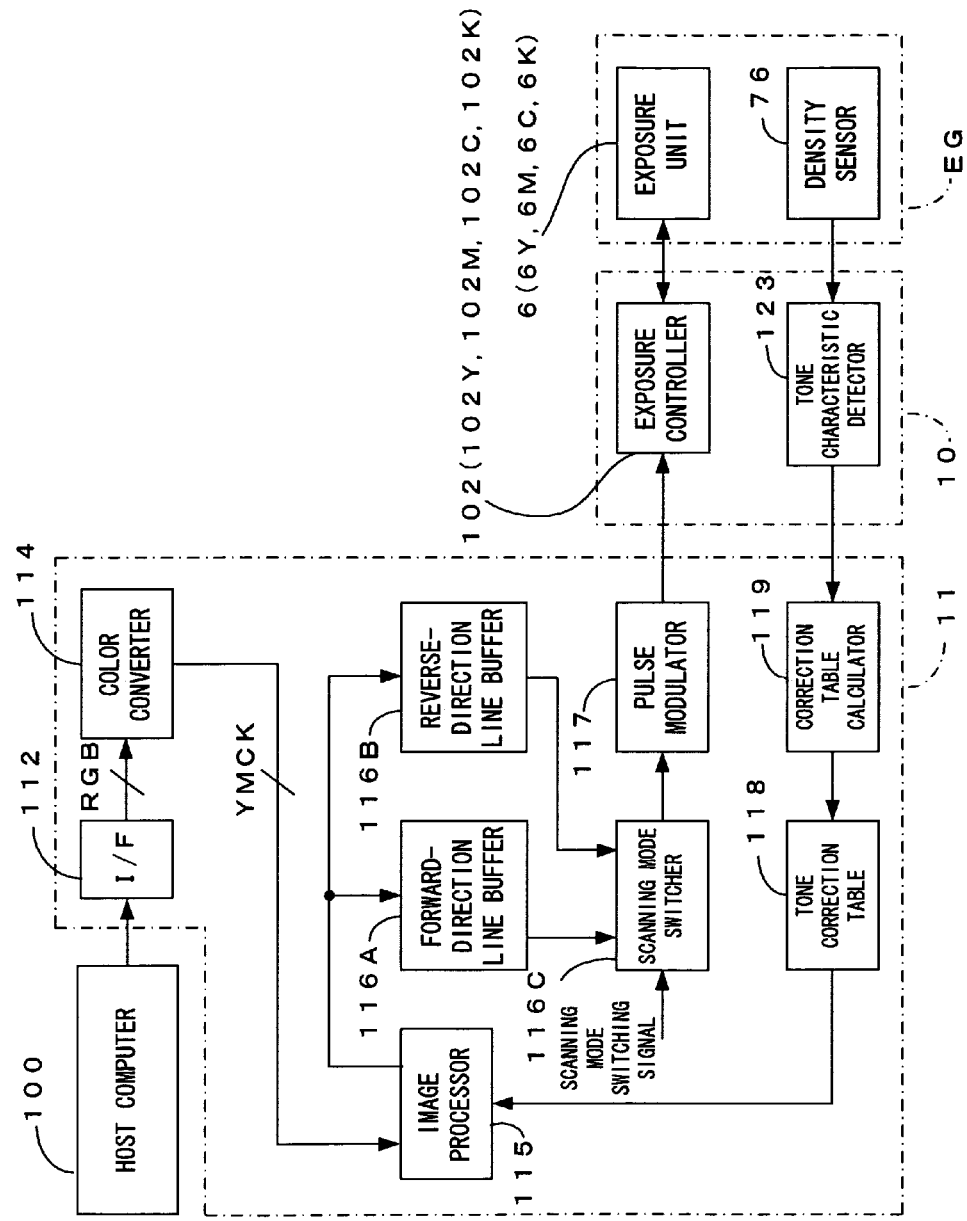
FIG. 5 is a diagram showing signal processor blocks of the image forming apparatus of FIG. 1.

FIG. 3 is a sectional view taken on a main scan direction for showing an arrangement of the exposure unit (light scanning apparatus) provided in the image forming apparatus of FIG. 1. FIG. 4 is a diagram showing a scan region of the light beam in the exposure unit of FIG. 3. FIG. 5 is a diagram showing signal processor blocks of the image forming apparatus of FIG. 1. Referring to these figures, the arrangements and operations of the exposure unit 6 and the exposure controller 102 are specifically described as below. The exposure unit 6 and the exposure controller 102 for the respective color components are arranged the same ways. Therefore, the arrangement for the yellow color is described here while the individual parts of the arrangements for the other color components are represented by equivalent reference characters, respectively, and the description thereof is dispensed with.

The exposure unit 6Y (6M, 6C, 6K) includes an exposure casing 61. The exposure casing 61 has a single exposure light source 62Y fixed thereto so as to be capable of emitting the light beam from the laser light source 62Y The laser light source 62Y is electrically connected with a light source driver 1021 of the exposure controller 102Y shown in FIG. 5. The light source driver 1021 operates as follows to provide ON/OFF control of the laser light source 62Y according to an image signal, so that the laser light source 62Y emits the light beam modulated in correspondence to the image data. Referring to FIG. 5, description is made as below.

In this image forming apparatus, upon receipt of an image signal from an external apparatus such as a host computer 100, the main controller 11 performs predetermined signal processing of the image signal. The main controller 11 comprises functional blocks such as a color converter 114, an image processor 115, two types of line buffers 116A and 116B, a scanning mode switcher 116C, a pulse modulator 117, a tone correction table 118 and a correction table calculator 119.

In addition to the CPU 101, the ROM 106, and the RAM 107 shown in FIG. 2, the engine controller 10 further includes a tone characteristic detector 123 for detecting a tone characteristic of the engine EG based on a detection result given by the density sensor 76, the tone characteristic representing a gamma characteristic of the engine EG In the main controller 11 and the engine controller 10, these function blocks may be implemented in hardware or otherwise, in software executed by the CPU 111, 101.

In the main controller 11 supplied with the image signal from the host computer 100, the color converter 114 converts RGB tone data into corresponding CMYK tone data, the RGB tone data representing the respective tone levels of RGB components of each pixel in an image corresponding to the image signal, the CMYK tone data representing the respective tone levels of CMYK components corresponding to the RGB components. In the color converter 114, the input RGB tone data comprise 8 bits per color component for each pixel (or representing 256 tone levels), for example, whereas the output CMYK tone data similarly comprise 8 bits per color component for each pixel (or representing 256 tone levels). The CMYK tone data outputted from the color converter 114 are inputted to the image processor 115.

The image processor 115 performs the following processes on each of the color components. That is, the image processor performs tone correction and a half-toning process on the per-pixel tone data inputted from the color converter 114. Specifically, the image processor 115 refers to the tone correction table 118 previously stored in a non-volatile memory, and converts the per-pixel tone data inputted from the color converter 114 into corrected tone data according to the tone correction table 118, the corrected tone data representing corrected tone levels. An object of the tone correction is to compensate for the variations of the gamma characteristic of the engine EG constructed as described above, thereby to maintain the overall gamma characteristic of the image forming apparatus in an idealistic state at all times. In the image forming apparatuses of this type, the gamma characteristic varies from one apparatus to another. In addition, the apparatus per se encounters the varied gamma characteristic according to use conditions. In order to eliminate influences of the varied gamma characteristic upon the image quality, a tone control process is performed in predetermined timings for updating the contents of the aforementioned tone correction table 118 based on measured image densities.

The tone control process is performed as follows. The tonal patch images for tone correction, which are previously defined for measurement of the gamma characteristic, are formed on the intermediate transfer belt 71 by the engine EG on a per-toner-color basis. The respective densities of the tonal patch images are sensed by the density sensor 76. Based on signals from the density sensor 76, the tone characteristic detector 123 generates a tone characteristic (the gamma characteristic of the engine EG) wherein the respective tone levels of the tonal patch images are in correspondence to the respective image densities thus detected. The resultant tone characteristic is outputted to the correction table calculator 119 of the main controller 11. The correction table calculator 119, in turn, operates tone correction table data for obtaining the idealistic tone characteristic, as compensating for the measured tone characteristic of the engine EG based on the tone characteristic supplied from the tone characteristic detector 123. The correction table calculator 119 updates the contents of the tone correction table 118 according to the operation results. In this manner, the tone correction table 118 is redefined. By making such updates, the image forming apparatus is adapted to form images of a consistent quality irrespective of the variations of the gamma characteristic of the apparatus or time-related changes thereof.

The image processor 115 halftones the corrected tone data thus corrected, during which one halftone dot is formed using multiple pixels, and the size of the halftone dot is enlarged by a dither method, an error diffusion method, a screen method or the like and a tone is realized, and the image processor 115 feeds halftoned tone data which contain eight bits per halftone dot per color to the two types of line buffers 116A and 116B. The content of the halftoning is different depending upon an image to form. In short, in accordance with a criterion such as whether the image is a monochrome image or a color image and whether the image is a line image or a photo image, an optimal processing content to the image is selected and executed.

Although the line buffers 116A and 116B are common to each other in that they store halftoned tone data (image information) constituting the 1-line image data output from the image processor 115, they read the tone data in different orders. That is, while the forward-direction line buffer 116A outputs the halftoned tone data constituting the 1-line image data in the forward direction from the beginning, the reverse-direction line buffer 116B outputs in the reverse direction from the end.

The scanning mode switcher 116C receives thus output halftoned tone data, and based on a scanning mode switching signal, outputs at appropriate timing to the pulse modulator 117 only the halftoned tone data output from one of the line buffers. The principal reason of disposing the two types of line buffers 116A and 116B is to deal with different scanning modes for the light beam in accordance with the printing mode as described later. The scanning mode switcher 116C further ensures that the pulse modulator 117 receives the tone data at such timing and in such an order corresponding to each color component. In this embodiment, the line buffers 116A and 116B and the scanning mode switcher 116C thus correspond to the "scanning mode controller" of the invention.

The halftoned tone data inputted to the pulse modulator 117 are represented by multivalued signals which indicate respective sizes of dots of color toners to be made to adhere to each pixel and an array of the toner dots. Receiving such data, the pulse modulator 117 uses the half-toned tone data to generate a video signal for pulse width modulation of an exposure laser pulse used by the engine EG to form an image of each color. The pulse modulator 117 outputs the video signal to the engine controller 10 via an unillustrated video interface. A light-source driver 1021 of the exposure controller 102Y, receiving the video signal, provides ON/OFF control of the laser light source 62Y of the exposure unit 6. The same operations are performed on the other color components.

Returning to FIG. 3 and FIG. 4, further explanation is made as follows. Provided in the exposure casing 61 are a collimator lens 631, a cylindrical lens 632, a deflector 65 and a scanning lens 66 such as to scan the light beam from the laser light source 62Y on the surface (not shown) of the photosensitive member 2Y Specifically, the light beam from the laser light source 62Y is shaped into a collimated beam of a suitable size by means of the collimator lens 631 and then, is made incident on the cylindrical lens 632 powered only in a sub-scan direction Y. By adjusting the cylindrical lens 632, the collimated beam is focused onto place near a deflective mirror surface 651 of the deflector 65 with respect to the sub-scan direction Y According to the embodiment, a combination of the collimator lens 631 and the cylindrical lens 632 functions as a beam shaping system 63 for shaping the light beam from the laser light source 62Y.

The deflector 65 is formed using a micromachining technique which utilizes a semiconductor fabrication technique for integrally forming micro machines on a semiconductor substrate. The deflector comprises a deflection mirror adapted for resonant oscillations. Specifically, the deflector 65 is capable of deflecting the light beam in a main scan direction X by means of the deflective mirror surface 651 in resonant oscillations. More specifically, the deflective mirror surface 651 is oscillatbly mounted about an oscillatory axis (torsion spring) extending substantially perpendicular to the main scan direction X. The deflective mirror sinusoidally oscillates about the oscillatory axis according to an external force applied from an operating section (not shown). The operating section applies an electrostatic, electromagnetic or mechanical external force to the deflective mirror surface 651 based on a mirror drive signal from a mirror driver (not shown) of the exposure controller 102, thereby bringing the deflective mirror surface 651 into oscillations at a frequency of the mirror drive signal. The operating section may adopt any of the drive methods based on electrostatic attraction, electromagnetic force and mechanical force. These drive methods are known in the art and hence, the description thereof is dispensed with.

The light beam deflected by the deflective mirror surface 651 of the deflector 65 is directed toward the scanning lens 66 at a maximum oscillation angle θmax, as shown in FIG. 4. In this embodiment, the scanning lens 66 is designed to have a substantially constant F-value with respect to the overall effective image region IR in other words, effective scan region ESR on the photosensitive member 2. Therefore, the light beam deflected toward the scanning lens 66 passes therethrough to be focused on the effective image region IR on the photosensitive member surface 22 in a spot of a substantially constant diameter. Thus, the light beam is scanned in parallel to the main scan direction X so as to form a linear latent image on the effective image region IR on the photosensitive member 2, the linear latent image extending in the main scan direction X. As shown in FIG. 4, the embodiment defines a scan region SR, which can be scanned by the deflector 65, ("second scan region" of the invention) SR2 to be broader than a scan region ("first scan region" of the invention) SR1 where the light beam is scanned on the effective image region IR. Furthermore, the first scan region SR1 is positioned substantially centrally of the second scan region SR2, so as to be substantially symmetrical with respect to a light axis. A symbol θir in the figure represents the oscillation angle of the deflective mirror surface 651, which corresponds to an end of the effective image region IR. A symbol θs represents the oscillation angle of the deflective mirror surface 651, which corresponds to a horizontal synchronous sensor to be described as below.

Further, the image forming apparatus, having this structure, is capable of switching between the single-side scanning mode in which the light beam scans only in a first direction included in the main scanning direction X and the double-side scanning mode in which the light beam scans in two directions, one being the first direction and the other being a second direction which is opposite to the first direction. When one wishes to form a line latent image on the latent image carrier as shown in FIGS. 6A and 6B for example, the light beam scanning in the first direction included in the main scanning direction X forms line latent images LI(+X) within an effective image region and the light beam scanning in the second direction which is opposite to the first direction forms line latent images LI(-X). Shown in FIGS. 6A and 6B are line latent images which the image forming apparatus shown in FIG. 1 forms. In the double-side scanning mode therefore which makes the light beam for latent image formation scan in the first direction and the second direction, the line latent images LI(+X) and LI(-X) are formed alternately in the sub scanning direction. On the contrary, in the single-side scanning mode which makes the light beam scan in either one of the first direction and the second direction, either line latent images LI(+X) or line latent images LI(-X) are formed in the sub scanning direction.

In addition, the image forming apparatus having this structure is capable of making the light beam scan in the main scanning direction back and forth. That is, the light bean can scan in both the direction (+X) and the direction (-X). The tone data constituting the 1-line image data are temporarily stored in a storage part (the line buffers 116A and 116B) as described above, and the scanning mode switcher 116C provides the pulse modulator 117 with the tone data at appropriate timing and in a proper order. For instance, when the direction is switched to the direction (+X), as shown in FIG. 6A, the tone data are read out from the line buffer 116A in the order of DT1, DT2, . . . DTn and beam spots are irradiated upon the photosensitive member 2 in the first direction (+X) based on each piece of the tone data, whereby line latent images LI(+X) are formed. On the contrary, when the direction is switched to the direction (-X), as shown in FIG. 6B, the tone data are read out from the line buffer 116B in the order of DTn, DT(n-1), . . . DT1 and beam spots are irradiated upon the photosensitive member 2 in the second direction (-X) based on each piece of the tone data, whereby line latent images LI(-X) are formed. The light beam for latent image formation is thus changed for different printing modes or different lines. Describing in more specific details, in this embodiment, the RAM 107 temporarily stores information related to a resolution (resolution information) contained in a print command. In the event that printing at a high resolution is instructed, latent images are formed as the so-called double-side scanning mode is executed which alternately repeats an operation of making a light beam SL1 scan over the effective image region IR in the direction (+X) and forming latent images in the effective image region IR and an operation of making a light beam SL2 scan over the effective image region IR in the direction (-X) and forming latent images in the effective image region IR. In contrast, when printing at a low resolution is instructed, latent images are formed as the so-called single-side scanning mode is executed which repeats only the light beam SL1. This embodiment thus demands that the scanning mode for the light beam is switched between high-resolution printing and low-resolution printing in accordance with the resolution information. This will be described in more detail later.

As described above, according to this embodiment, the light beam having a constant spot diameter within the effective image region IR on the surface of the photosensitive member 2 can scan while the mode is switched between the single-side scanning mode and the double-side scanning mode. Further, in this embodiment, the beam width Wb of the light beam in the sub scanning direction is equal to or wider than a scanning pitch PT which is the pitch in the single-side scanning mode. The reason of this will now be described with reference to FIGS. 7A, 7B and 7C. However, In FIGS. 7A, 7B, and 7C, the dotted-and-dashed lines are virtual lines which are indicative of the track of the scanning lines in the single-side scanning mode, while the solid lines express the light beam. When the beam width Wb in the sub scanning direction is smaller in the single-side scanning mode than the scanning pitch PT for the single-side scanning mode, latent images formed as a result of irradiation with the light beam do not connect with each other between adjacent scanning lines and a continuous line is not formed as shown in FIG. 7A. The line formed in the sub scanning direction is thus discontinued. To avoid cutting of the line formed in the sub scanning direction, as shown in FIG. 7B or 7C, the beam width Wb on the surface of the photosensitive member in the sub scanning direction must be equal to or wider than the scanning pitch PT in the sub scanning direction on the surface of the photosensitive member for the single-side scanning mode. The beam width Wb in the sub scanning direction herein referred to is a width in the sub scanning direction of a region in a light intensity distribution (hereinafter referred to as the "beam profile") at a position of a surface of the photosensitive member, the region having an intensity of not less than $1/e^2$ (where the symbol "e" denotes the bottom of natural logarithm) of a peak value in the light intensity distribution. It is possible to measure the beam width Wb of the light beam in the sub scanning direction by the following methods for example. As a measuring instrument, BeamScan Model 2180 manufactured by Photon, inc. may be used. The beam width Wb in the sub scanning direction is identified through measurement of the beam profile at such locations which are assumed to be the surface of the photosensitive member during continuous irradiation of laser of 1 mW in laser power. In general, the spot diameter of the light beam is proportional to the product of the wavelength of the light beam and the F-value within the effective image region IR on the surface of the photosensitive member. Hence, adjustment of the wavelength of the light beam or the F-value makes it possible to adjust the beam width Wb in the sub scanning direction measured by either method above to or beyond the scanning pitch PT for the single-side scanning mode.

Further, in this embodiment, the location of the drive motor MT relative to this scanning direction is set in advance so as to satisfy the following relationship. That is, the drive motor MT is disposed on the downstream side in the scanning direction (+X). In addition, on the upstream side in the scanning direction (+X), a return mirror 69 guides the scanning light beam back to the optical sensor 60 at the end of the scanning route of the scanning light beam as shown in FIG. 3. The return mirror 69 is disposed in an end portion of the scan region SR which is located on the upstream side in the scanning direction (+X), and guides back to the optical sensor 60 the scanning light beam which moves outside the effective image region IR within the scan region SR on the upstream side in the scanning direction (+X). When the optical sensor 60 receives the scanning light beam and the scanning light beam moves passed the sensor location (oscillation angle θs), the optical sensor 60 outputs a signal. In this embodiment, the horizontal synchronization sensor 60 thus functions as a horizontal synchronization read sensor which is for obtaining a synchronizing signal in accordance with which the light beam scans over the effective image region IR in the main scanning direction X, namely, a horizontal synchronizing signal Hsync based on which a latent image forming operation is controlled. The latent image forming operation according to this embodiment will now be described.

Figure 8:
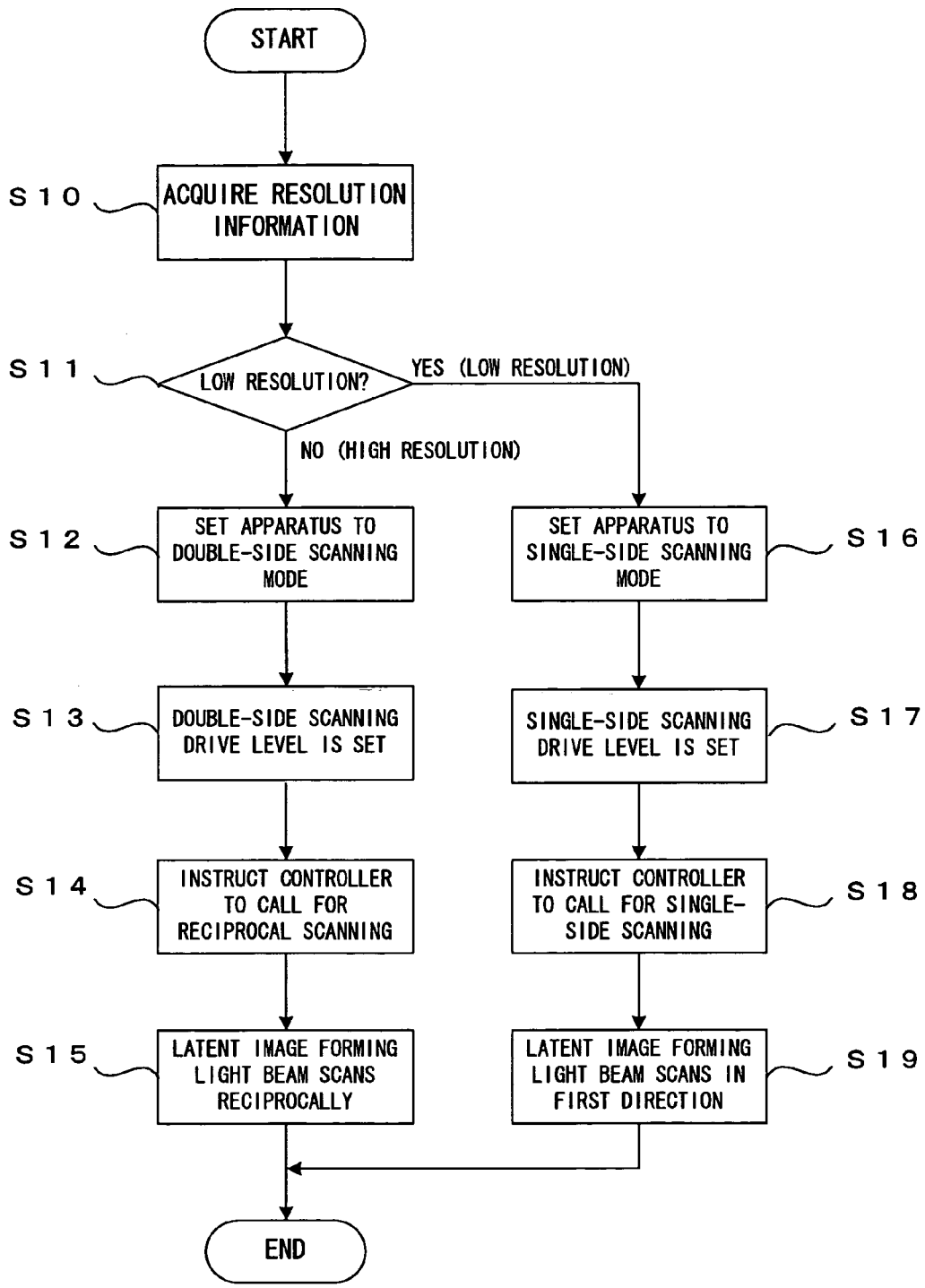
FIG. 8 is a flow chart of an operation of the image forming apparatus according to the first embodiment.
Figure 9:
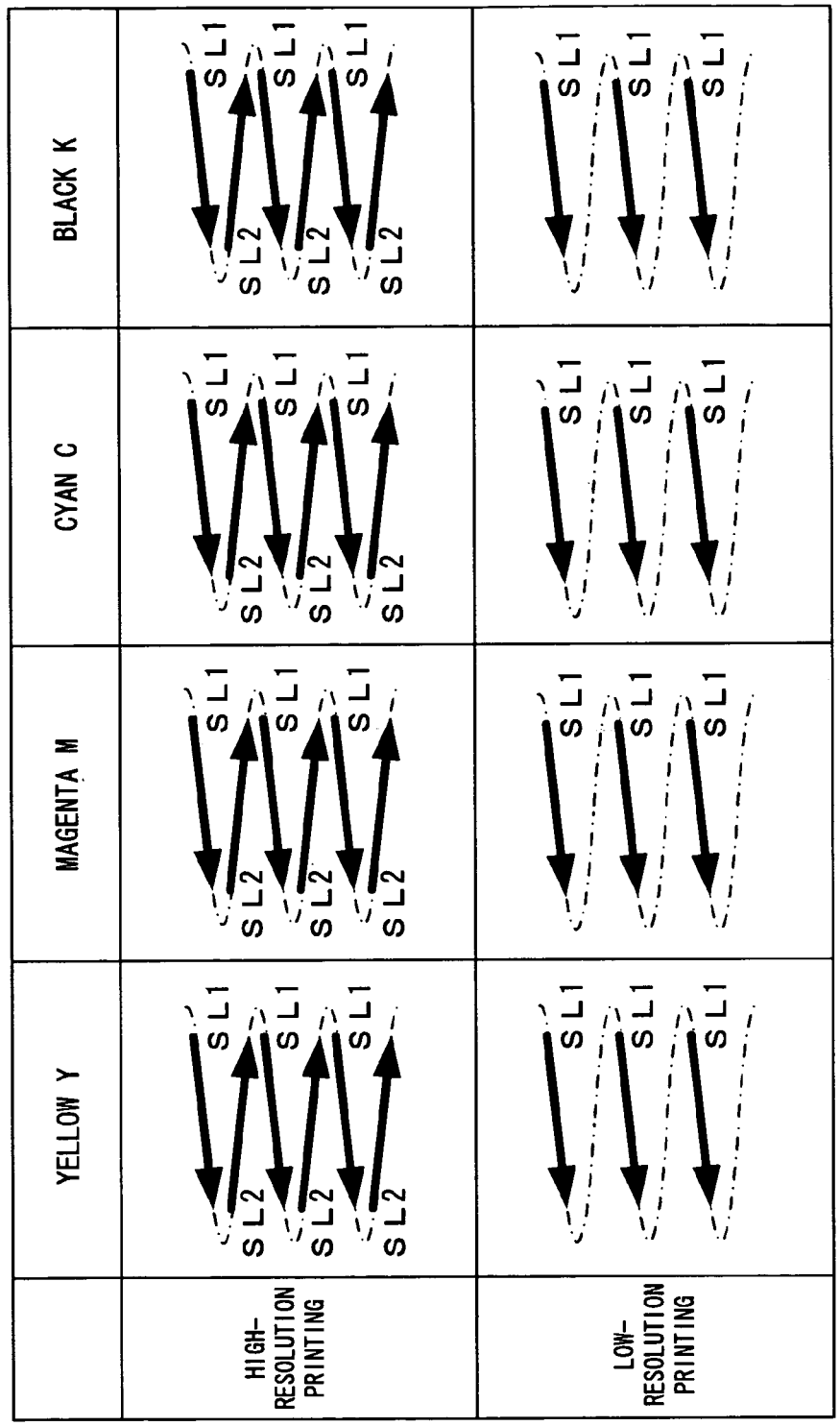
FIG. 9 is a drawing of latent images which are formed as a result of the latent image forming operation according to this embodiment.

FIG. 8 is a flow chart of an operation of the image forming apparatus according to the first embodiment. FIG. 9 is a drawing of latent images which are formed as a result of the latent image forming operation according to this embodiment. In FIG. 9, the dotted-and-dashed lines are virtual lines which are indicative of the track of the scanning lines, while the thick arrows are indicative of the light beam.

Upon receipt of a print command from an external apparatus such as the host computer 100, latent images are formed on the respective photosensitive members and a color image is formed from these latent images in accordance with the flow chart in FIG. 8. In other words, at Step S10, resolution information contained in the print command is acquired (information acquiring step). Based on the resolution information, whether the print command calls for printing at a high resolution or a low resolution is determined (Step S11).

When it is determined YES at Step S11, that is, when it is determined printing at a low resolution is demanded, Step S16 to Step S19 are executed. Through these Steps images are formed at a low resolution and transferred onto a sheet S and printing is terminated. First, at Step S16, the apparatus is set to the single-side scanning mode (scanning mode setting step). Next, the level of a light-source drive signal fed to the light source 62 from the light-source driver 1021 disposed to the exposure controller 102 is set to a single-side scanning drive level (Step S17). In consequence, at Step S19 which will be described later, the light beam scanning over the photosensitive member 2 will have the amount corresponding to the single-side scanning drive level. Further, the scanning mode switching signal which corresponds to the scanning mode determined in the manner above is supplied to the scanning mode switcher 116C of the main controller 11 (Step S18). Receiving the instruction, the scanning mode switcher 116C fixes the timing at which and the order in which tone data should be read from the corresponding line buffer, and forms latent images line by line. In short, the tone data are read from the forward-direction line buffer 116A at proper timing in the forward direction (i.e., the tone data in the order of DT1, DT2, . . . DTn), and only the light beam SL1, while being modulated based on the respective pieces of tone data, scans over the photosensitive member 2 in the first direction as shown in the bottom section of FIG. 9, whereby latent images are formed (Step S19). The so-called single-side scanning mode is executed in this fashion, and latent images are formed at a low resolution. Thus formed latent images are then developed with toner, thereby forming toner images in the four colors. The toner images are superimposed one atop the other on the intermediate transfer belt 71, thereby forming a color image. The color image is thereafter transferred onto a sheet S, and printing at a low resolution completes.

When it is determined NO at Step S11, that is, when it is determined printing at a high resolution is demanded, Step S12 to Step S15 are executed. Through these Steps which images are formed at a high resolution and transferred onto a sheet S and printing is terminated. First, at Step S12, the apparatus is set to the double-side scanning mode (scanning mode setting step). Next, the level of the light-source drive signal fed to the light source 62 from the light-source driver 1021 disposed to the exposure controller 102 is set to a double-side scanning drive level which is lower than the single-side scanning drive level (Step S13). In consequence, at Step S15 which will be described later, the light beam scanning over the photosensitive member 2 will have the amount smaller than the amount it has in the single-side scanning mode. Further, the scanning mode switching signal which corresponds to the scanning mode determined in the manner above is supplied to the scanning mode switcher 116C of the main controller 11 (Step S14). Receiving the instruction, the scanning mode switcher 116C switches the timing at which and the order in which halftoned data should be read from the corresponding line buffer, alternately every line. Therefore, high-resolution latent images are formed in the following manner. That is, as shown in the top section of FIG. 9, an operation of making the light beam SL1 scan over the effective image region IR in the direction (+X) and accordingly forming latent images within the effective image region IR and an operation of making the light beam SL2 scan over the effective image region IR in the direction (−X) and accordingly forming latent images within the effective image region IR are repeated alternately (Step S15). The so-called double-side scanning mode is executed in this fashion, and latent images are formed at a high resolution. Thus formed latent images are then developed with toner, thereby forming toner images in the four colors. The toner images are superimposed one atop the other on the intermediate transfer belt 71, thereby forming a color image. The color image is thereafter transferred onto a sheet S, and printing at a high resolution completes.

In the first embodiment, the double-side scanning drive level is lower than the single-side scanning drive level as described above. It is therefore possible to prevent adhesion of more than necessary toner in the double-side scanning mode, and to form an excellent image. The reason of this will now be described with reference to FIGS. 10 and 11. FIG. 10 is a drawing which shows overlapping of the light beam in the double-side scanning mode. FIGS. 11A and 11B are drawings which shows resultant toner images. In FIG. 10, the dotted-and-dashed line is a virtual line which is indicative of the track of the scanning lines, while the ellipses encircled by the solid lines are indicative of the light beam. As described above, in the first embodiment, the beam width of the light beam in the sub scanning direction is equal to or wider than the scanning pitch for the single-side scanning mode. Since the scanning pitch reduces at the time of switching from the single-side scanning mode to the double-side scanning mode, in a region TR shown in FIG. 10, sections on the surface of the photosensitive member scanned with the light beam excessively overlap with each other between adjacent scanning lines. Latent images formed on these adjacent scanning lines could excessively overlap with each other due to this in the double-side scanning mode and toner therefore adheres more than necessary, which causes image impairment such as too thick lines and too dark color shades.

On the contrary, according to the first embodiment, since the double-side scanning drive level is lower than the single-side scanning drive level, the amount of the light beam in the double-side scanning drive level is smaller than that in the single-side scanning drive level. A latent image formed by such a small amount of the light beam needs less toner for development. This is because for development with toner of a latent image formed on the surface of a photosensitive member, adhesion of toner is generally in accordance with a potential difference between an electric potential at a portion which bears the latent image and a developing bias potential. In other words, the larger this potential difference is, the more amount of toner adheres. Further, the smaller the light amount is for creation of the latent image portion, the smaller the potential difference between the developing bias potential and the electric potential at the latent image portion is. Hence, as shown in FIGS. 11A and 11B, in the double-side scanning mode, a latent image formed with a smaller amount of light than in the single-side scanning mode receives less toner than in the single-side scanning mode. It is therefore possible to obviate image impairment attributable to excessive adhesion of toner in the double-side scanning mode and to form an excellent image. In FIGS. 11A and 11B, the dotted-and-dashed lines are virtual lines which are indicative of the track of the scanning lines.

Further, the first embodiment requires selectively switching between the double-side scanning mode and the single-side scanning mode based on resolution information to thereby switch a resolution during printing. Switching of the scanning mode for the light beam alone, without changing oscillation of the deflection mirror surface 651, realizes selective execution of either high-resolution printing or low-resolution printing. Hence, it is possible to quickly change the resolution.

Second Embodiment

By the way, a line image such as a letter is printed favorably only when the line is formed continuously without any break, and therefore, does not demand a very high resolution. In the meantime, when one wishes to print a photograph or the like beautifully, tone reproduction is required as described in details later, and to this end, an enhanced resolution is preferred. It is therefore preferable that low-resolution printing is carried out to print a line image such as a letter through execution of the single-side scanning mode, but for printing of a photograph or the like which demands tone reproduction, the double-side scanning mode is executed and a resolution is improved.

Figure 12A:
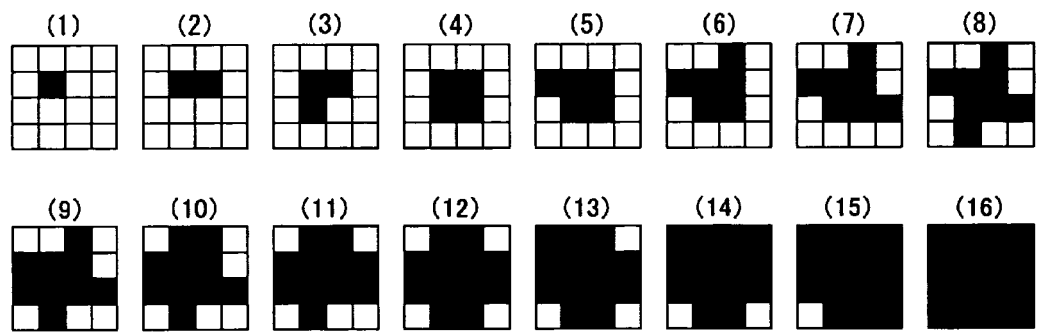
FIGS. 12A, 12B and 12C are explanatory diagrams illustrating means which realizes tone reproduction.
Figure 12B:
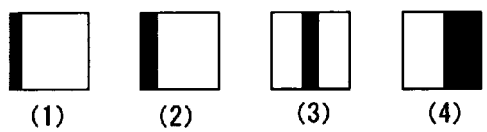
Figure 12C:
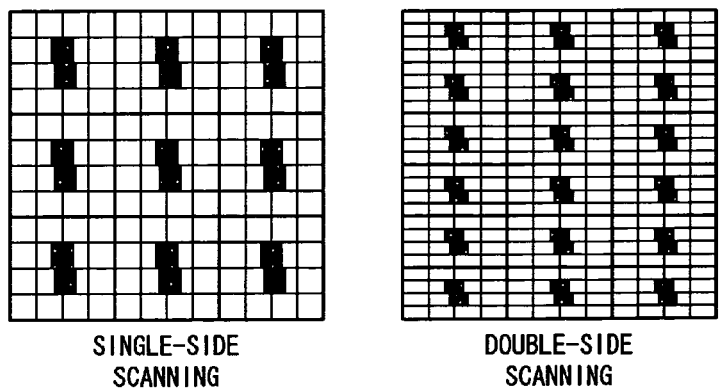

As described above, since tone reproduction is required for beautiful printing of a photograph, etc., a resolution needs be increased. The reason of this will now be described with reference to FIGS. 12A, 12B and 12C. FIGS. 12A, 12B and 12C are explanatory diagrams illustrating means which realizes tone reproduction. The means which realizes tone reproduction may be creation of one halftone dot using multiple pixels, size growth of the halftone dot and realization of a tone. For example, in FIG. 12A, 16 pixels in total, four pixels wide and four pixels high, form one halftone dot. From (1) toward (16), more pixels are exposed, with which the size of this halftone dot corresponding to the exposed part grows in accordance with a predetermined rule, thereby realizing tone reproduction over 16 shades of gray. The tone level expresses progressively darker shades from (1) toward (16). Further, as shown in FIG. 12B, (1) through (4), when only one part within one pixel is exposed, multiple tone levels are achieved within one pixel. Hence, in the event that one pixel spans 16 tone levels and 16 pixels constitute one halftone dot, one halftone dot can have 16 tone levels ×16 tone levels =256 shades of gray. However, reproduction of many tone levels requiring use of many pixels gives rise to a problem that adjacent halftone dots become more sparsely spaced and a photograph looks coarse. In light of this, for printing of a photograph, the double-side scanning mode is run as shown in FIG. 12C, thereby doubling a resolution in the sub scanning direction and halving the distances between neighboring halftone dots from their distances in the single-side scanning mode. This attains even finer printing of a photograph. According to the second embodiment therefore, whether tone reproduction is necessary is determined, and when tone reproduction is needed, the double-side scanning mode is run and printing at a high resolution is performed, whereas when tone reproduction is unnecessary, low-resolution printing is carried out in the single-side scanning mode. An operation of the apparatus for switching the scanning mode in accordance with whether tone reproduction is necessary will now be described in details with reference to FIGS. 13 and 14. The basic structure of the apparatus according to the second embodiment is the same as that of the apparatus according to the first embodiment, and therefore, the same structure will be denoted at the same or corresponding reference symbols but will not be described in redundancy.

Figure 13:
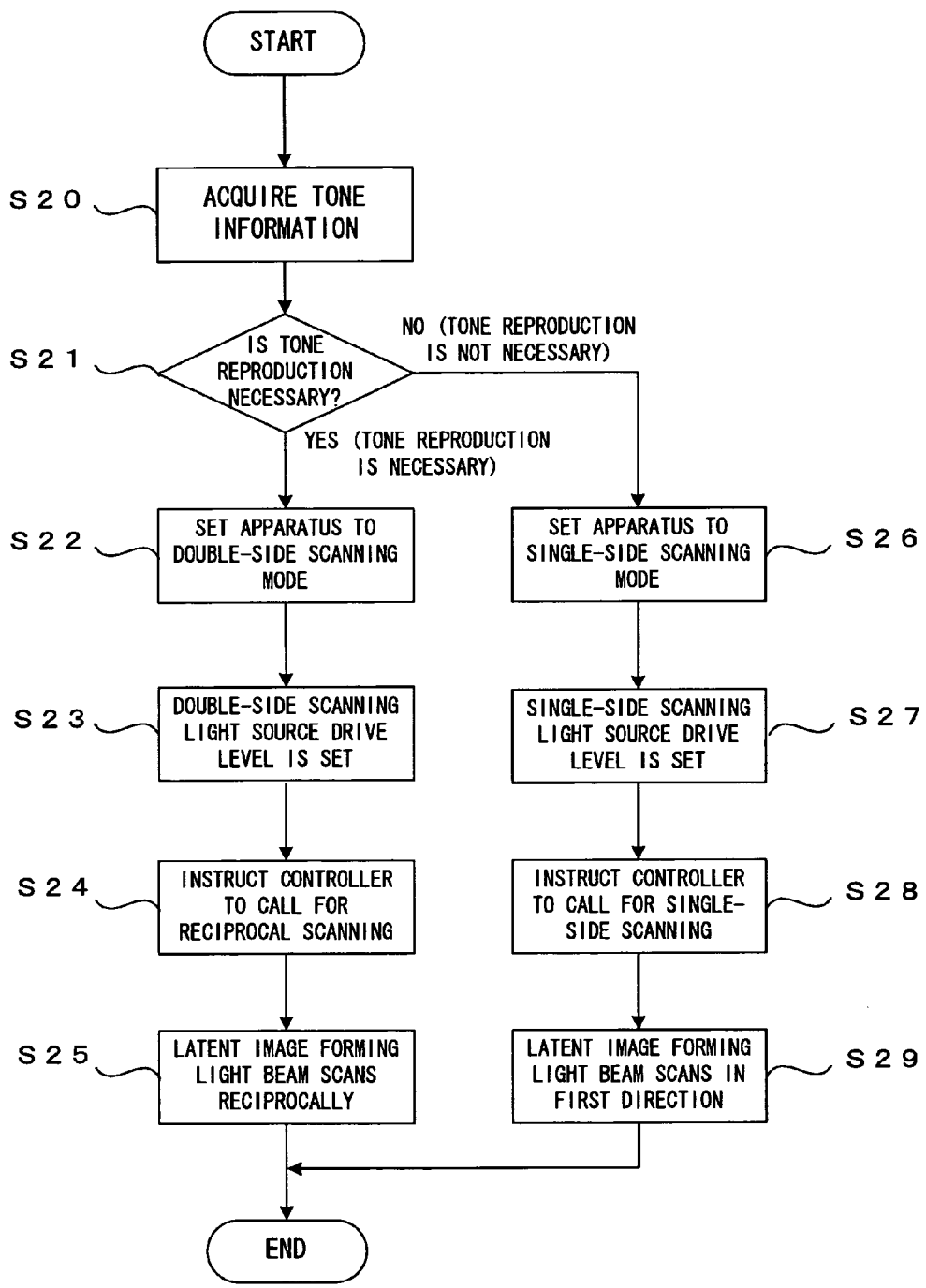
FIG. 13 is a flow chart of an operation of the image forming apparatus according to the second embodiment.
Figure 14:
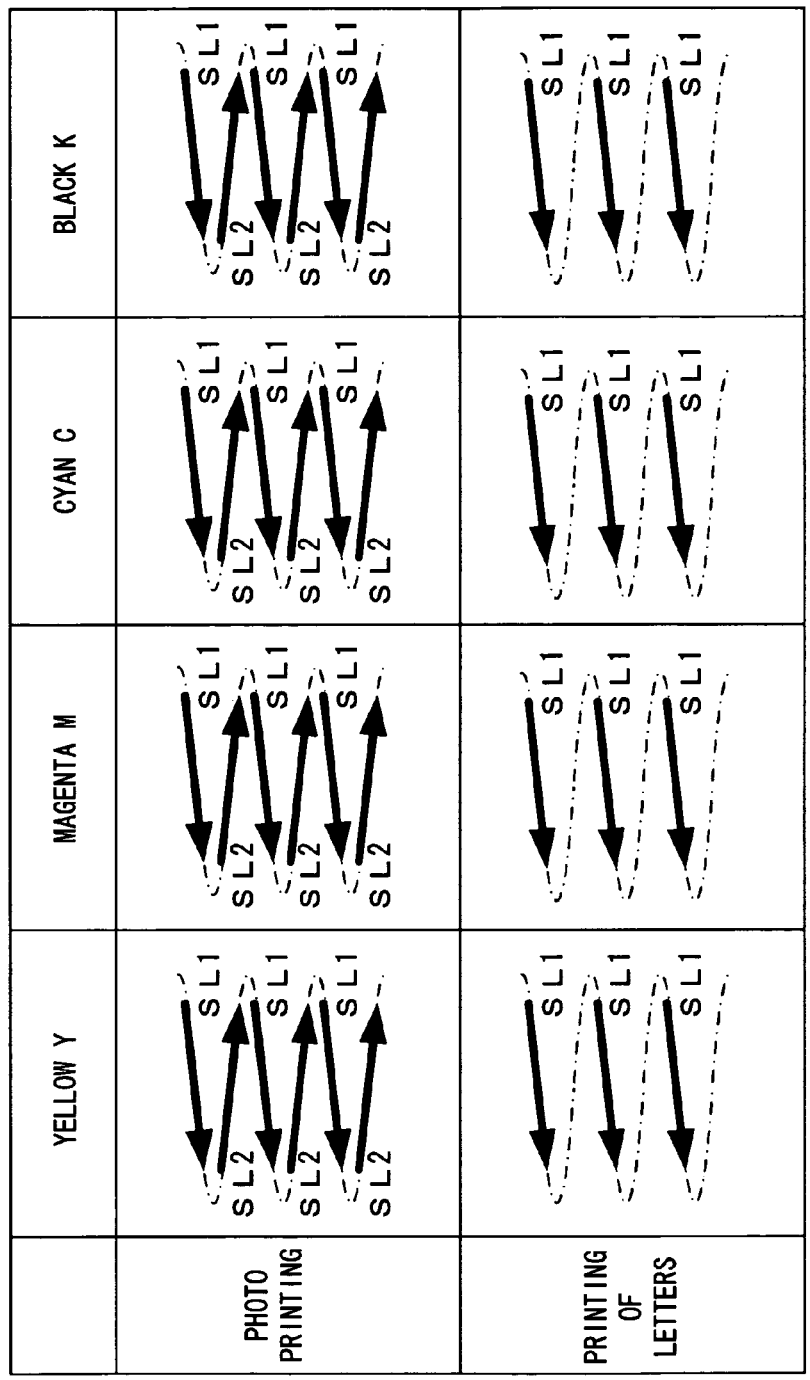
FIG. 14 is a drawing of latent images which are formed as a result of the latent image forming operation according to the second embodiment.

FIG. 13 is a flow chart of an operation of the image forming apparatus according to the second embodiment. FIG. 14 is a drawing of latent images which are formed as a result of the latent image forming operation according to the second embodiment. In FIG. 14, the dotted-and-dashed lines are virtual lines which are indicative of the track of the scanning lines, while the thick arrows are indicative of the light beam. In the second embodiment, upon receipt of a print command from an external apparatus such as the host computer 100, latent images are formed on the respective photosensitive members and a color image is formed from these latent images in accordance with the flow chart in FIG. 13. In other words, at Step S20, resolution information contained in the print command is acquired (information acquiring step). Whether tone reproduction is necessary is then determined (Step S21).

When it is determined NO at Step S21, that is, when it is determined that tone reproduction is unnecessary, Step S26 to Step S29 are executed. Through these Steps which images are formed and transferred onto a sheet S and printing is terminated. First, at Step S26, the apparatus is set to the single-side scanning mode (scanning mode setting step). Next, the level of the light-source drive signal fed to the light source 62 from the light-source driver 1021 disposed to the exposure controller 102 is set to the single-side scanning drive level (Step S27). In consequence, at Step S29 which will be described later, the light beam scanning over the photosensitive member 2 will have the amount corresponding to the single-side scanning drive level. Further, the scanning mode switching signal which corresponds to the scanning mode determined in the manner above is supplied to the scanning mode switcher 116C of the main controller 11 (Step S28). Receiving the instruction, the scanning mode switcher 116C fixes the timing at which and the order in which tone data should be read from the corresponding line buffer, and forms latent images line by line. In short, the tone data are read from the forward-direction line buffer 116A at proper timing in the forward direction (i.e., the tone data in the order of DT1, DT2, ... DTn), and only the light beam SL1, while being modulated based on the respective pieces of tone data, scans over the photosensitive member 2 in the first direction as shown in the bottom section of FIG. 14, whereby latent images are formed (Step S29). The so-called single-side scanning mode is executed in this fashion, and latent images are formed. Thus formed latent images are then developed with toner, thereby forming toner images in the four colors. The toner images are superimposed one atop the other on the intermediate transfer belt 71, thereby forming a color image. The color image is thereafter transferred onto a sheet S, and printing of letters completes.

When it is determined YES at Step S21, that is, when it is determined that tone reproduction is necessary, Step S22 to Step S25 are executed. Through Steps which images are formed at a high resolution and transferred onto a sheet S and printing is terminated. First, at Step S22, the apparatus is set to the double-side scanning mode (scanning mode setting step). Next, the level of the light-source drive signal fed to the light source 62 from the light-source driver 1021 disposed to the exposure controller 102 is set to the double-side scanning drive level which is lower than the single-side scanning drive level (Step S23). In consequence, at Step S25 which will be described later, the light beam scanning over the photosensitive member 2 will have the amount smaller than the light amount it has in the single-side scanning mode. Further, the scanning mode switching signal which corresponds to the scanning mode determined in the manner above is supplied to the scanning mode switcher 116C of the main controller 11 (Step S24). Receiving the instruction, the scanning mode switcher 116C switches the timing at which and the order in which halftoned data should be read from the corresponding line buffer, alternately every line. Therefore, latent images are formed in the following manner. That is, as shown in the top section of FIG. 14, an operation of making the light beam SL1 scan as the light beam over the effective image region IR in the direction (+X) and accordingly forming latent images within the effective image region IR and an operation of making the light beam SL2 scan over the effective image region IR in the direction (−X) and accordingly forming latent images within the effective image region IR are repeated alternately (Step S25). The so-called double-side scanning mode is executed in this fashion, and latent images are formed. Thus formed latent images are then developed with toner, thereby forming toner images in the four colors. The toner images are superimposed one atop the other on the intermediate transfer belt 71, thereby forming a color image. The color image is thereafter transferred onto a sheet S, and photo printing completes.

As described above, in the second embodiment, since the double-side scanning mode is run for photo printing which requires tone reproduction, a resolution in the sub scanning direction doubles that during execution of the single-side scanning mode, which realizes fine photo printing. In addition, the double-side scanning drive level which is lower than the single-side scanning drive level. This prevents adhesion of more than necessary toner in the double-side scanning mode, and attains photo printing with a favorable image.

Third Embodiment

FIG. 15 is an explanatory diagram on the scanning pitch in the double-side scanning mode. In FIG. 15, the dotted-and-dashed line is a virtual line which is indicative of the track of the scanning lines. In FIG. 15, as denoted at the reference symbols PT1 through PT3, the scanning pitch in the sub scanning direction is not constant in the double-side scanning mode. Hence, if the amount of the light beam is too little in the double-side scanning mode, the amount of adhering toner reduces too much, which in turn causes a problem of image impairment that in a section with a wide scanning pitch, a line formed in the sub scanning direction gets disconnected. Noting this, the third embodiment requires that the double-side scanning drive level set in the light-source driver 1021 in the double-side scanning mode is determined in accordance with the maximum value of the scanning pitch in the sub scanning direction for the double-side scanning mode. That is, the double-side scanning drive level is determined so that the width of a toner image in the sub scanning direction formed on the surface of the photosensitive member 2 will be the same or beyond the maximum value of the scanning pitch in the sub direction in the double-side scanning mode. This structure ensures that even in a section where the scanning pitch is the maximum, the line formed in the sub scanning direction is not cut as shown in FIG. 15 and that an excellent image is formed. The basic structure of the apparatus according to the third embodiment is the same as that of the apparatus according to the first embodiment, and therefore, the

Fourth Embodiment

By the way, as shown in FIGS. 7B and 7C, according to the embodiments described above, the beam width of the light beam in the sub scanning direction is equal to or wider than the scanning pitch in the single-side scanning mode. Because of this, the light beams overlap with each other between adjacent scanning lines in the single-side scanning mode as shown in FIG. 7C. The influence of the degree of the overlapping of the light beams over an image which is formed in the double-side scanning mode will now be considered. When the overlapping of the light beams is relatively large, even in the double-side scanning mode, sections scanned with the light beam excessively overlap with each other between adjacent scanning lines. On the contrary, when the overlapping of the light beams is relatively small, in the double-side scanning mode as well, the degree of overlapping of sections scanned with the light beams overlap with each other between adjacent scanning lines is relatively small. It then follows that independently of the degree of the overlapping of the light beams, if the amount of the light beam is constant in the double-side scanning mode, the following image impairment could occur. That is, for example, significant overlapping could lead to image impairment due to adhesion of unnecessary toner to overlaps of the light beams in the double-side scanning mode. On the contrary, when the degree of overlapping is small, image impairment of a disconnected line which is formed in the sub scanning direction could occur in the double-side scanning mode.

Noting this, the fourth embodiment requires that the double-side scanning drive level which is set in the light-source driver 1021 in the double-side scanning mode is determined in accordance with the ratio of the beam width of the light beam in the sub scanning direction to the scanning pitch in the sub scanning direction for the single-side scanning mode. That is, when set in accordance with this ratio, the double-side scanning drive level is suitable to the degree of the overlapping of the light beams described above. Describing in more specific details, when the degree of overlapping of the light beams is large, the double-side scanning drive level is set low such that the amount of the light beam will be relatively small, whereas when the degree of the overlapping of the light beams is small, the double-side scanning drive level is set high such that the amount of the light beam will be relatively large. This structure prevents the impairment addressed above. In other words, when the degree of the overlapping is relatively significant, the amount of the light beam is suppressed, which prevents excessive toner adhesion and allows forming an excellent image. On the contrary, when the degree of the overlapping is relatively small, the light beam is in a certain proper amount, and therefore, it is possible to avoid image impairment that the amount of the light beam is excessively suppressed, the amount of adhering toner decreases too much and a line formed in the sub scanning direction in the double-side scanning mode gets disconnected. Hence, it is possible, to form an excellent image. The basic structure of the apparatus according to the fourth embodiment is the same as that of the apparatus according to the first embodiment, and therefore, the same structure will be denoted at the same or corresponding reference symbols but will not be described in redundancy.

Fifth Embodiment

A consideration will now be given on a situation that the proportion of the effective image region to the scan region (scanning efficiency) is small and the minimum scanning pitch can be viewed approximately the same as the maximum scanning pitch in the double-side scanning mode as shown in FIG. 16. In FIG. 16, the dotted-and-dashed line is a virtual line which is indicative of the track of the scanning lines. Under the illustrated circumstance, the scanning pitch in the double-side scanning mode is considered roughly half that in the single-side scanning mode. Noting this, the fifth embodiment requires that the double-side scanning drive level set in the light-source driver 1021 in the double-side scanning mode is determined so that the amount of the light beam in the double-side scanning mode will be smaller than but at least half that in the single-side scanning mode or more. By means of the structure which sets the amount of the light beam in the double-side scanning mode to half that in the single-side scanning mode or a greater amount, the width in the sub scanning direction of a toner image formed in the double-side scanning mode is approximately half the width in the sub scanning direction of a toner image formed in the single-side scanning mode or wider. This prevents image impairment that an excessively suppressed amount of the light beam in the double-side scanning mode reduces the amount of adhering toner too much and a line formed in the sub scanning direction in the double-side scanning mode gets disconnected, and instead, permits forming a favorable image. The basic structure of the apparatus according to the fifth embodiment is the same as that of the apparatus according to the first embodiment, and therefore, the same structure will be denoted at the same or corresponding reference symbols but will not be described in redundancy.

Sixth Embodiment

Figure 17A:
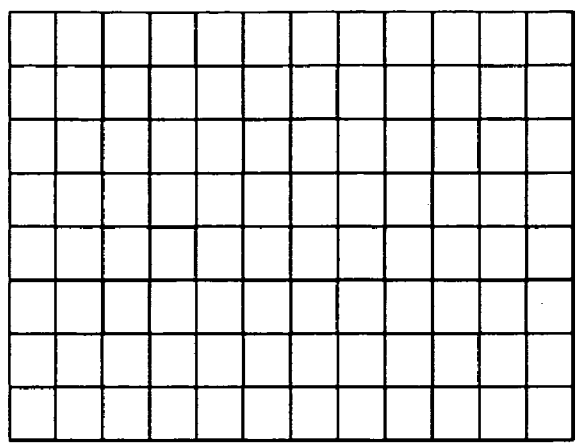
FIGS. 17A, 17B and 17C are drawings which show half-toning using a line screen.
Figure 17B:
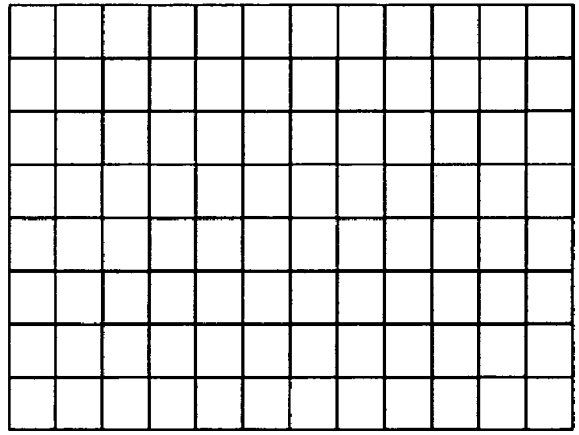
Figure 17C:
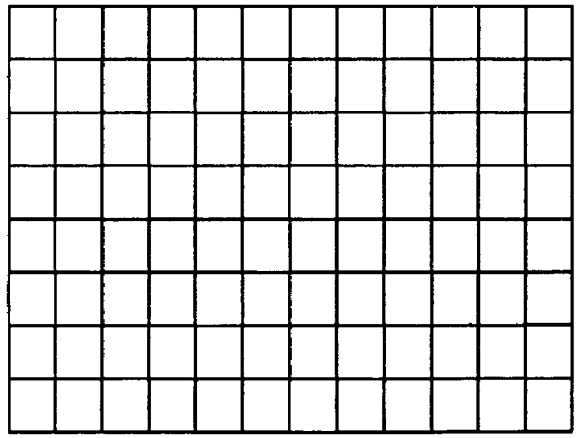

The sixth embodiment is similar to the preceding embodiments described above in that the image processor 115 halftones corrected tone data to realize a tone and the resulting halftoned tone data are fed to the two types of line buffers 116A and 116B, except for the following difference. That is, halftoning according to the sixth embodiment uses a line screen. As for the sixth embodiment, the difference from the earlier embodiments described above will be mainly described. The common portions will be denoted at corresponding reference symbols but will not be described. A line screen changes the line widths of plural lines extending in a predetermined direction in accordance with tones for tone reproduction. FIGS. 17A, 17B and 17C are drawings which show halftoning using a line screen. During halftoning using such a line screen, as shown in FIGS. 17A through 17C, as the lines are thickened in accordance with an increase of the tone level, tone reproduction is attained.

The scanning mode switcher 116C receives thus output halftoned tone data, and based on a scanning mode switching signal, outputs at appropriate timing to the pulse modulator 117 only the halftoned tone data output from one of the line buffers. The principal reason of disposing the two types of line buffers 116A and 116B is to deal with different scanning modes for the light beam in accordance with the printing mode as described later. The scanning mode switcher 116C further ensures that the pulse modulator 117 receives the tone data at such timing and in such an order corresponding to each color component. In this embodiment, the line buffers 116A and 116B and the scanning mode switcher 116C thus correspond to the "scanning mode controller" of the invention.

In addition, the image forming apparatus having this structure is capable of making the light beam scan in the main scanning direction back and forth. That is, the light bean can scan in both the direction (+X) and the direction (−X). The tone data constituting the 1-line image data are temporarily stored in a storage part (the line buffers 116A and 116B) as described above, and the scanning mode switcher 116C provides the pulse modulator 117 with the tone data at appropriate timing and in a proper order. For instance, when the direction is switched to the direction (+X), as shown in FIG. 6A, the tone data are read out from the line buffer 116A in the order of DT1, DT2, . . . DTn and beam spots are irradiated upon the photosensitive member 2 in the first direction (+X) based on each piece of the tone data, whereby line latent images LI(+X) are formed. On the contrary, when the direction is switched to the direction (−X), as shown in FIG. 6B, the tone data are read out from the line buffer 116B in the order of DTn, DT(n−1), . . . DT1 and beam spots are irradiated upon the photosensitive member 2 in the second direction (−X) based on each piece of the tone data, whereby line latent images LI(−X) are formed. The light beam for latent image formation is thus changed for different printing modes or different lines. Describing in more specific details, in this embodiment, the RAM 107 temporarily stores information related to a resolution (resolution information) contained in a print command. In the event that printing at a high resolution is instructed, latent images are formed as the so-called double-side scanning mode is executed which alternately repeats an operation of making a light beam SL1 scan over the effective image region IR in the direction (+X) and forming latent images in the effective image region IR and an operation of making a light beam SL2 scan over the effective image region IR in the direction (−X) and forming latent images in the effective image region IR. In contrast, when printing at a low resolution is instructed, latent images are formed as the so-called single-side scanning mode is executed which repeats only the light beam SL1. This embodiment thus demands that the scanning mode for the light beam is switched between high-resolution printing and low-resolution printing in accordance with the resolution information. This will be described in more detail later.

Figure 18:
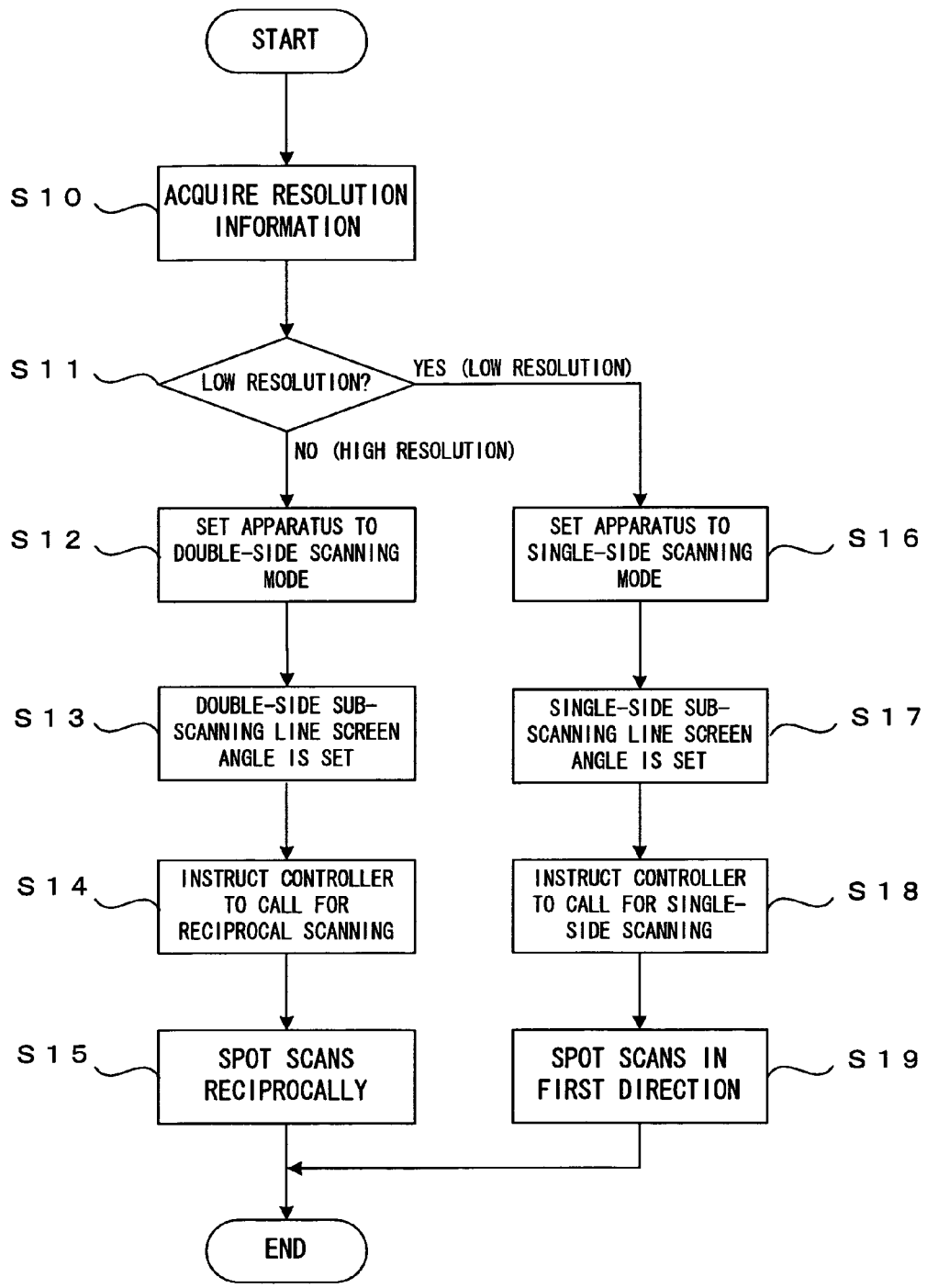
FIG. 18 is a flow chart of the latent image forming operation in the sixth embodiment.

The latent image forming operation in the apparatus according to the sixth embodiment will now be described. FIG. 18 is a flow chart of the latent image forming operation in the sixth embodiment. Upon receipt of a print command from an external apparatus such as the host computer 100, latent images are formed on the respective photosensitive members and a color images are formed from these latent images in accordance with the flow chart in FIG. 18. In other words, at Step S10, resolution information contained in the print command is acquired (information acquiring step). Based on the resolution information, whether the print command calls for printing at a high resolution or a low resolution is determined (Step S11).

When it is determined YES at Step S11, that is, when it is determined printing at a low resolution is demanded, Step S16 to Step S19 are executed. Through these Steps images are formed at a low resolution and transferred onto a sheet S and printing is terminated. First, at Step S16, the apparatus is set to the single-side scanning mode (scanning mode setting step). Next, the sub-scanning line screen angles for the single-side scanning mode (hereinafter called single-side scanning line screen angles) are set (Step S17). The sub-scanning line screen angle herein referred to is the angle between the respective lines of the line screen for each color component and the sub-scanning direction Y This embodiment, as shown in FIG. 19A, requires setting the single-side sub-scanning line screen angles MYK, MMK, MCK and MKK respectively for the color components of yellow (Y), magenta (M), cyan (C) and black (K). The single-side sub-scanning line screen angles MYK, MMK, MCK and MKK for the respective color components are different in order to suppress development of so-called moire fringes. Moire fringes are known to develop when the sub-scanning line screen angles are out of color registration. It is well established empirical knowledge that to make moire fringes less noticeable, the sub-scanning line screen angles are most preferably shifted relatively to each other by about 30 degrees between two colors. Since yellow (Y) is least noticeable to human eyes as compared to the other colors, the sub-scanning line screen angles for the other colors of magenta (M), cyan (C) and black (K) than yellow (Y) are shifted by 30 degrees from each other. In this embodiment therefore, at the stage of setting the single-side sub-scanning line screen angles, the single-side sub-scanning line screen angle MYK for yellow (Y) is set to 90 degrees, the single-side sub-scanning line screen angle MCK for cyan (C) is set to 75 degrees, the single-side sub-scanning line screen angle MKK for black (K) is set to 45 degrees, and the single-side sub-scanning line screen angle MMK for magenta (M) is set to 15 degrees.

Further, the scanning mode switching signal which corresponds to the scanning mode determined in the manner above is supplied to the scanning mode switcher 116C of the main controller 11 (Step S18). Receiving the instruction, the scanning mode switcher 116C fixes the timing at which and the order in which tone data should be read from the line buffer, and forms latent images line by line. In short, the tone data are read from the forward-direction line buffer 116A at proper timing in the forward direction (i.e., the tone data in the order of DT1, DT2, . . . DTn), and only a beam spot running in the first direction, while being modulated based on the respective pieces of tone data, scans over the photosensitive member 2, whereby latent images are formed (Step S19). The so-called single-side scanning mode is executed in this fashion, and latent images are formed at a low resolution. Thus formed latent images are then developed with toner, thereby forming toner images in the four colors. The toner images are superimposed one atop the other on the intermediate transfer belt 71, thereby forming a color image. The color image is thereafter transferred onto a sheet S, and printing at a low resolution completes.

When it is determined NO at Step S11, that is, when it is determined printing at a high resolution is demanded, Step S12 to Step S15 are executed. Through these Steps which images are formed at a high resolution and transferred onto a sheet S and printing is terminated. First, at Step S12, the apparatus is set to the double-side scanning mode (scanning mode setting step). Next, the sub-scanning line screen angles for the double-side scanning mode (double-side sub-scanning line screen angles) are set (Step S13). This embodiment, as shown in FIG. 19B, requires setting the double-side sub-scanning line screen angles MYR, MMR, MCR and MKR respectively for the color components of yellow (Y), magenta (M), cyan (C) and black (K). The double-side sub-scanning line screen angle is set smaller than the single-side scanning line screen angle for each color, while maintaining inter-color angles constant. Describing in more specific details, the double-side sub-scanning line screen angle MYR for yellow (Y) is set to 75 degrees, the double-side sub-scanning line screen angle MCR for cyan (C) is set to 30 degrees, the double-side sub-scanning line screen angle MKR for black (K) is set to 60 degrees, and the double-side sub-scanning line screen angle MMR for magenta (M) is set to 0 degree.

Further, the scanning mode switching signal which corresponds to the scanning mode determined in the manner above is supplied to the scanning mode switcher 116C of the main controller 11 (Step S14). Receiving the instruction, the scanning mode switcher 116C switches the timing at which and the order in which tone data should be read from the line buffer, alternately every line. Therefore, latent images are formed at a high resolution in the following manner. That is, an operation of making a beam spot scan on the effective image region IR in the direction (+X) and accordingly forming latent images within the effective image region IR and an operation of making a beam spot scan on the effective image region IR in the direction (−X) and accordingly forming latent images within the effective image region IR are repeated alternately (Step S15). The so-called double-side scanning mode is executed in this fashion, and latent images are formed at a high resolution. Thus formed latent images are then developed with toner, thereby forming toner images in the four colors. The toner images are superimposed one atop the other on the intermediate transfer belt 71, thereby forming a color image. The color image is thereafter transferred onto a sheet S, and high-resolution printing completes.

Figure 20:
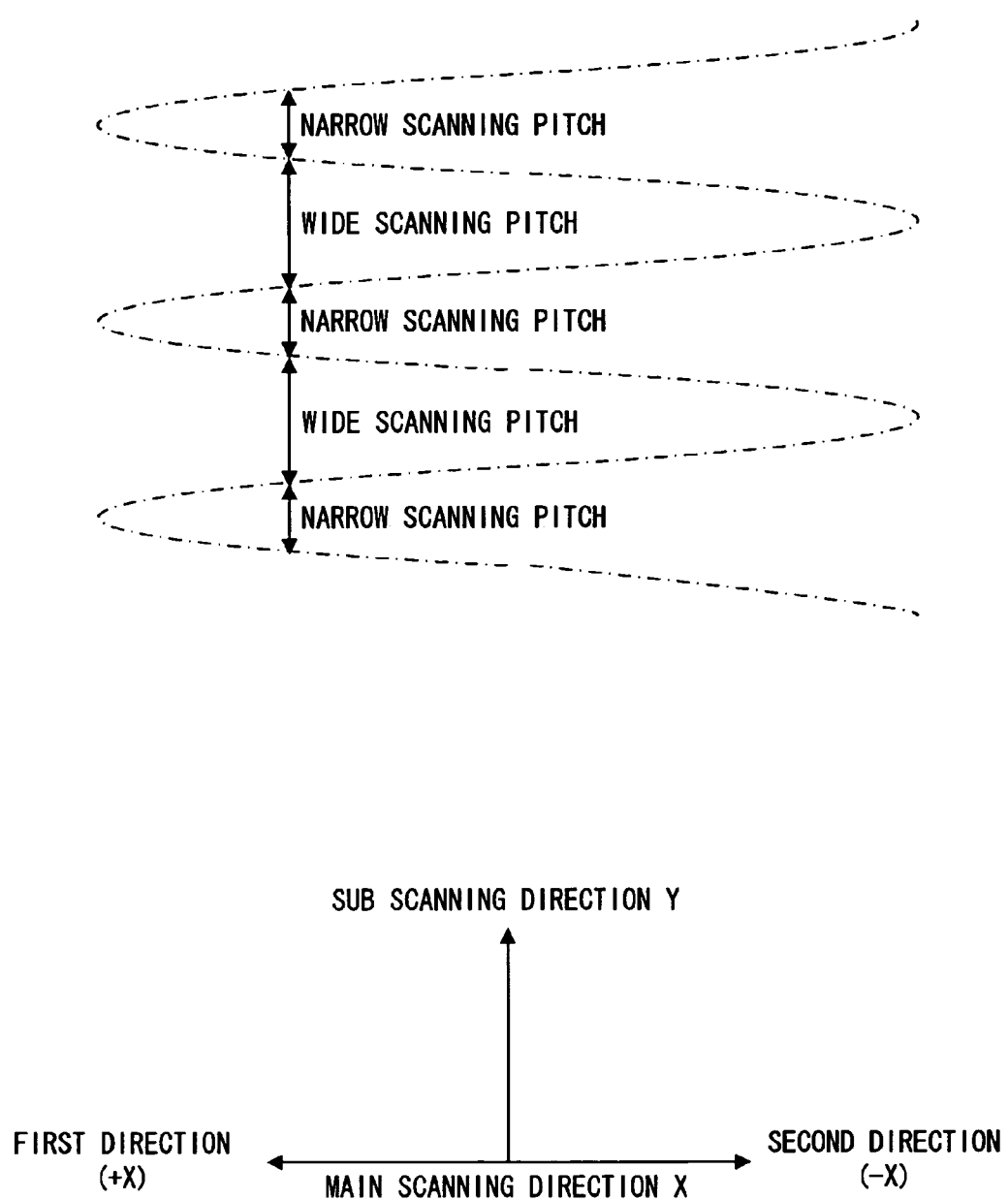
FIG. 20 is a drawing of the scanning pitch in the double-side scanning mode.

As described above, in the sixth embodiment, the sub-scanning line screen angles for the double-side scanning mode are set so that the angle (the sub-scanning line screen angle) between the respective lines of a line screen and the sub scanning direction in the double-side scanning mode is smaller than that in the single-side scanning mode. This makes it possible to suppress periodic appearances of thin sections and thick sections of a line latent image due to the unevenness of the scanning pitch in the sub scanning direction for the double-side scanning mode. As a result, even in the double-side scanning mode, favorable tone reproduction is attained. The reason of this will now be described in details. FIG. 20 is a drawing of the scanning pitch in the double-side scanning mode. FIG. 21 is an explanatory diagram regarding a pattern attributable to the unevenness of the scanning pitch. In the sixth embodiment, as described above, a beam spot reciprocally scans on the surface of the photosensitive member 2 in the main scanning direction X while driving the surface of the photosensitive member 2 in the sub scanning direction Y which is approximately orthogonal to the main scanning direction X. Since the scanning track of the beam spots on the surface of the photosensitive member 2 in the double-side scanning mode is as denoted at the dotted-and-dashed line in FIG. 20, the scanning pitch in the sub scanning direction Y is not constant. The unevenness of the scanning pitch in the sub scanning direction Y is particularly remarkable near the both ends of the scanning track in the main scanning direction X. On the contrary, the sixth embodiment realizes tone reproduction using a line screen which changes the line widths of lines extending in a predetermined direction in accordance with tones. Hence, as shown in FIG. 21, when a line latent image extending in a predetermined direction is formed in the double-side scanning mode for tone reproduction, because of the varying scanning pitch in the sub scanning direction Y, thin sections in which the width of the line latent image is narrow and thick section in which the width of the line latent image is wide are formed periodically in the line latent image and the line latent image therefore has an unwanted pattern. The solid lines in FIG. 21 denote the scanning lines, while the circles express beam spots which are created on the surface of the photosensitive member. Such a pattern could obstruct favorable tone reproduction and cause image impairment.

Figure 22A:
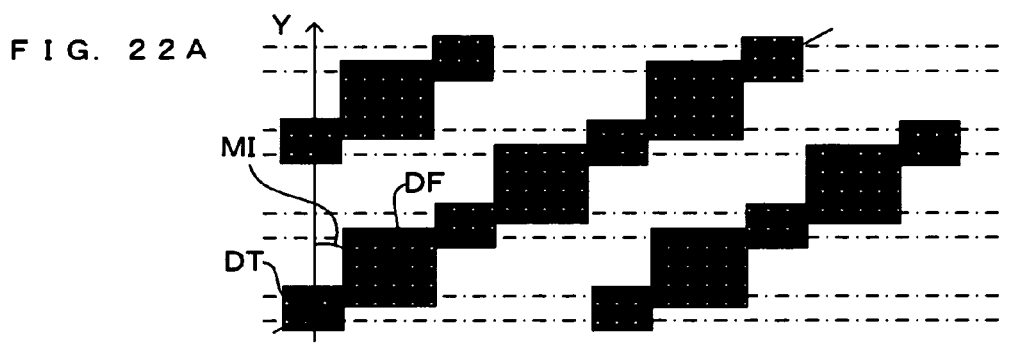
FIGS. 22A, 22B, 22C and 22D are drawings showing a ship between width of line latent image and the angle between a line screen and the sub scanning direction.
Figure 22B:
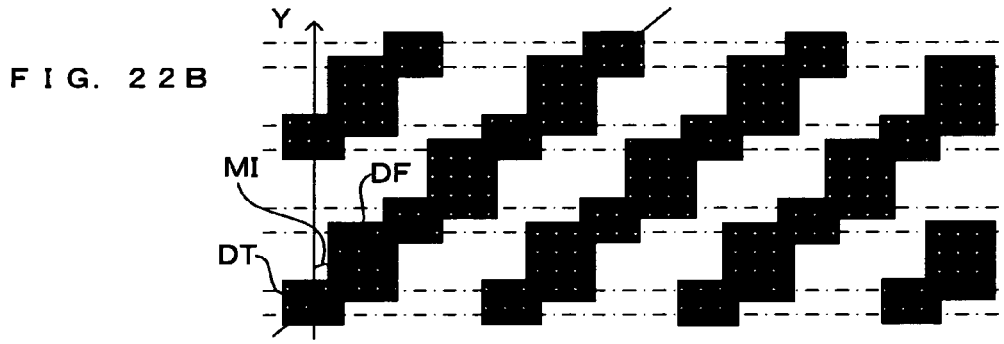
Figure 22C:
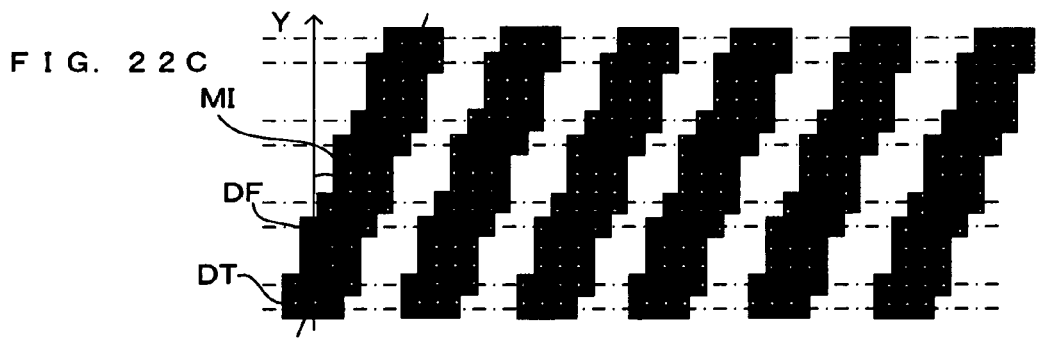

However, in this embodiment, the sub-scanning line screen angles for each scanning mode are set so that the angle (the sub-scanning line screen angle) between the respective lines of the line screen and the sub scanning direction in the double-side scanning mode is smaller than that in the single-side scanning mode. This configuration makes it possible in the double-side scanning mode to suppress periodic appearances of thin sections and thick sections of a line latent image due to the unevenness of the scanning pitch in the sub scanning direction. FIGS. 22A, 22B, 22C and 22D are drawings showing a relationship between width of line latent image and the angle between a line screen and the sub scanning direction. In FIGS. 22A, 22B, 22C and 22D, the dotted-and-dashed lines are indicative of the scanning lines, the squares denote latent images formed in areas where the scanning pitch is narrow (thin section) or wide (thick section), and the solid straight lines denote the directions in which the respective lines of the line screen extend. From FIGS. 22A toward 22D, the line screen angle MI becomes smaller. In FIG. 22A where the angle is the largest, the line width DT in a narrow scanning-pitch area and the line width DF in a wide scanning-pitch area are apparently different. However, as the line screen angle MI becomes smaller from FIG. 22C toward FIG. 22D, the difference between the line width DT in the narrow scanning-pitch area and the line width DF in the wide scanning-pitch area shrinks. It is thus possible to suppress the difference between the line width DT in the narrow scanning-pitch area and the line width DF in the wide scanning-pitch area as the line screen angle MI is reduced. According to this embodiment which requires setting the angle (the sub-scanning line screen angles) between the respective lines of the line screen and the sub scanning direction smaller in the double-side scanning mode than in the single-side scanning mode, it is possible in the double-side scanning mode to suppress periodic appearances of thin sections and thick sections of a line latent image due to the unevenness of the scanning pitch in the sub scanning direction. As a result, even in the double-side scanning mode, favorable tone reproduction is achieved.

Figure 22D:
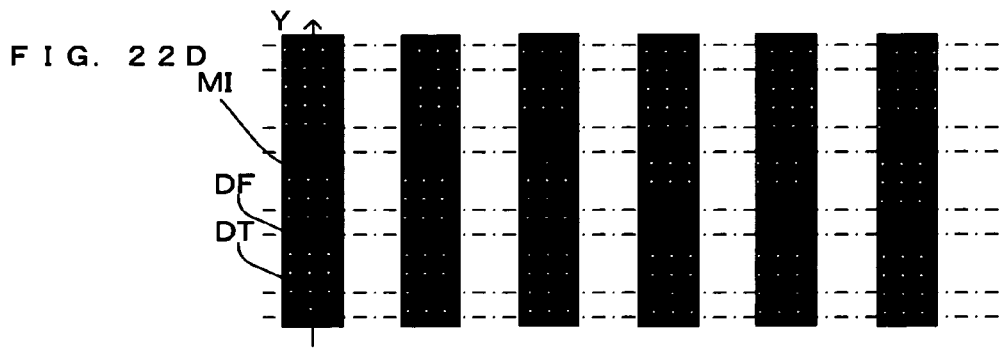

Further, in the sixth embodiment, the sub-scanning line screen angle MMR for magenta (M) for the double-side scanning mode is 0 degree. In this condition, as shown in FIG. 22D, the line width DF and the line width DT are approximately equal to each other. That is, in this embodiment, since the angle (the double-side sub-scanning line screen angle) between the respective lines of the line screen and the sub scanning direction for the double-side scanning mode for magenta (M) is 0 degree, an influence of the varying scanning pitch in the sub scanning direction in the double-side scanning mode over tone reproduction is completely suppressed and excellent tone reproduction is realized.

Seventh Embodiment

Figure 23A:
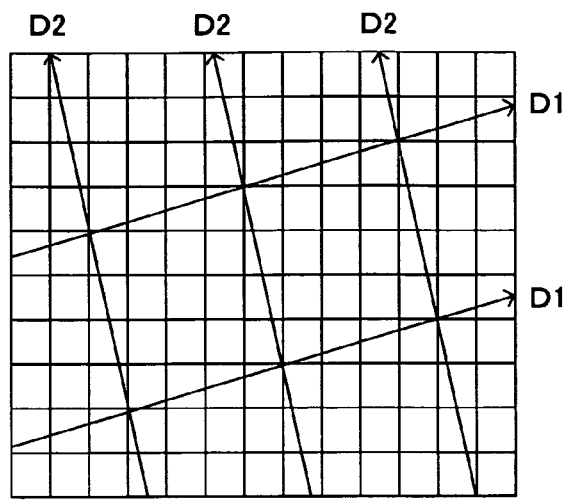
FIGS. 23A, 23B and 23C are drawings showing halftone screen
Figure 23B:
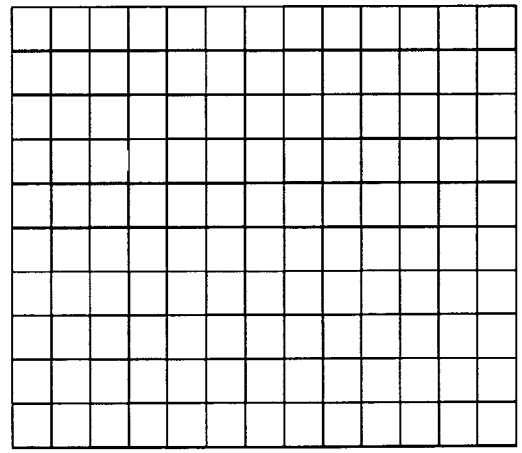
Figure 23C:
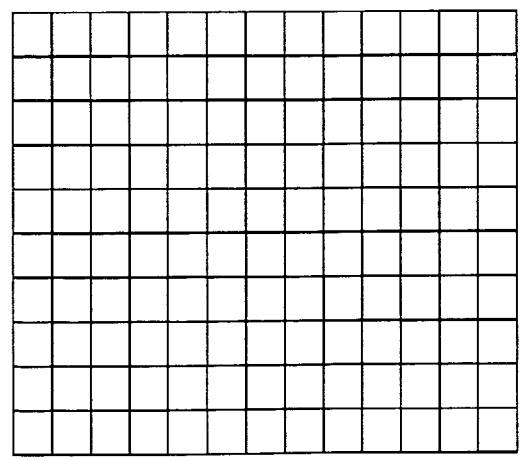

While the sixth embodiment requires halftoning using a line screen, the seventh embodiment requires halftoning using a halftone screen. As shown in FIGS. 23A, 23B and 23C for tone reproduction, a halftone screen grows halftone dots which are spaced apart in predetermined two directions D1 and D2 in accordance with tone levels. In FIGS. 23A, 23B and 23C, from FIG. 23A toward FIG. 23C, shades become darker. The basic structure of the apparatus according to the seventh embodiment is the same as that of the apparatus according to the first embodiment, and therefore, the same structure will be denoted at the same or corresponding reference symbols but will not be described in redundancy.

Figure 24:
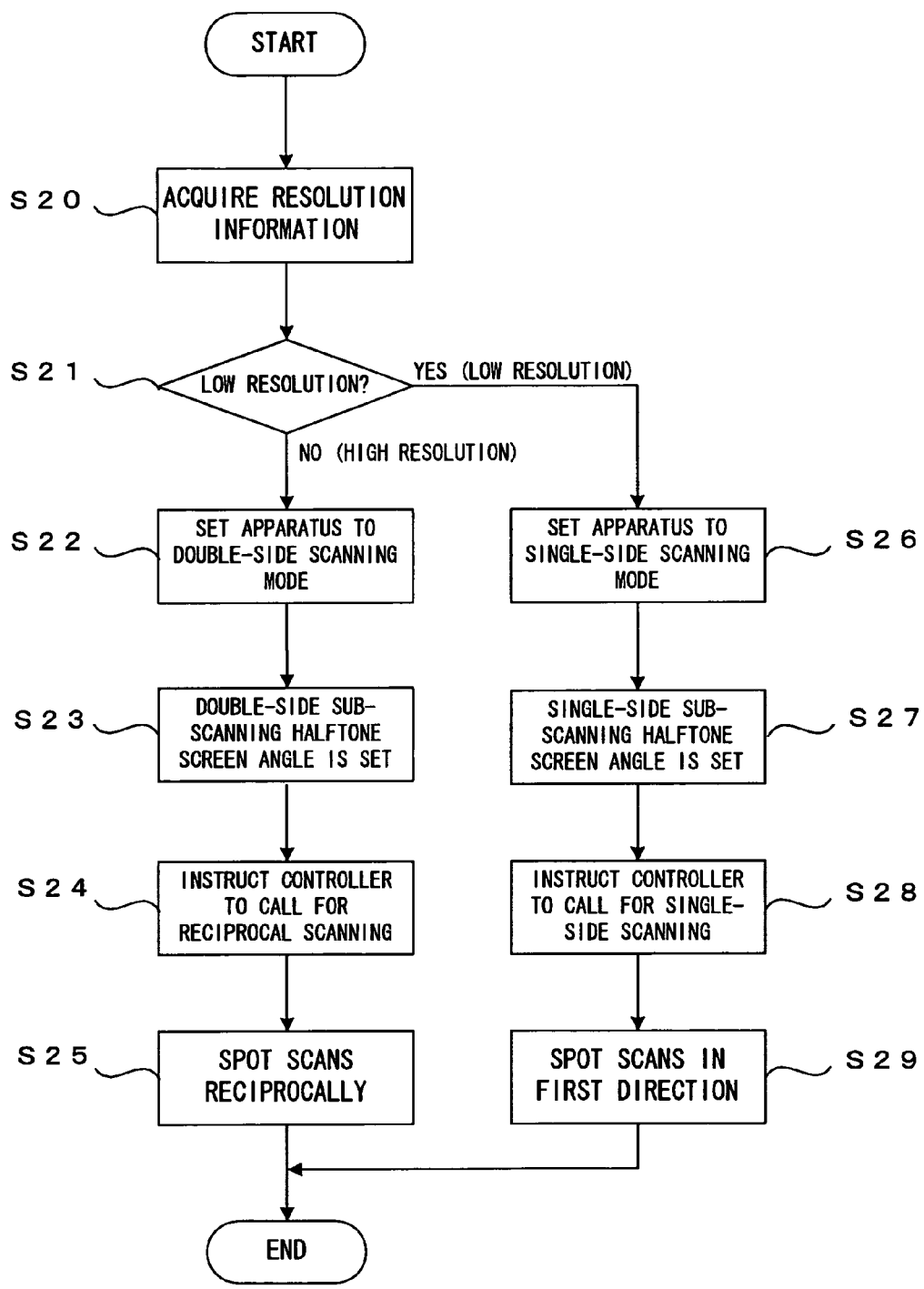
FIG. 24 is a flow chart of an operation of the image forming apparatus according to the seventh embodiment.

FIG. 24 is a flow chart of an operation of the image forming apparatus according to the seventh embodiment. In the seventh embodiment, upon receipt of a print command from an external apparatus such as the host computer 100, latent images are formed on the respective photosensitive members and a color image is formed from these latent images in accordance with the flow chart in FIG. 24. In other words, at Step S20, resolution information contained in the print command is acquired (information acquiring step). Based on the resolution information, whether the print command calls for printing at a high resolution or a low resolution is determined (Step S21).

When it is determined YES at Step S21, that is, when it is determined printing at a low resolution is demanded, Step S26 to Step S29 are executed. Through these Steps images are formed and transferred onto a sheet S and printing is terminated. First, at Step S26, the apparatus is set to the single-side scanning mode (scanning mode setting step). Next, the sub-scanning halftone screen angles for the single-side scanning mode (single-side sub-scanning halftone screen angles) are set (Step S27). FIG. 25A is a drawing of the sub-scanning halftone screen angles in a single-side scanning mode in the seventh embodiment. FIG. 25B is a drawing of the sub-scanning halftone screen angles in a double side scanning mode in the seventh embodiment. The sub-scanning halftone screen angles herein referred to are angles between the sub-scanning direction Y and the directions in which halftone dots of the halftone screen for each color components are arranged. As described above, since halftone dots are arranged in the predetermined two directions in a halftone screen, the halftone screen has two sub-scanning halftone screen angles. Describing this in relation to black (K) for instance as a typical example for this embodiment, as shown in FIG. 25A, two single-side sub-scanning halftone screen angles AKK1 and AKK2 are set. Further, the scanning mode switching signal which corresponds to the scanning mode determined in the manner above is supplied to the scanning mode switcher 116C of the main controller 11 (Step S28). Receiving the instruction, the scanning mode switcher 116C fixes the timing at which and the order in which tone data should be read from the line buffer, and forms latent images line by line. In short, the tone data are read from the forward-direction line buffer 116A at proper timing in the forward direction (i.e., the tone data in the order of DT1, DT2, ... DTn), and only a beam spot running in the first direction, while being modulated based on the respective pieces of tone data, scans over the photosensitive member 2, whereby latent images are formed (Step S29). The so-called single-side scanning mode is executed in this fashion, and latent images are formed. Thus formed latent images are then developed with toner, thereby forming toner images in the four colors. The toner images are superimposed one atop the other on the intermediate transfer belt 71, thereby forming a color image. The color image is thereafter transferred onto a sheet S, and printing of letters completes.

When it is determined NO at Step S21, that is, when it is determined printing at a high resolution is demanded, Step S22 to Step S25 are executed. Through these Steps images are formed at a high resolution and transferred onto a sheet S and printing is terminated. First, at Step S22, the apparatus is set to the double-side scanning mode (scanning mode setting step). This is followed by setting of the angles in the double-side scanning mode between the sub-scanning direction Y and the directions in which halftone dots of the halftone screen for each color components are arranged (sub-scanning halftone screen angles) (Step S23). In this embodiment, as shown in FIG. 25B, the double-side sub-scanning halftone screen angles AKR1 and AKR2 for black (K) are set. In other words, the seventh embodiment requires, as shown in FIG. 25B, setting the double-side halftone screen angles for the double-side scanning mode for black (K) in such a manner that the angle in the double-side scanning mode between the sub-scanning direction Y and one of the two arrangement directions which is at a greater angle with respect to the sub-scanning direction Y will be smaller than that in the single-side scanning mode. That is, in the single-side scanning mode, the single-side sub-scanning halftone screen angle AKK1 is set as shown in FIG. 25A, whereas in the double-side scanning mode, as shown in FIG. 25B, the double-side sub-scanning halftone screen angle AKR1, which is the larger one among the two double-side sub-scanning halftone screen angles AKR1 and AKR2, is set to be smaller than the single-side sub-scanning halftone screen angle AKK1 which is the larger one among the two single-side sub-scanning halftone screen angles AKK1 and AKK2. The dashed lines in FIG. 25B are indicative of, for comparison, the directions in which halftone dots are arranged in the single-side scanning mode. In the seventh embodiment, the arrangement direction which is at a smaller angle with respect to the sub-scanning direction Y is common between the single-side scanning mode and the double-side scanning mode. In short, the single-side sub-scanning halftone screen angle AKK2 is the same as the double-side sub-scanning halftone screen angle AKR2. In addition, the seventh embodiment demands changing the sub-scanning halftone screen angles between the single-side scanning mode and the double-side scanning mode only as for black K.

Further, the scanning mode switching signal which corresponds to the scanning mode determined in the manner above is supplied to the scanning mode switcher 116C of the main controller 11 (Step S24). Receiving the instruction, the scanning mode switcher 116C switches the timing at which and the order in which tone data should be read from the line buffer, alternately every line. Therefore, latent images are formed in the following manner. That is, an operation of making a beam spot scan on the effective image region IR in the direction (+X) and accordingly forming latent images within the effective image region IR and an operation of making a beam spot scan on the effective image region IR in the direction (−X) and accordingly forming latent images within the effective image region IR are repeated alternately (Step S25). The so-called double-side scanning mode is executed in this fashion, and latent images are formed. Thus formed latent images are then developed with toner, thereby forming toner images in the four colors. The toner images are superimposed one atop the other on the intermediate transfer belt 71, thereby forming a color image. The color image is thereafter transferred onto a sheet S, and photo printing completes.

As described above, the seventh embodiment requires setting the sub-scanning halftone screen angles so that the angle in the double-side scanning mode between the sub-scanning direction Y and one of the two arrangement directions which is at a greater angle with respect to the sub scanning direction Y will be smaller than in the single-side scanning mode. In other words, in the double-side scanning mode, the larger double-side sub-scanning halftone screen angle of the two double-side sub-scanning halftone screen angles is set to be smaller than the larger single-side sub-scanning halftone screen angle of the two single-side sub-scanning halftone screen angles. It is therefore possible in the double-side scanning mode to suppress the appearance of an unwanted pattern which is attributable to the unevenness of the scanning pitch in the sub-scanning direction Y. This realizes excellent tone reproduction even in the double-side scanning mode. The reason of this will now be described in details. In this embodiment, as described above, a beam spot reciprocally scans on the surface of the photosensitive member 2 in the main scanning direction while driving the surface of the photosensitive member 2 in the sub scanning direction Y which is approximately orthogonal to the main scanning direction X. Since the scanning track of the beam spots on the surface of the photosensitive member 2 in the double-side scanning mode is as denoted at the dotted-and-dashed line in FIG. 20, the scanning pitch in the sub scanning direction Y is not constant. The unevenness of the scanning pitch in the sub scanning direction Y is particularly remarkable near the both ends of the scanning track in the main scanning direction X. On the contrary, the seventh embodiment realizes tone reproduction using a halftone screen which grows halftone dots which are spaced apart in the two arrangement directions. Hence in the event that halftones are formed in the predetermined directions for tone reproduction in the double-side scanning mode as shown in FIG. 26A, due to the varying scanning pitch in the sub scanning direction, the widths DT and DF of the halftone dots in the vertical direction relative to the arrangement directions of the halftone dots change periodically, thereby creating an unnecessary pattern. FIGS. 26A, 26B, 26C and 26D are drawings which show a relationship between the widths of the halftone dots and the angle of the arrangement directions of the halftone dots with respect to the sub scanning direction. From FIG. 26A to FIG. 26D, the dotted-and-dashed lines are indicative of the scanning lines, the squares denote halftone dots formed in areas where the scanning pitch is narrow or wide, and the solid lines are indicative of the arrangement directions of the halftone dots.

The periodical changes of the halftone dot widths described above are dependent upon the angle between the arrangement directions of the halftone dots and the sub scanning direction. This will now be described with reference to FIGS. 26A, 26B, 26C and 26D. From FIG. 26A to FIG. 26D, the angle between the arrangement directions of the halftone dots and the sub scanning direction Y (sub-scanning halftone screen angle AI) becomes smaller. In FIG. 26A where the angle is the largest, the halftone dot width DT in a narrow scanning-pitch area and the halftone dot width DF in a wide scanning-pitch area are significantly different. However, as the angle between the arrangement directions of the halftone dots and the sub scanning direction (sub-scanning halftone screen angle AI) becomes smaller from FIG. 26C toward FIG. 26D, the difference between the halftone dot width DT in the narrow scanning-pitch area and the halftone dot width DF in the wide scanning-pitch area shrinks. Thus, the smaller the sub-scanning halftone screen angle AI is, the smaller the difference between the halftone dot width DT in the narrow scanning-pitch area and the halftone dot width DF in the wide scanning-pitch area is. Noting this, this embodiment requires setting the sub-scanning halftone screen angle so that the angle between the sub scanning direction Y and one of the two arrangement directions present within the halftone screen which forms a greater angle with the sub scanning direction Y and in which the halftone dot width varies more greatly will be smaller in the double-side scanning mode than in the single-side scanning mode. In other words, the larger sub-scanning halftone screen angle of the two sub-scanning halftone screen angles in the double-side scanning mode is set to be smaller than that in the single-side scanning mode. It is therefore possible to suppress in the double-side scanning mode the appearance of an unwanted pattern which is attributable to the unevenness of the scanning pitch in the sub-scanning direction. This realizes excellent tone reproduction even in the double-side scanning mode.

Eighth Embodiment

Figure 27:
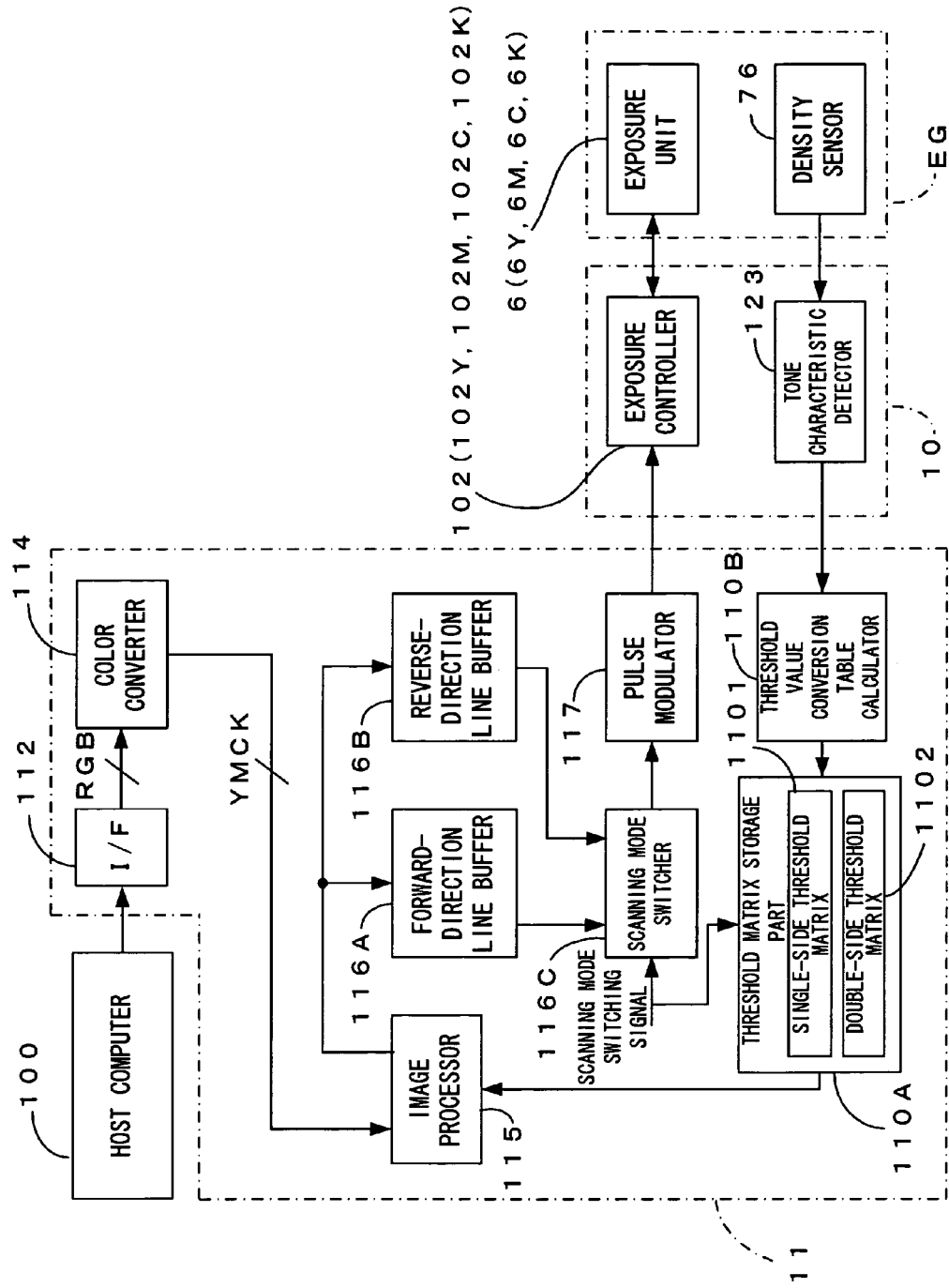
FIG. 27 is a block diagram of signal processing in the eighth embodiment.

FIG. 27 is a block diagram of signal processing in the eighth embodiment. As for the eighth embodiment, a difference from the earlier embodiments described above will be mainly described. The common portions will be denoted at corresponding reference symbols but will not be described. In the illustrated image forming apparatus, upon receipt of an image signal from an external apparatus such as the host computer 100, the main controller 11 performs predetermined signal processing of the image signal. The main controller 11 comprises functional blocks such as the color converter 114, the image processor 115, the two types of line buffers 116A and 116B, the scanning mode switcher 116C, the pulse modulator 117.

As described earlier, in addition to the CPU 101, the ROM 106, the RAM 107 and the exposure controller 102 shown in FIG. 2, the engine controller 10 is equipped with the tone characteristic detector 123 which detects a tone characteristic which expresses the γ-characteristic of the engine part EG based on the result of detection yielded by the density sensor 76. The eighth embodiment hence permits calculating the tone reproduction characteristic of the apparatus as it is during execution of each scanning mode while the engine controller 10 and the main controller 11 control the respective portions of the apparatus in the manner described later. The engine controller 10 and the main controller 11 thus function as the "single-side characteristic identifier" and the "double-side characteristic identifier" of the invention.

In the main controller 11 supplied with the image signal from the host computer 100, the color converter 114 converts RGB tone data into corresponding CMYK tone data, the RGB tone data representing the respective tone levels of RGB components of each pixel in an image corresponding to the image signal, the CMYK tone data representing the respective tone levels of CMYK components corresponding to the RGB components. In the color converter 114, the input RGB tone data comprise 8 bits per color component for each pixel (or representing 256 tone levels), for example, whereas the output CMYK tone data similarly comprise 8 bits per color component for each pixel (or representing 256 tone levels). The CMYK tone data outputted from the color converter 114 are inputted to the image processor 115.

For each color component, the image processor 115 halftones tone data for each pixel fed from the color converter 114. This halftoning may be forming one halftone dot using multiple pixels and growing the size of the halftone dot in accordance with the tone level representing the tone data to thereby reproduce a tone. A method of creating halftone dots which grow in accordance with the tone level of tone data may be a dither method, an error diffusion method, etc. This embodiment uses a dither method for halftoning. FIG. 28 is an explanatory diagram of a dither method. According to a dither method, the tone level of input tone data is compared with the threshold value of each element of a threshold matrix MTX. One element of the threshold matrix corresponds to one pixel. When the tone level of input tone data is larger than the threshold value of each element, the value at a location corresponding to this element is "1" and a latent image is formed at a location on the surface of the photosensitive member corresponding to this location. On the contrary, when the tone level of input tone data is smaller than the threshold value of each element, the value at a location corresponding to this element is "0" and no latent image is formed at a location on the surface of the photosensitive member corresponding to this location. Where a dither method is used, the tone level of input tone data is compared with the threshold value of each element of the threshold matrix, thereby obtaining halftoned tone data. In the example in FIG. 28, the threshold matrix MTX can reproduce 16 different tone levels is used and the tone level of the tone data is 4. However, the threshold matrix MTX is not limited to the example shown in FIG. 28 but instead may be one which is capable of reproducing more tone levels. The arrangement of threshold values in the threshold matrix MTX is not limited to that shown in FIG. 28 either, but may be modified depending upon the necessity.

As described above, this embodiment uses a dither method for halftoning. In other words, comparing tone data received from the color converter 114 with the threshold matrix stored in a matrix storage part 110A which is a non-volatile memory, the image processor 115 converts the tone data into halftoned tone data. Further, in an attempt to maintain the γ-characteristic of the image forming apparatus always ideal, this embodiment requires executing tone control processing of updating, at predetermined timing, the content of the threshold matrix stored in the matrix storage part 110A based on the actually measured density of an image.

During the tone control processing, for each toner color, the engine part EG forms on the intermediate transfer belt 71 tone-correcting tone patch images which are prepared in advance for measurement of the γ-characteristic, the density sensor 76 reads the image densities of the respective tonal patch images, and based on a signal from the density sensor 76, the tone characteristic detector 123 generates a tone characteristic (the γ-characteristic of the engine part EG) which correlates the tone levels of the respective tone patch images with the detected image densities and outputs the tone characteristic to a threshold value conversion table calculator 110B of the main controller 11. Based on the tone characteristic fed from the tone characteristic detector 123, the threshold value conversion table calculator 110B compensates the measured tone characteristic of the engine part EG and calculates a threshold value conversion table which is for obtaining an ideal tone characteristic, and the content of the threshold matrix stored in the matrix storage part 110A is updated based on the yielded calculation result. The image forming apparatus is thus capable of forming images in a stable quality despite any variation of the γ-characteristic of the apparatus, a change with time, etc.

The two types of line buffers 116A and 116B receive the halftoned tone data obtained in the manner described above. The operations and the structure of the line buffers 116A and 116B are as described earlier.

The scanning mode switcher 116C receives the halftoned tone data thus output. At proper timing, the scanning mode switcher 116C outputs to the pulse modulator 117 only the halftoned tone data output from one line buffer based on the scanning mode switching signal. The scanning mode switcher 116C supplies to the pulse modulator 117 the tone data at such timing and in such an order corresponding to each color component. In this embodiment, the line buffers 116A and 116B and the scanning mode switcher 116C thus correspond to the "scanning mode controller" of the invention. In this embodiment, the matrix storage part 110A stores a single-side threshold matrix 1101 and a double-side threshold matrix 1102 which respectively correspond to the respective scanning modes, and in each scanning mode, executes the tone control processing mentioned above and accordingly updates the single-side threshold matrix 1101 and the double-side threshold matrix 1102, which will be described next.

Figure 29:
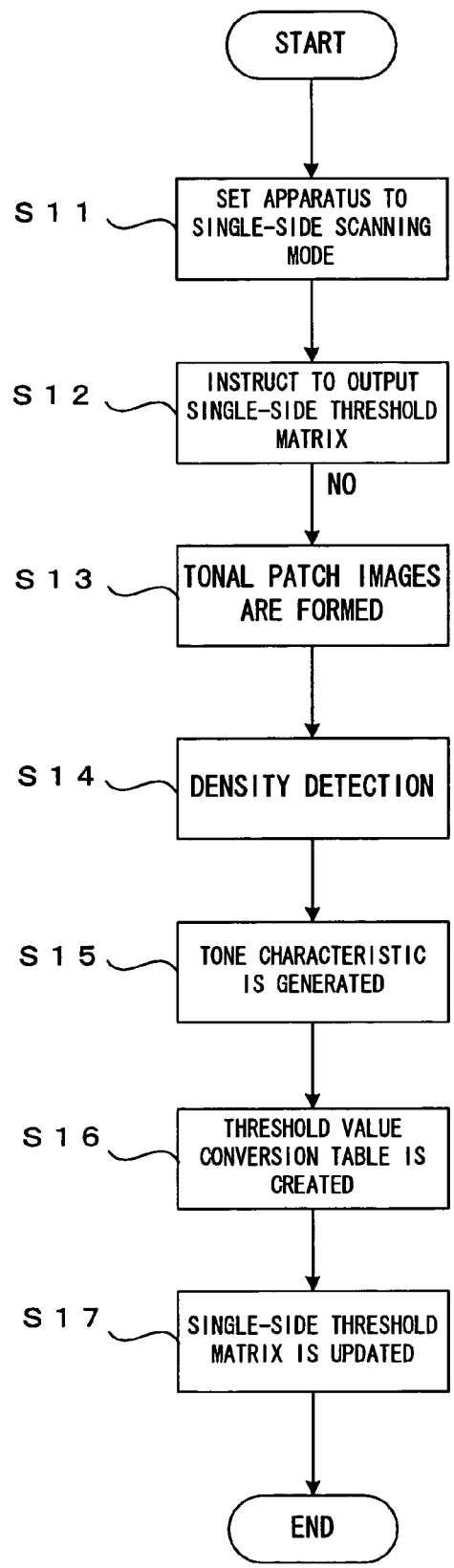
FIG. 29 is a flow chart of the tone control processing in the single-side scanning mode according to the eighth embodiment.
Figure 30:
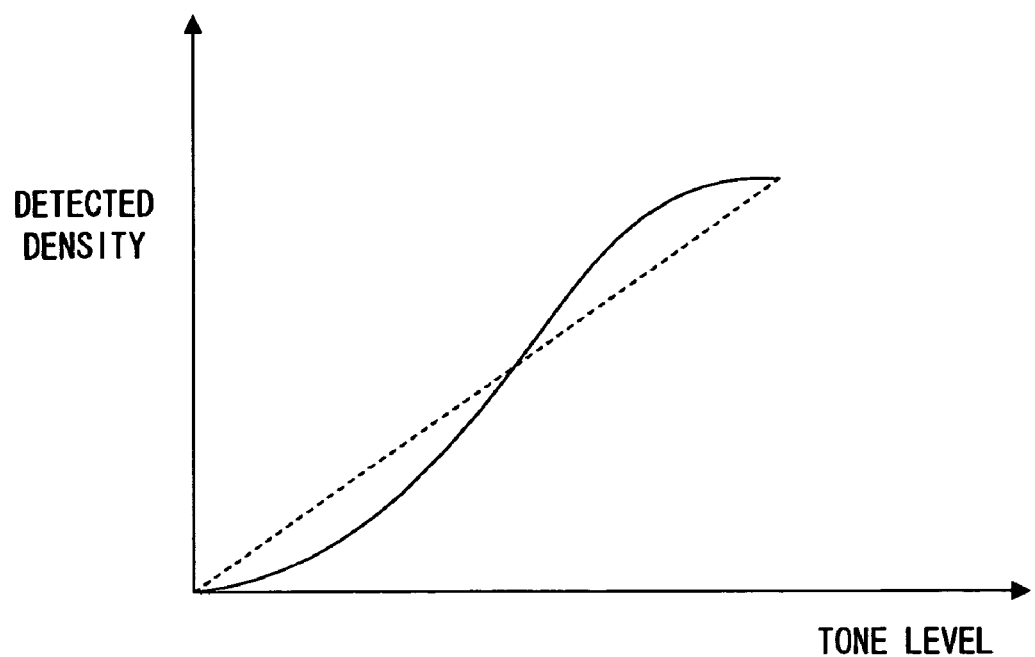
FIG. 30 is an explanatory diagram on the tone characteristic.

FIG. 29 is a flow chart of the tone control processing in the single-side scanning mode (single-side characteristic detecting step) according to the eighth embodiment. First, the apparatus is set to the single-side scanning mode (Step S11). Next, the scanning mode switching signal which corresponds to the scanning mode determined in the manner above is supplied to the matrix storage part 110A (Step S12). In response to this, the matrix storage part 110A outputs the single-side threshold matrix 1101 to the image processor 115. Tonal patch images are then formed on the intermediate transfer belt 71 (Step S13). These tonal patch images are formed on the intermediate transfer belt in accordance with a tone generation pattern which is for arranging plural toner images having predetermined different tone levels from each other in the direction in which the intermediate transfer belt 71 is driven. The plural toner images are arranged so that the tone levels of the respective toner images are progressively lower with respect to the belt driving direction. While toner images may be formed spanning all tone levels from the maximum tone level to the minimum tone level, in the eighth embodiment, toner images having only predetermined tone levels are formed. At Step S12, the matrix storage part 110A is set so as to output the single-side threshold matrix 1101 to the image processor 115. Hence, it is the single-side threshold matrix 1101 stored in the matrix storage part 110A that is used to form tonal patch images. Next, the density sensor 76 detects the densities of the plural toner images which are at different tone levels of thus formed patch images (Step S14). The tone characteristic detector 123 then generates a tone characteristic as that denoted at the solid line in FIG. 30 which correlates the tone levels to the detected image densities (Step S15). FIG. 30 is an explanatory diagram on the tone characteristic. From the tone characteristic generated in this fashion, the threshold value conversion table calculator 110B compiles a single-side threshold value conversion table which makes the image density change linearly as the tone level changes. And the threshold values of the single-side threshold matrix are corrected with the compiled single-side threshold value conversion table (Step S16). In short, the threshold values in the single-side threshold matrix are corrected so that the tone characteristic denoted at the solid line in FIG. 30 will become linear as denoted at the dashed line in FIG. 30. Those threshold values corresponding to tone levels at which no toner image is formed as the tonal patch images are calculated by linearly interpolating the single-side threshold value conversion table. The content of the threshold matrix 1101 stored in the matrix storage part 110A is then updated to the content of the corrected single-side threshold matrix (Step S17). The tone correction processing in the single-side scanning mode thus corresponds to the "single-side characteristic detecting step" of the invention, and the updated single-side threshold matrix corresponds to the "tone reproduction characteristic" for the single-side scanning mode of the invention.

Figure 31:
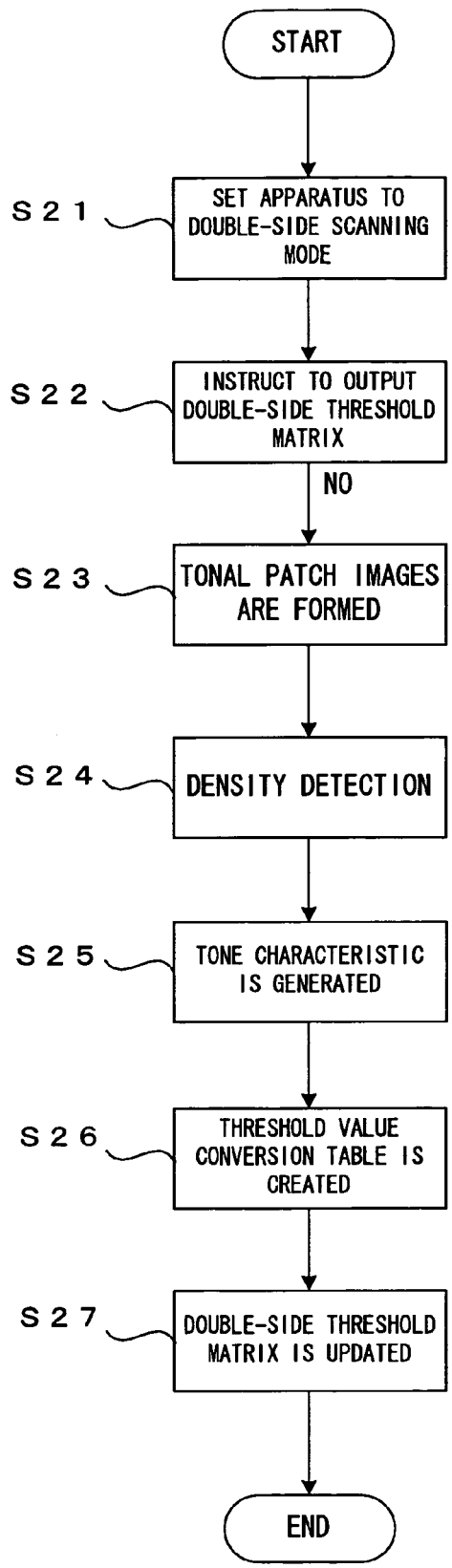
FIG. 31 is a flow chart of the tone control processing in the double-side scanning mode according to the eighth embodiment.
Figure 32A:
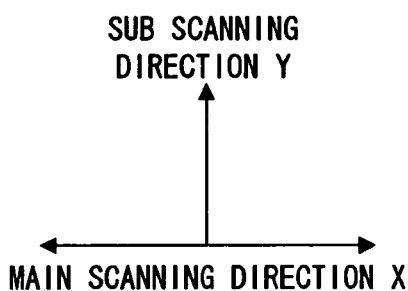
FIG. 32A is a drawing which shows the threshold value matrices in the single-side scanning.
Figure 32B:
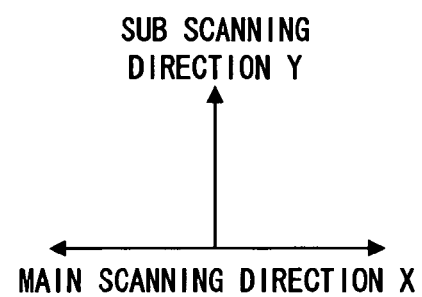
FIG. 32B is a drawing which shows the threshold value matrices in the double-side scanning mode.

FIG. 31 is a flow chart of the tone control processing in the double-side scanning mode (double-side characteristic detecting step) according to the eighth embodiment. First, the apparatus is set to the double-side scanning mode (Step S21). Next, the scanning mode switching signal which corresponds to the scanning mode determined in the manner above is supplied to the matrix storage part 110A (Step S22). In response to this, the matrix storage part 110A outputs the double-side threshold matrix 1102 to the image processor 115. Tonal patch images are then formed on the intermediate transfer belt. 71 (Step S23). These tonal patch images are formed on the intermediate transfer belt in accordance with a tone generation pattern which is for arranging plural toner images having predetermined different tone levels from each other in the direction in which the intermediate transfer belt 71 is driven. The plural toner images are arranged so that the tone levels of the respective toner images are progressively lower with respect to the belt driving direction. While toner images may be formed spanning all tone levels from the maximum tone level to the minimum tone level, in the eighth embodiment, toner images having only predetermined tone levels are formed. At Step S22, the matrix storage part 110A is set so as to output the double-side threshold matrix 1102 to the image processor 115. Hence, it is the double-side threshold matrix 1102 stored in the matrix storage part 110A that is used to form tonal patch images. In the eighth embodiment, the double-side threshold matrix and the single-side threshold matrix are in the relationship which is shown in FIGS. 32A and 32B. FIG. 32A is a drawing which shows the threshold value matrices in the single-side scanning. FIG. 32B is a drawing which shows the threshold value matrices in the double-side scanning mode. That is, since the scanning pitch in the sub scanning direction Y in the double-side scanning mode is roughly half that in the single-side scanning mode, one element in the single-side threshold matrix is correlated with two side-by-side elements in the sub scanning direction Y in the double-side threshold matrix so that the threshold value at these elements is the same. Thus, in the eighth embodiment, the tone generation pattern for tonal patch images in the double-side scanning mode is common to the tone generation pattern for tonal patch images in the single-side scanning mode.

The density sensor 76 detects the densities of plural toner images which are at different tone levels of thus formed patch images as tonal patch images(Step S24). The tone characteristic detector 123 then generates a tone characteristic as that denoted at the solid line in FIG. 30 which correlates the tone levels to the detected image densities (Step S25). From the tone characteristic generated in this fashion, the threshold value conversion table calculator 110B compiles a double-side threshold value conversion table which makes the image density change linearly as the tone level changes. And the threshold values of the double-side threshold matrix are corrected with the compiled double-side threshold value conversion table (Step S26). In short, the threshold values in the double-side threshold matrix are corrected so that the tone characteristic denoted at the solid line in FIG. 30 will become linear as denoted at the dashed line in FIG. 30. Those threshold values corresponding to tone levels at which no toner image is formed as the tonal patch images are calculated by linearly interpolating the double-side threshold value conversion table. The content of the double-side threshold matrix 1102 stored in the matrix storage part 110A is then updated to the content of the corrected double-side threshold matrix (Step S27). The tone correction processing in the double-side scanning mode thus corresponds to the "double-side characteristic detecting step" of the invention, and the updated double-side threshold matrix 1102 corresponds to the "tone reproduction characteristic" for the double-side scanning mode of the invention.

As described above, in the eighth embodiment, it is possible to switch between the single-side scanning mode and the double-side scanning mode. Such an image forming apparatus is capable of performing the latent image forming operation while switching the scanning mode in accordance with the printing mode. According to the eighth embodiment therefore, the scanning mode is switched depending upon a resolution. In short, when a resolution is not asked, a latent image is formed in the single-side scanning mode which uses a wide scanning pitch in the sub scanning direction, whereas when a resolution is demanded, a latent image is formed in the double-side scanning mode which uses a narrow scanning pitch in the sub scanning direction. The latent image forming operation according to the eighth embodiment will now be described.

Figure 33:
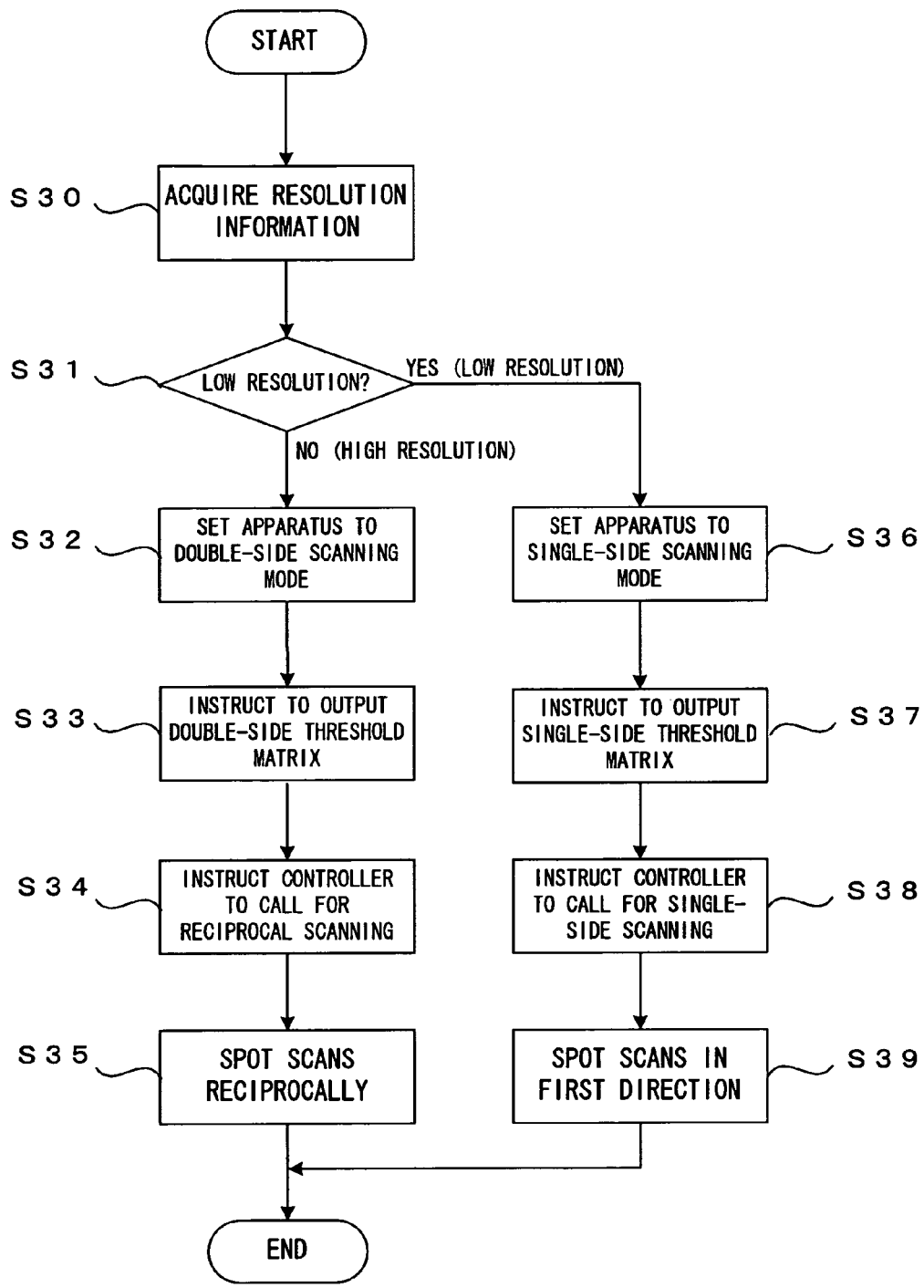
FIG. 33 is a flow chart of the latent image forming operation in the image forming apparatus.

FIG. 33 is a flow chart of the latent image forming operation in the image forming apparatus. Upon receipt of a print command from an external apparatus such as the host computer 100, latent images are formed on the respective photosensitive members and a color image is formed from these latent images in accordance with the flow chart in FIG. 33. In other words, at Step S30, resolution information contained in the print command is acquired. Based on the resolution information, whether the print command calls for printing at a high resolution or a low resolution is determined (Step S31).

When it is determined YES at Step S31, that is, when it is determined printing at a low resolution is demanded, Step S36 to Step S39 are executed. Through these Steps images are formed at a low resolution and transferred onto a sheet S and printing is terminated. First, at Step S36, the apparatus is set to the single-side scanning mode. Next, the scanning mode switching signal which corresponds to the scanning mode determined in the manner above is supplied to the matrix storage part 110A (Step S37). In response to this, the matrix storage part 110A outputs the single-side threshold matrix 1101 to the image processor 115. The image processor 115 generates halftoned tone data using the single-side threshold matrix 1101, and output the halftoned tone data to the corresponding line buffer. The scanning mode switching signal which corresponds to the scanning mode determined in the manner above is supplied further to the scanning mode switcher 116C of the main controller 11 (Step S38). Receiving the instruction, the scanning mode switcher 116C fixes the timing at which and the order in which tone data should be read from the line buffer, and forms latent images line by line. In short, the tone data are read from the forward-direction line buffer 116A at proper timing in the forward direction (i.e., the tone data in the order of DT1, DT2, ... DTn), and only a beam spot running in the first direction, while being modulated based on the respective pieces of tone data, scans over the photosensitive member 2, whereby latent images are formed (Step S39). The so-called single-side scanning mode is executed in this fashion, and latent images are formed at a low resolution. Thus formed latent images are then developed with toner, thereby forming toner images in the four colors. The toner images are superimposed one atop the other on the intermediate transfer belt 71, thereby forming a color image. The color image is thereafter transferred onto a sheet S, and low-resolution printing completes.

When it is determined NO at Step S31, that is, when it is determined printing at a high resolution is demanded, Step S32 to Step S35 are executed. Through these Steps images are formed at a high resolution and transferred onto a sheet S and printing is terminated. First, at Step S32, the apparatus is set to the double-side scanning mode. Next, the scanning mode switching signal which corresponds to the scanning mode determined in the manner above is supplied to the matrix storage part 110A (Step S33). In response to this, the matrix storage part 110A outputs the double-side threshold matrix 1102 to the image processor 115. The image processor 115 generates halftoned tone data using the double-side threshold matrix 1102, and output the halftoned tone data to the corresponding line buffer. The scanning mode switching signal which corresponds to the scanning mode determined in the manner above is supplied further to the scanning mode switcher 116C of the main controller 11 (Step S34). Receiving the instruction, the scanning mode switcher 116C switches the timing at which and the order in which tone data should be read from the corresponding line buffer, alternately every line. Therefore, latent images are formed at a high resolution in the following manner. That is, an operation of making a beam spot scan on the effective image region IR in the direction (+X) and accordingly forming latent images within the effective image region IR and an operation of making a beam spot scan on the effective image region IR in the direction (−X) and accordingly forming latent images within the effective image region IR are repeated alternately (Step S35). The so-called double-side scanning mode is executed in this fashion, and latent images are formed at a high resolution. Thus formed latent images are then developed with toner, thereby forming toner images in the four colors. The toner images are superimposed one atop the other on the intermediate transfer belt 71, thereby forming a color image. The color image is thereafter transferred onto a sheet S, and high-resolution printing completes.

As described with reference to FIG. 20, by means of the structure above according to the invention, a beam spot reciprocally scans on the surface of the photosensitive member 2 in the main scanning direction X while driving the surface of the photosensitive member 2 in the sub scanning direction Y which is approximately orthogonal to the main scanning direction X. Since the scanning track of the beam spots on the surface of the photosensitive member 2 in the double-side scanning mode, is as denoted at the dotted-and-dashed line in FIG. 20, the scanning pitch in the sub scanning direction Y is not constant. Due to this, when one wishes to form a latent image using a beam spot which scans on the surface of the photosensitive member 2 in the double-side scanning mode, the degree of overlapping of beam spots in the sub scanning direction Y could vary because the scanning pitch in the sub scanning direction Y is not constant. In other words, beam spot overlaps in the sub scanning direction Y are large in areas where the scanning pitch in the sub scanning direction Y is narrow, while beam spots overlaps in the sub scanning direction Y are small in areas where the scanning pitch in the sub scanning direction Y is wide. Hence, in the double-side scanning mode, a color could have light shades and dark shades due to the varying scanning pitch in the sub scanning direction Y.

In contrast, according to the eighth embodiment, toner images are formed as tonal patch images through execution of the single-side scanning mode and the tone reproduction characteristic during the single-side scanning mode is controlled based on the detected densities of the toner images, and in the double-side scanning mode, toner images are formed as tonal patch images and the tone reproduction characteristic during the double-side scanning mode is controlled based on the detected densities of the toner images. In short, in each one of the single-side scanning mode and the double-side scanning mode, toner images serving as tonal patch images are formed and the tone reproduction characteristic of the apparatus for each scanning mode is optimized based on the detected densities of the toner images. Hence, regardless of whether the tone reproduction characteristic changes between the double-side scanning mode and the single-side scanning mode, it is possible to realize favorable tone reproduction in either scanning mode.

Further, in the eighth embodiment, during the tone control processing, toner images are formed as tonal patch images based on the same tone generation pattern in both the single-side scanning mode and the double-side scanning mode. This eliminates the necessity of providing a tone generation pattern for each scanning mode and simplifies the structure.

Ninth Embodiment

The ninth embodiment requires scanning the surface of the photosensitive member 2 (surface to be scanned) with the light beam, using the scanning lens 66 which exhibits an arc-sign theta lens characteristic (FIG. 4). A beam spot created by the scanning lens 66 on the surface of the photosensitive member 2 from the light beam which is deflected by the deflection mirror surface 651 which oscillates in sine motions as described earlier scans over the surface of the photosensitive member 2 at an equal speed in the main scanning direction X. A line-shaped latent image extending in the main scanning direction X is consequently formed on an effective scan region ESR on the photosensitive member 2. In the ninth embodiment, the scan region SR which can be scanned using the deflector 65 is wider than the effective scan region ESR as shown in FIG. 4. In addition, the effective scan region ESR is located approximately at the center of the scan region SR and is approximately symmetric with respect to the optical axis.

In the ninth embodiment as well, the light beam can scan back and forth in the main scanning direction X. That is, the light beam can scan in both the direction (+X) and the direction (−X). In the ninth embodiment therefore, as the light beam scans reciprocally in the main scanning direction X, line latent images LI(+X) and line latent images LI(−X) are formed alternately in the sub scanning direction Y on the surface of the photosensitive member 2. A characteristic aspect of the ninth embodiment alone will be described below, while common portions will not be described.

In the ninth embodiment, the beam spot diameter Wb in the sub scanning direction Y of a beam spot formed on the surface of the photosensitive member 2 is equal to or larger than the maximum scanning pitch in the sub scanning direction Y in "end portions" of the effective scan region ESR but is equal to smaller than double the minimum scanning pitch. By means of this structure, the beam spot diameter Wb is equal to or larger than the maximum scanning pitch in the sub scanning direction Y within the effective scan region ESR but is equal to smaller than double the minimum scanning pitch. The reason of this will now be described in details. FIG. 34 is a drawing which shows a relationship between the beam spot diameter and the scanning pitch. In the ninth embodiment, a beam spot having a constant beam spot diameter reciprocally scans at the constant speed in the main scanning direction X within the effective scan region ESR which is provided on the surface of the photosensitive member 2. Meanwhile, the surface of the photosensitive member 2 is driven in the sub scanning direction Y which is approximately orthogonal to the main scanning direction X. Hence, the track of the scanning lines of the beam spot on the surface of the photosensitive member 2 (surface to be scanned) is zigzag as denoted at the dotted-and-dashed lines in FIG. 34. It is therefore in the "end portions" of the effective scan region ESR that the scanning pitch in the sub scanning direction Y becomes the maximum or the minimum within the effective scan region ESR. Hence, the beam spot diameter Wb in the sub scanning direction Y of the beam spot, being set to be equal to or larger than the maximum scanning pitch in the sub scanning direction Y in the "end portions" of the effective scan region ESR but equal to smaller than double the minimum scanning pitch, is equal to or larger than the maximum scanning pitch in the sub scanning direction Y within the effective scan region ESR but equal to smaller than double the minimum scanning pitch.

As described above, in the structure according to the ninth embodiment, the beam spot diameter Wb in the sub scanning direction Y of a beam spot formed on the surface of the photosensitive member 2 is equal to or larger than the maximum scanning pitch in the sub scanning direction Y in the end portions of the effective scan region ESR. The beam spot diameter Wb in the sub scanning direction Y of a beam spot formed on the surface of the photosensitive member 2 is therefore equal to or larger than the maximum scanning pitch in the sub scanning direction Y within the effective scan region ESR. Hence, beam spots are connected with each other in the sub scanning direction Y in an area where the scanning pitch is narrow of course and also in an area where the scanning pitch is wide, which attains favorable two-dimensional scanning on the surface of the photosensitive member 2. In consequence, image impairment described later is prevented and an excellent image is formed. The reason will now be described in detail.

The ninth embodiment requires making a beam spot reciprocally scan the surface of the photosensitive member 2 at a constant speed in the main scanning direction X while driving the surface of the photosensitive member 2 in the sub scanning direction Y which is approximately orthogonal to the main scanning direction X. The track of the scanning lines of the beam spot on the surface of the photosensitive member 2 (surface to be scanned) is therefore zigzag as denoted at the dotted-and-dashed lines in FIG. 34. The scanning pitch in the sub scanning direction Y within the effective scan region ESR is thus not constant as denoted at the reference symbols PT1 through PT3. In this structure, when one wishes to form a line image extending in the sub scanning direction Y for instance, such image impairment could occur that beam spots fail to overlap each other in the sub scanning direction Y and the line image is cut in an area where the scanning pitch in the sub scanning direction Y is wide. In contrast, this embodiment requires setting the beam spot diameter Wb in the sub scanning direction Y of a beam spot to be equal to or larger than the maximum scanning pitch within the effective scan region ESR which has a predetermined width in the main scanning direction X on the surface of the photosensitive member. Hence, beam spots are connected with each other in the sub scanning direction Y in an area where the scanning pitch is narrow of course and also in an area where the scanning pitch is wide, which attains favorable two-dimensional scanning. It is thus possible to prevent the image impairment mentioned above of a disconnected line image and instead to form an excellent image.

The ninth embodiment further requires setting the beam spot diameter Wb in the sub scanning direction Y of a beam spot formed on the surface of the photosensitive member 2 to be equal to or smaller than double the minimum scanning pitch in the sub scanning direction Y in the end portions of the effective scan region ESR. The beam spot diameter Wb in the sub scanning direction Y of a beam spot formed on the surface of the photosensitive member 2 is therefore equal to or smaller than double the minimum scanning pitch in the sub scanning direction Y within the effective scan region ESR. Spots therefore do not overlap excessively each other in the sub scanning direction Y even in an area where the scanning pitch is narrow within the effective scan region ESR, thereby realizing excellent two-dimensional scanning. It is thus possible to prevent image impairment described later and instead to form an excellent image. The reason of this will now be described in detail.

As shown in FIG. 34, the scanning pitch in the sub scanning direction Y is not constant in the ninth embodiment. Hence, when the beam spot diameter in the sub scanning direction Y of a spot is too large, excessive beam spot overlapping occurs in the sub scanning direction Y in an area where the scanning pitch in the sub scanning direction Y is narrow. Latent images formed by those beam spots having such a beam spot diameter as well excessively overlap each other in the sub scanning direction Y, which leads to image impairment that toner adheres excessively to the overlaps of the latent images during development of the latent images, and a line image becomes too thick or shades become too dark. The ninth embodiment however ensures that the beam spot diameter in the sub scanning direction Y of a beam spot is equal to or smaller than double the minimum scanning pitch in the sub scanning direction Y In other words, as the upper limit value is set for the beam spot diameter in the sub scanning direction Y, excessive overlapping of beam spots in the sub scanning direction Y is prevented. This prevents excessive overlapping of latent images which are formed through irradiation with the beam spots, and hence, avoid the image impairment mentioned above which is caused by excessive adhesion of toner. It is therefore possible to form an excellent image.

Others

The invention is not limited to the embodiments described above but may be modified in various manners in addition to the embodiments above, to the extent not deviating from the object of the invention. For instance, although the first and the second embodiments described earlier require switching between the double-side scanning mode and the single-side scanning mode based on a demanded resolution or whether tone reproduction is necessary, the criterion as for switching of the scanning mode is not limited to these. The invention is generally applicable to any image forming apparatus which is structured to be capable of switching between the double-side scanning mode and the single-side scanning mode.

Further, the scanning mode controller may control the light-source driver and adjust the timing of emission from the light source, for selective switching between the single-side scanning mode and the double-side scanning mode.

Figure 35:
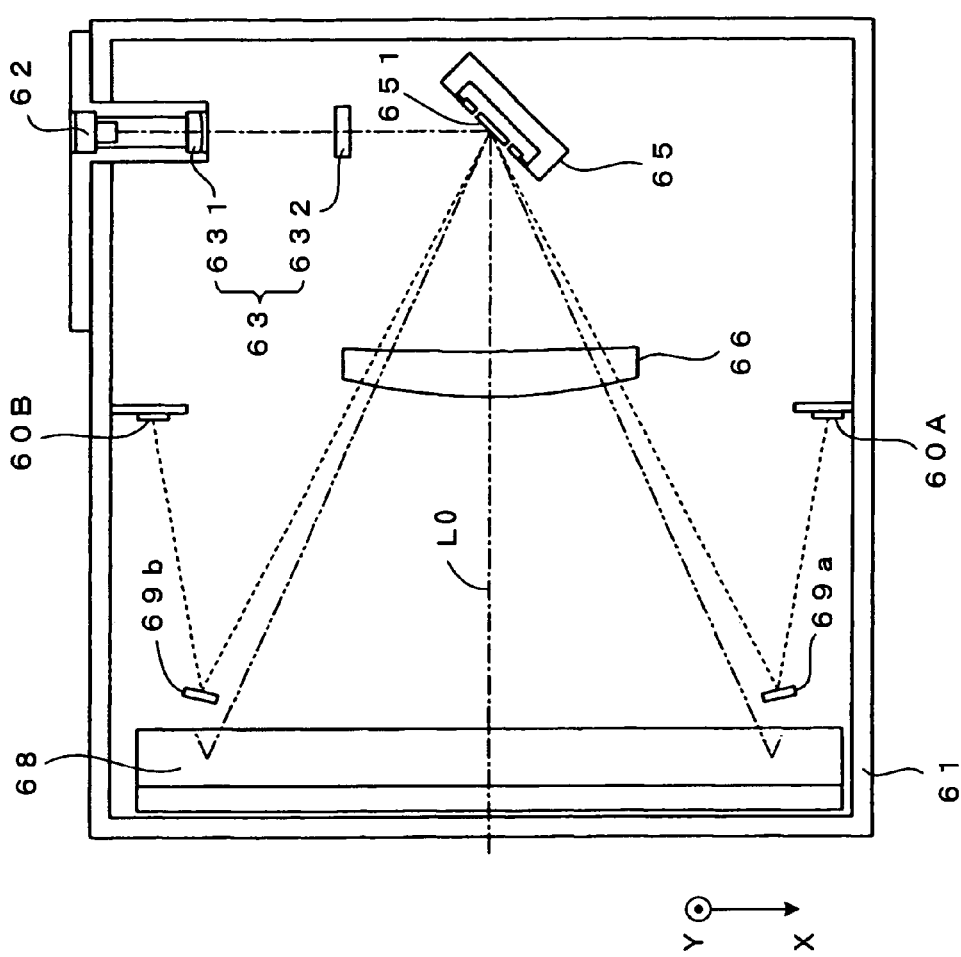
FIG. 35 is a sectional view taken on a main scan direction for showing an arrangement of the exposure unit of another embodiment.
Figure 36:
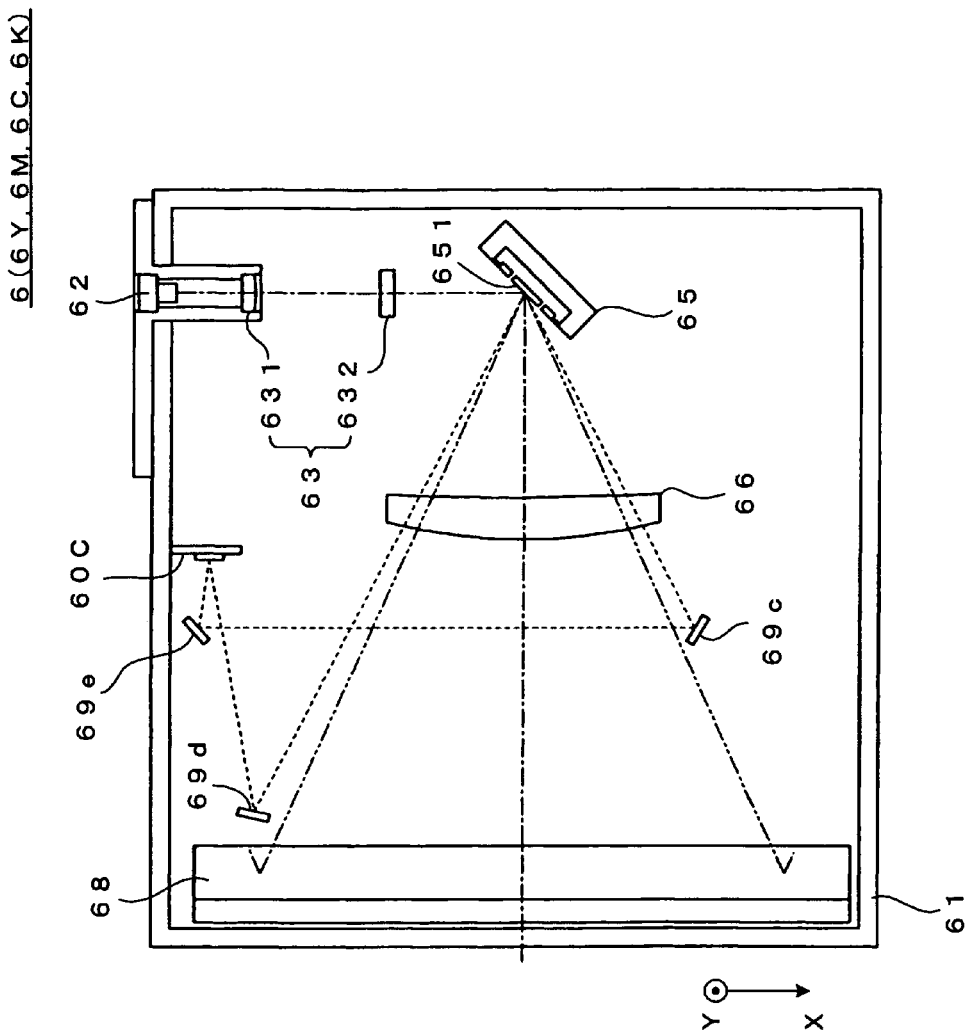
FIG. 36 is a sectional view taken on a main scan direction for showing an arrangement of the exposure unit of another embodiment.

Further, although the embodiments described above require controlling the latent image forming operation based on the horizontal synchronizing signal detected on the opposite side to the drive motor MT in the main scanning direction X, the number, the arrangement and the like of the sensors are not limited to this. For example, at the both ends of the scanning route of the scanning light beam, return mirrors 69*a* and 69*b* may guide the scanning light beam to horizontal synchronization sensors 60A and 60B, as shown in FIG. 35. In the illustrated apparatus, when the horizontal synchronization sensors 60A and 60B receive the scanning light beam and the scanning light beam moves passed the sensor locations (the oscillation angle θs), the horizontal synchronization sensors 60A and 60B output signals. The latent image forming operation may be controlled based on the output signals from the horizontal synchronization sensors 60A and 60B. In addition, since it is possible to obtain detection signals at the both ends in the main scanning direction X, the latent image forming operation may be controlled based on the detection signal which is output from the upstream-side sensor (detector) in the scanning direction of the light beam. Alternatively, the scanning light beam may be detected using one horizontal synchronization sensor 60C and return mirrors 69*c* through 69*e* as shown in FIG. 36.

Further, although the sixth embodiment described above requires setting the sub-scanning line screen angles such that the angles between the sub scanning direction Y and the respective lines of the line screen (sub-scanning line screen angles) for the double-side scanning mode will be smaller than those in the single-side scanning as for all color components of yellow (Y), magenta (M), cyan (C) and black (K), these angles may be set as for only selected color components. For instance, the sub-scanning line screen angle may be set only as for such a color component for which the sub-scanning line screen angle is large. Alternatively, the sub-scanning line screen angle may be set only as for a color component for which an unwanted pattern created due to the uneven scanning pitch is noticeable.

Further, although the seventh embodiment described above requires setting the sub-scanning halftone screen angle only for black (K) such that the angle between the sub scanning direction and one of the two arrangement directions present within the halftone screen which is at a greater angle with respect to the sub scanning direction will be smaller in the double-side scanning mode than in the single-side scanning mode, the invention is not applicable only to black (K) but is applicable also to the other color components of yellow (Y), magenta (M) and cyan (C). For instance, the invention may be applied to all color components of yellow (Y), magenta (M), cyan (C) and black (K).

Further, although the eighth embodiment described above requires halftoning by a dither method, halftoning is not limited to a dither method. An error diffusion method for example may be used instead.

Further, although the sixth through the eighths embodiments described above require switching between the double-side scanning mode and the single-side scanning mode depending upon a demanded resolution, the criterion as for switching of the scanning mode is not limited to this. The invention is applicable generally to any image forming apparatus which is structured to be capable of switching between the double-side scanning mode and the single-side scanning mode.

Further, although the effective scan region ESR is located approximately at the center of the scan region SR, according to the ninth embodiment described above, the invention is not limited only to this application. For example, the center line of the effective scan region ESR may be shifted from that of the scan region SR in the main scanning direction X as described later in relation to the fifth embodiment below.

Further, although the first through the eighths embodiments described above use only the light beam SL1 which scans in the direction (+X) in the single-side scanning mode, the light beam SL2 which scans in the direction (−X) may be used. The requirement here is merely to ensure that the light beam scans only one way in the first direction (+X) or the second direction (−X).

Further, although the embodiments described above are directed to the application of the invention to a color printer of the so-called tandem type, the invention is not limited only to this application. For example, the invention is applicable also to a printer of the so-called 4-cycle type or a monochrome printer which prints only in single color.

Further, although the embodiments described above are directed to the application of the invention to an image forming apparatus in which a color image is formed temporarily on an intermediate transfer medium such as an intermediate transfer belt and thereafter transferred onto a sheet S, the invention is applicable also to an apparatus in which toner images are superimposed one atop the other directly on a sheet to form a color image.

Further, although the embodiments described above require manufacturing the oscillating deflection mirror surface 651 using a micromachining technique, a method of forming the deflection mirror surface is not limited to this.

The invention is generally applicable to any image forming apparatus in which a deflection mirror surface which oscillates deflects a light beam and makes the light beam scan on a latent image carrier.

Although the invention has been described with reference to specific embodiments, this description is not meant to be construed in a limiting sense. Various modifications of the disclosed embodiment, as well as other embodiments of the invention, will become apparent to persons skilled in the art upon reference to the description of the invention. It is therefore contemplated that the appended claims will cover any such modifications or embodiments as fall within the true scope of the invention.

The invention will be understood more readily with reference to the following examples; however these examples are intended to illustrate the invention and not to be construed to limit the scope of the invention.

The first and the second examples described below both use a method usually referred to as "a dither method" for tone reproduction. Before describing each example, tone reproduction using a dither method will be described with reference to FIGS. 37A, 37B and 37C which show examples. According to a dither method, a threshold matrix as that shown in FIG. 37A are changed to the arrangement shown in FIG. 37B for instance for tone reproduction. Each element in the threshold matrix corresponds to one pixel, and has a predetermined threshold value. The density value expressed by corrected tone data is compared to the threshold value of each element of the threshold matrix, and whether to form latent images at pixels corresponding to these elements is determined. Describing in more specific details, in the event that the density value expressed by corrected tone data is 4 for example, latent images are formed at pixels corresponding to those elements having the threshold values of 4 or smaller. Meanwhile, when the density value expressed by corrected tone data is 8, latent images are formed at pixels corresponding to those elements having the threshold values of 8 or smaller. The tone reproduced as the number of pixels at which latent images will be formed is changed in accordance with the density value.

FIRST EXAMPLE

The first example uses a line screen for tone reproduction and requires switching the sub-scanning line screen angle for black K between 45 degrees which is the sub-scanning line screen angle for the single-side scanning mode and 26.6 degrees which is the sub-scanning line screen angle for the double-side scanning mode. Means which realizes a line screen having such sub-scanning line screen angles will now be described with reference to FIGS. 37 and 38.

FIGS. 37A, 37B and 37C are explanatory diagrams regarding means which realizes the sub-scanning line screen angles for the single-side scanning mode according to the first example. The arrangement in the tone table shown in FIG. 37A in this example is as shown in FIG. 37B, the size of one pixel is 42.3 μm in both the main scanning direction and the sub scanning direction. This structure realizes a line screen which thickens a line extending at 45 degrees with respect to the sub scanning direction in accordance with an increase of a density value as shown in FIG. 37C.

FIGS. 38A, 38B and 38C are explanatory diagrams regarding means which realizes the sub-scanning line screen angle for the double-side scanning mode according to the first example. The arrangement in the tone table shown in FIG. 38A in this example is as shown in FIG. 38B, the size of one pixel is 42.3 μm in both the main scanning direction, but in the sub scanning direction, 21.2 µm which is roughly half the size for the single-side scanning mode, considering switching to the double-side scanning mode. This structure realizes a line screen which thickens a line extending at 26.6 degrees with respect to the sub scanning direction in accordance with an increase of a density value as shown in FIG. 38C.

As described above, in the first example the sub-scanning line screen angle for the single-side scanning mode is 45 degrees but is 26.6 degrees for the double-side scanning mode for black (K). The first example thus requires that for black (K), in the double-side scanning mode, the angle between the sub scanning direction and the respective lines of the line screen (sub-scanning line screen angles) is smaller than that in the single-side scanning mode. This makes it possible, in the double-side scanning mode, to suppress periodic appearances of thin sections and thick sections of a line latent image due to the unevenness of the scanning pitch in the sub scanning direction. It is therefore possible to realize excellent tone reproduction in the double-side scanning mode as well.

SECOND EXAMPLE

The second example uses a halftone screen for tone reproduction, and requires, for yellow (Y), switching between the sub-scanning halftone screen angles of 14.04 degrees and 75.7 degrees for the single-side scanning mode and the sub-scanning halftone screen angles of 18.43 degrees and 71.57 degrees for the double-side scanning mode. Means which realizes a halftone screen having such sub-scanning halftone screen angles will now be described with reference to FIGS. 39A, 39B, 39C, 40A, 40B and 40C.

FIGS. 39A, 39B and 39C are explanatory diagrams regarding means which realizes the sub-scanning halftone screen angles for the single-side scanning mode according to the second example. The arrangement in the tone table shown in FIG. 39A in this example is as shown in FIG. 39B, the size of one pixel is 42.3 µm in both the main scanning direction and the sub scanning direction. This structure realizes a halftone screen which grows the halftone dots in the directions at 14.04 degrees and 75.7 degrees with respect to the sub scanning direction in accordance with an increase of a density value as shown in FIG. 39C.

FIGS. 40A, 40B and 40C are explanatory diagrams regarding means which realizes the sub-scanning halftone screen angles for the double-side scanning mode according to the second example. The arrangement in the tone table shown in FIG. 40A in this example is as shown in FIG. 40B, the size of one pixel is 42.3 µm in both the main scanning direction, but in the sub scanning direction, 21.2 µm which is roughly half the size for the single-side scanning mode, considering switching to the double-side scanning mode. This structure realizes a halftone screen which grows the halftone dots arranged in the directions at 18.43 degrees and 71.57 degrees with respect to the sub scanning direction in accordance with an increase of a density value as shown in FIG. 40C.

As described above, in the second example, as for yellow (Y), the angle between the sub scanning direction and one of the two halftone dot arrangement directions which is at a greater angle with respect to the sub scanning direction is 75.7 degrees in the single-side scanning mode but is 71.57 degrees in the double-side scanning mode. The second example thus requires that for yellow Y, the angle between the sub scanning direction and one of the two halftone dot arrangement directions which is at a greater angle with respect to the sub scanning direction is smaller in the double-side scanning mode than in the single-side scanning mode. In short, the larger sub-scanning halftone screen angle among the two sub-scanning halftone screen angles which the halftone screen has is set to be smaller in the double-side scanning mode than in the single-side scanning mode. This suppresses creation of an unwanted pattern attributable to periodic changes of the halftone dot width. It is therefore possible to realize excellent tone reproduction in the double-side scanning mode as well.

THIRD EXAMPLE

Figures 41A, 41B, 41C:
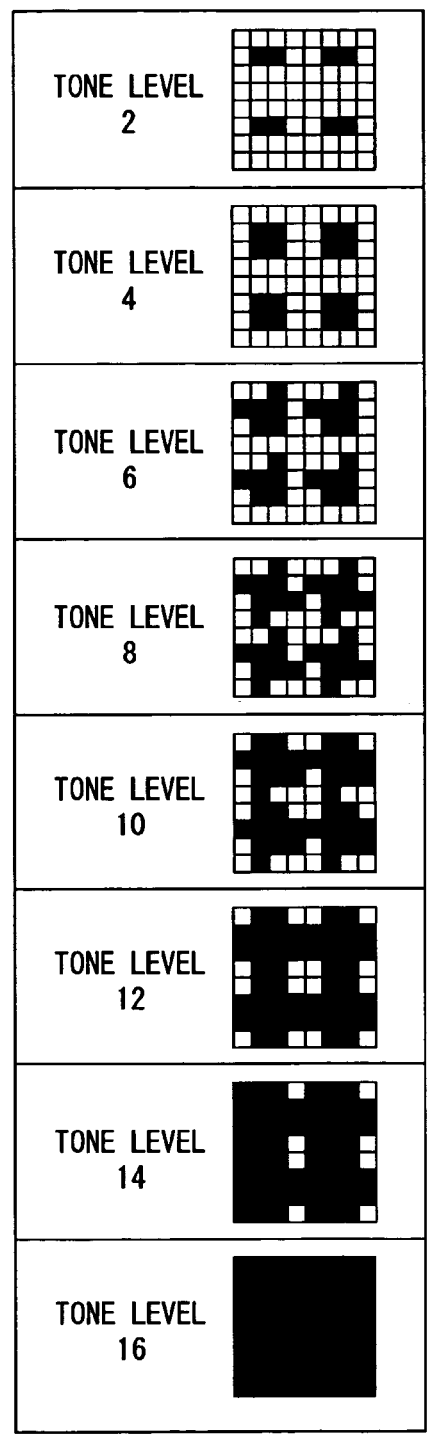
FIG. 41A shows a single-side threshold matrix which is used in the third example.
FIG. 41B shows a double-side threshold matrix which is used in the third example.
FIG. 41C shows halftone dots which grow in accordance with tone level in the third example.

FIG. 41A shows a single-side threshold matrix which is used in the third example. In the third example, using this single-side threshold matrix, tonal patch images having the tone levels of 2, 4, 6, 8, 10, 12, 14 and 16 as those shown in FIG. 41C are formed on the intermediate transfer belt through execution of the single-side scanning mode. Table 1 is a single-side threshold value conversion table compiled from the detected densities of these tonal patch images, following a similar procedure to that of the tone control processing described earlier in relation to the precedent examples. As for the tone levels 1, 3, 5, 7, 9, 11, 13 and 15 at which no patch image is formed, Table 1 is linearly interpolated, thereby obtaining a single-side threshold matrix as that shown in FIG. 42A. To form latent images in the single-side scanning mode, halftoning is performed using the single-side threshold matrix shown in FIG. 42A.

TABLE 1

| threshold value before conversion | threshold value after conversion |
|---|---|
| 0 | 0 |
| 2 | 1.7 |
| 4 | 3.3 |
| 6 | 5.7 |
| 8 | 8.7 |
| 10 | 12 |
| 12 | 14 |
| 14 | 15.3 |
| 16 | 16 |

FIG. 41B shows a double-side threshold matrix which is used in the example. Since the scanning pitch in the double-side scanning mode is roughly half that in the single-side scanning mode according to the third example, noting this, one element in the single-side threshold matrix is correlated with two elements in the double-side threshold matrix which are side by side so that the threshold value at these elements is the same. Hence, when tonal patch images having the tone levels of 2, 4, 6, 8, 10, 12, 14 and 16 are formed on the intermediate transfer belt using the double-side threshold matrix through execution of the double-side scanning mode, tonal patch images as those shown in FIG. 41C are obtained which have the same tone generation pattern as that of tonal patch images which are obtained through execution of the single-side scanning mode. Table 2 is a double-side threshold value conversion table compiled from the detected densities of these tonal patch images, following a similar procedure to that of the tone control processing described earlier in relation to the precedent examples. As for tone levels 1, 3, 5, 7, 9, 11, 13 and 15 at which no patch image is formed, Table 2 is linearly interpolated, thereby obtaining a double-side threshold matrix as that shown in FIG. 42B. To form latent images in the double-side scanning mode, halftoning is performed using the double-side threshold matrix shown in FIG. 42B.

TABLE 2

| threshold value before conversion | threshold value after conversion |
|---|---|
| 0 | 0 |
| 2 | 3.3 |
| 4 | 6 |
| 6 | 8.3 |
| 8 | 10.3 |
| 10 | 12.3 |
| 12 | 14 |
| 14 | 15.3 |
| 16 | 16 |

As described above, in this example, in the single-side scanning mode, toner images are formed as tonal patch images and the tone reproduction characteristic during the single-side scanning mode is controlled based on the detected densities of the toner images, and in the doubled-side scanning mode, toner images are formed as tonal patch images and the tone reproduction characteristic during the double-side scanning mode is controlled based on the detected densities of the toner images. In short, in each one of the single-side scanning mode and the double-side scanning mode, toner images serving as tonal patch images are formed and the tone reproduction characteristic of the apparatus is optimized in each scanning mode based on the detected densities of the toner images. When one wishes to form latent images through execution of the single-side scanning mode or the double-side scanning mode, it is possible to form latent images using the tone reproduction characteristic which is optimized for each scanning mode. Regardless of whether the tone reproduction characteristic changes between the double-side scanning mode and the single-side scanning mode therefore, it is possible to realize excellent tone reproduction in each scanning mode.

Further, in this example, during the tone control processing, toner images are formed as tonal patch images based on the same tone generation pattern in both the single-side scanning mode and the double-side scanning mode. This eliminates the necessity of providing a tone generation pattern for each scanning mode and simplifies the structure.

FOURTH EXAMPLE

FIG. 43 is an explanatory diagram of the fourth example. In the fourth example, the effective scan region ESR accounts for 50% of the scan region SR, and the center line of the effective scan region ESR and that of the scan region SR are the same. In addition, since a resolution in the sub scanning direction Y is 1200 dpi, the scanning pitch in the sub scanning direction Y on the center line of the effective scan region ESR is about 21.2 µm. At this stage, the maximum scanning pitch in the sub scanning direction Y in the end portions of the effective scan region ESR is PTmax1=32.8 µm. Noting this, in the fourth example, the beam spot diameter in the sub scanning direction Y of a beam spot is 33 µm which exceeds the maximum scanning pitch PTmax1 in the sub scanning direction Y The adjustment of the beam spot diameter connects beam spots with each other in the sub scanning direction Y in an area where the scanning pitch is short of course and also in an area where the scanning pitch is long, which attains favorable two-dimensional scanning. It is thus possible to form an excellent image.

FIFTH EXAMPLE

Figure 44:
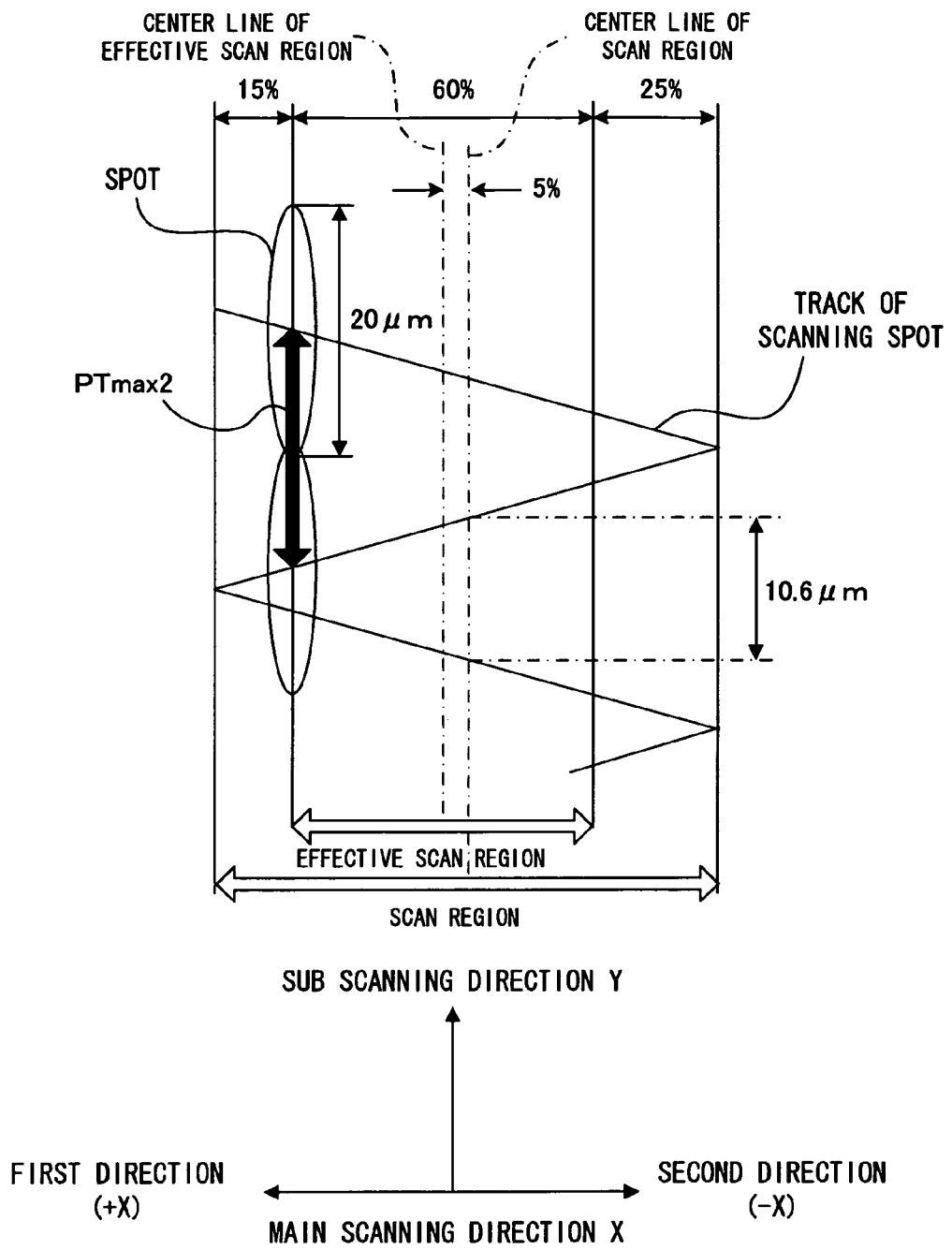
FIG. 44 is an explanatory diagram of the fifth example.

FIG. 44 is an explanatory diagram of the fifth example. In the fifth example, the effective scan region ESR accounts for 60% of the scan region SR, and the center line of the effective scan region ESR is shifted from that of the scan region SR in the first direction (+X) by 5% in terms of the proportion to the scan region SR. In addition, since a resolution in the sub scanning direction Y is 2400 dpi, the scanning pitch in the sub scanning direction Y on the center line of the effective scan region ESR is about 10.6 µm. At this stage, the maximum scanning pitch in the sub scanning direction Y in the end portions of the effective scan region ESR is PTmax2=18.02 µm. Noting this, in the fifth example, the beam spot diameter in the sub scanning direction Y of a beam spot is 20 µm which exceeds the maximum scanning pitch PTmax2 in the sub scanning direction Y The adjustment of the beam spot diameter connects beam spots with each other in the sub scanning direction Y in an area where the scanning pitch is short of course and also in an area where the scanning pitch is long, which attains favorable two-dimensional scanning. It is thus possible to form an excellent image.

SIXTH EXAMPLE

FIG. 45 is an explanatory diagram of the sixth example. In the sixth example, the effective scan region ESR accounts for 20% of the scan region SR, and the center line of the scan region SR and that of the effective scan region ESR are the same. In addition, since a resolution in the sub scanning direction Y is 2400 dpi, the scanning pitch in the sub scanning direction Y on the center line of the effective scan region ESR is about 10.6 µm. At this stage, the maximum scanning pitch in the sub scanning direction Y in the end portions of the effective scan region ESR is PTmax3=12.72 µm. Meanwhile, the minimum scanning pitch in the sub scanning direction Y on the center line of the effective scan region ESR is PTmin3=8.48 µm. Noting this, in the sixth example, the beam spot diameter in the sub scanning direction Y of a beam spot is 15 µm which is equal to or larger than the maximum scanning pitch PTmax3 in the sub scanning direction Y but equal to or smaller than double the minimum scanning pitch PTmin3 in the sub scanning direction Y. With the beam spot diameter adjusted to be equal to or larger than the maximum scanning pitch PTmax3 in the sub scanning direction Y, beam spots are connected with each other in the sub scanning direction Y in an area where the scanning pitch is short of course and also in an area where the scanning pitch is long, which attains favorable two-dimensional scanning. Further, with the beam spot diameter adjusted to be equal to or smaller than double the minimum scanning pitch PTmin3 in the sub scanning direction Y, excessive overlapping of beam spots in the sub scanning direction Y is prevented. This prevents excessive overlapping of latent images which are formed through irradiation with the beam spots, and hence, avoid the image impairment mentioned above which is caused by excessive adhesion of toner. It is therefore possible to form an excellent image.

What is claimed is:
1. A light scanning apparatus comprising:
  a light source which emits a light beam;
  a deflector which has a deflection mirror oscillating in sine motions about a drive axis approximately orthogonal to a main scanning direction, the deflection mirror reflecting the light beam emitted from the light source so as to scan the light beam reciprocally in a main scanning direction; and an imaging optical system which exhibits an arc-sign theta lens characteristic, and focuses the light beam deflected by the deflector on a surface to be scanned so as to form a beam spot on the surface, the surface being driven in a sub scanning direction approximately orthogonal to the main scanning direction and including an effective scan region spanning across a predetermined width in the main scanning direction, wherein a diameter of the beam spot in the sub scanning direction is equal to or larger than the maximum scanning pitch in the sub scanning direction within the effective scan region.

2. A light scanning apparatus of claim 1, wherein the diameter of the beam spot in the sub scanning direction is equal to or smaller than double the minimum scanning pitch in the sub scanning direction within the effective scan region.

3. A light scanning apparatus of claim 1, wherein the diameter of the beam spot in the sub scanning direction is equal to or larger than the maximum scanning pitch in the sub scanning direction in end portions of the effective scan region.

4. A light scanning apparatus of claim 1, wherein the diameter of the beam spot in the sub scanning direction is equal to or larger than the maximum scanning pitch in the sub scanning direction in end portions of the effective scan region, but is equal to or smaller than double the minimum scanning pitch in the sub scanning direction in end portions of the effective scan region.

5. An image forming apparatus, comprising:

a latent image carrier whose surface includes an effective scan region spanning across a predetermined width in a main scanning direction and is driven in a sub scanning direction approximately orthogonal to the main scanning direction;

a light source which emits a light beam;

a deflector which has a deflection mirror oscillating in sine motions about a drive axis approximately orthogonal to a main scanning direction, the deflection mirror reflecting the light beam emitted from the light source so as to scan the light beam reciprocally in a main scanning direction; and an imaging optical system which exhibits an arc-sign theta lens characteristic, and focuses the light beam deflected by the deflector on the surface of the latent image carrier so as to form a beam spot on the surface, wherein a diameter of the beam spot in the sub scanning direction is equal to or larger than the maximum scanning pitch in the sub scanning direction within the effective scan region.

6. A light scanning apparatus comprising:

a light source which emits a light beam;

a deflector which has a deflection mirror oscillating in sine motions about a drive axis approximately orthogonal to a main scanning direction, the deflection mirror reflecting the light beam emitted from the light source so as to scan the light beam reciprocally in a main scanning direction; and an imaging optical system which exhibits an arc-sign theta lens characteristic, and focuses the light beam deflected by the deflector on a surface to be scanned so as to form a beam spot on the surface, the surface being driven in a sub scanning direction approximately orthogonal to the main scanning direction and including an effective scan region spanning across a predetermined width in the main scanning direction, wherein the maximum scanning pitch and the minimum scanning pitch are arranged alternately in the sub scanning direction in end portions of the effective scan region due to the reciprocal scanning of the light beam by the oscillating deflection mirror, and a diameter of the beam spot in the sub scanning direction is adjusted based on the pitch in the end portions of the effective scan region.

* * * * *